United States Patent
Beeson et al.

(10) Patent No.: US 7,431,463 B2
(45) Date of Patent: *Oct. 7, 2008

(54) LIGHT EMITTING DIODE PROJECTION DISPLAY SYSTEMS

(75) Inventors: Karl W. Beeson, Princeton, NJ (US); Scott M. Zimmerman, Baskin Ridge, NJ (US)

(73) Assignee: Goldeneye, Inc., San Diego, CA (US)

( * ) Notice: Subject to any disclaimer, the term of this patent is extended or adjusted under 35 U.S.C. 154(b) by 91 days.

This patent is subject to a terminal disclaimer.

(21) Appl. No.: 11/244,352

(22) Filed: Oct. 5, 2005

(65) Prior Publication Data

US 2007/0206164 A1    Sep. 6, 2007

Related U.S. Application Data

(63) Continuation-in-part of application No. 10/815,005, filed on Mar. 30, 2004, now Pat. No. 7,025,464.

(51) Int. Cl.
*G03B 21/26*  (2006.01)
*G03B 21/28*  (2006.01)
*G03B 21/00*  (2006.01)
*F21V 7/00*  (2006.01)
*H04N 9/12*  (2006.01)

(52) U.S. Cl. .................. 353/94; 353/99; 353/121; 362/298; 348/742

(58) Field of Classification Search .................. 353/30, 353/31, 94, 98, 99, 121; 349/38; 313/113, 313/114; 359/853, 850; 362/308, 297, 347, 362/298; 348/742
See application file for complete search history.

(56) References Cited

U.S. PATENT DOCUMENTS

| | | | |
|---|---|---|---|
| 5,410,454 A | 4/1995 | Murase et al. | |
| 6,144,536 A | 11/2000 | Zimmerman et al. | |
| 6,185,357 B1 | 2/2001 | Zou et al. | |
| 6,186,649 B1 | 2/2001 | Zou et al. | |
| 6,550,942 B1 | 4/2003 | Zou et al. | |
| 6,614,492 B1 * | 9/2003 | Song | 349/38 |
| 7,025,464 B2 * | 4/2006 | Beeson et al. | 353/98 |
| 2003/0210482 A1 * | 11/2003 | Arnold | 359/853 |

* cited by examiner

*Primary Examiner*—Melissa Jan Koval
(74) *Attorney, Agent, or Firm*—William Propp

(57) ABSTRACT

A projection display system has at least one light-recycling illumination system and at least one imaging light modulator. The light-recycling illumination system includes a light source that is enclosed within a light-recycling cavity. The light source is a plurality of light-emitting diode that emits light, and a fraction of that light will exit the light-recycling cavity through an aperture. The light-recycling cavity recycles a portion of the light emitted by the light source back to the light source in order to enhance the luminance of the light exiting the aperture. The fraction of the light that exits the aperture is partially collimated and is directed to the imaging light modulator. The imaging light modulator spatially modulates the partially collimated light to form an image.

29 Claims, 22 Drawing Sheets

LIGHT EMITTING DIODE PROJECTION DISPLAY SYSTEMS

CROSS REFERENCE TO RELATED APPLICATIONS

This application is a continuation-in-part of U.S. patent application Ser. No. 10/815,005, now U.S. Pat. No. 7,025,464, entitled "PROJECTION DISPLAY SYSTEMS UTILIZING LIGHT EMITTING DIODES AND LIGHT RECYCLING," which was filed Mar. 30, 2004, and which is herein incorporated by reference. This application is also related to U.S. patent application Ser. No. 10/445,136, now U.S. Pat. No. 6,869,206, entitled "ILLUMINATION SYSTEMS UTILIZING HIGHLY REFLECTIVE LIGHT EMITTING DIODES AND LIGHT RECYCLING TO ENHANCE BRIGHTNESS," and to U.S. patent application Ser. No. 10/814,043, now U.S. Pat. No. 6,960,872, entitled "ILLUMINATION SYSTEMS UTILIZING LIGHT EMITTING DIODES AND LIGHT RECYCLING TO ENHANCE OUTPUT RADIANCE," both of which are herein incorporated by reference.

TECHNICAL FIELD

This invention relates to projection display systems incorporating light-emitting diodes (LEDs).

BACKGROUND OF THE INVENTION

Illumination systems are used as either stand-alone light sources or as internal light sources for more complex optical systems. Examples of optical systems that utilize or incorporate illumination systems include projection displays, flat-panel displays and avionics displays.

Many applications require illumination systems with high brightness and a small effective emitting area. An example of a conventional light source with high brightness and a small effective emitting area is an arc lamp source, such as a xenon arc lamp or a mercury arc lamp. Arc lamp sources may have emitting areas as small as a few square millimeters. An example of a complex optical system that can utilize an illumination system with high brightness and a small effective source area is a projection display system. Early projection display systems typically project the combined images of three small red, green and blue cathode-ray-tube (CRT) devices onto a viewing screen using projection lenses. More recent designs sometimes use a small-area arc lamp source to project images from a liquid crystal display (LCD) device, a liquid-crystal-on-silicon (LCOS) device or a digital light processor (DLP) device onto a viewing screen. DLP devices utilize an array of micro-mirrors to form an image.

An arc lamp source has a fixed color temperature and a brightness that is difficult to adjust. LED light sources are more flexible. An LED light source that includes mixtures of red, green and blue LEDs can be adjusted to change the color temperature and overall brightness of the source. However, LEDs are currently not used for large projection display systems because LED sources do not have sufficient output brightness.

The technical term brightness can be defined either in radiometric units or photometric units. In the radiometric system of units, the unit of light flux or radiant flux is expressed in watts and the unit for brightness is called radiance, which is defined as watts per square meter per steradian (where steradian is the unit of solid angle). The human eye, however, is more sensitive to some wavelengths of light (for example, green light) than it is to other wavelengths (for example, blue or red light). The photometric system is designed to take the human eye response into account and therefore brightness in the photometric system is brightness as observed by the human eye. In the photometric system, the unit of light flux as perceived by the human eye is called luminous flux and is expressed in units of lumens. The unit for brightness is called luminance, which is defined as lumens per square meter per steradian. The human eye is only sensitive to light in the wavelength range from approximately 400 nanometers to approximately 700 nanometers. Light having wavelengths less than about 400 nanometers or greater than about 700 nanometers has zero luminance, irrespective of the radiance values.

In U.S. Pat. No. 6,869,206, brightness enhancement referred to luminance enhancement only. Since luminance is non-zero only for the visible wavelength range of 400 to 700 nanometers, U.S. Pat. No. 6,869,206 is operative only in the 400- to 700-nanometer wavelength range visible to the human eye. In U.S. patent application Ser. No. 10/814,043 entitled "ILLUMINATION SYSTEMS UTILIZING LIGHT EMITTING DIODES AND LIGHT RECYCLING TO ENHANCE OUTPUT RADIANCE," brightness enhancement refers to radiance enhancement and is valid for any wavelength throughout the optical spectrum. In this application, brightness enhancement will generally refer to luminance enhancement.

In a conventional optical system that transports light from an input source at one location to an output image at a second location, one cannot produce an optical output image whose luminance is higher than the luminance of the light source. A conventional optical system 20 of the prior art is illustrated in cross-section in FIG. 1. In FIG. 1, the input source 22 has area, $Area_{in}$. The light rays from input source 22 fill a truncated cone having edges 21 and 23. The cone, which is shown in cross-section in FIG. 1, extends over solid angle 27. The magnitude of solid angle 27 is $\Omega_{in}$. Lens 24 focuses the light rays to image 26 having area, $Area_{out}$. The light rays forming the image 26 fill a truncated cone having edges 25 and 29. The cone, which is shown in cross-section, extends over solid angle 28. The magnitude of solid angle 28 is $\Omega_{out}$.

If the optical system 20 has no losses, the light input flux at the input source 22, $$\Phi_{in} = (Luminance_{in})(Area_{in})(\Omega_{in}), \quad \text{[Equation 1]}$$

equals the light output flux at the output image 26, $$\Phi_{out} = (Luminance_{out})(Area_{out})(\Omega_{out}). \quad \text{[Equation 2]}$$

In these equations, "$Luminance_{in}$" is the luminance at the input source 22, "$Luminance_{out}$" is the luminance at the output image 26, "$Area_{in}$" is the area of the input source 22 and "$Area_{out}$" is the area of the output image 26. The quantities $\Omega_{in}$ and $\Omega_{out}$ are, respectively, the projected solid angles subtended by the input source and output image light cones. In such a lossless system, it can be shown that $$Luminance_{in} = Luminance_{out} \quad \text{[Equation 3]}$$

and $$(Area_{in})(\Omega_{in}) = (Area_{out})(\Omega_{out}) \quad \text{[Equation 4]}$$

If the index of refraction of the optical transmission medium is different at the input source and output image positions, the equality in Equation 4 is modified to become $$(n_{in}^2)(Area_{in})(\Omega_{in}) = (n_{out}^2)(Area_{out})(\Omega_{out}) \quad \text{[Equation 5]}$$

where $n_{in}$ is the index of refraction at the input position and $n_{out}$ is the index of refraction at the output position. The quantity $(n^2)(Area)(\Omega)$ is variously called the "etendue" or "optical extent" or "throughput" of the optical system. In a conventional lossless optical system, the quantity $(n^2)(Area)(\Omega)$ is conserved and Luminance$_{in}$ equals Luminance$_{out}$. However, under certain conditions utilizing light recycling, the effective luminance of the source as well as the maximum exiting luminance of the optical system can be higher than the intrinsic luminance of the source in the absence of recycling, a result that is not predicted by the standard etendue equations.

Recently, highly reflective green, cyan, blue and ultraviolet LEDs and diode lasers based on gallium nitride (GaN), indium gallium nitride (InGaN), aluminum gallium nitride (AlGaN) and aluminum nitride (AlN) semiconductor materials have been developed. Some of these LED devices have high light output, high luminance and have a reflecting layer that can reflect at least 50% of the light incident upon the device. Such a reflecting layer is necessary in order to increase the effective luminance of the LED by light recycling. The reflecting layer of the LED can be a specular reflector or a diffuse reflector. Typically, the reflecting layer of the LED is a specular reflector. Luminance outputs of several million lumens per square meter per steradian and total outputs greater than 100 lumens from a single packaged device are possible. Light outputs per unit area can exceed 25 lumens per square millimeter. As such, several new applications relating to illumination systems have become possible. Advantages such as spectral purity, reduced heat, and fast switching speed all provide motivation to use LEDs and semiconductor lasers to replace fluorescent, incandescent and arc lamp sources.

Red and yellow LEDs were developed earlier than the UV, blue, cyan and green LEDs. The red and yellow LEDs are generally made from a different set of semiconductor materials, one particular example being aluminum indium gallium phosphide (AlInGaP).

FIG. 2 illustrates a cross-sectional view of a recently developed type of LED 40 that has an emitting layer 46 located below both a partially transparent conducting layer 43 and a transparent growth substrate layer 44. The growth substrate 44 is the original substrate onto which the semiconducting layers are grown by epitaxial deposition means. Emitting layer 46 emits light rays 45 when an electric current is passed through the device 40. Below the emitting layer 46 are a second partially transparent conducting layer 49 and a reflecting layer 47 that also serves as a portion of the bottom electrode. Electrical contacts 41 and 42 provide a pathway for electrical current to flow through the device 40. The reflecting layer 47 allows the LED to be both a light emitter and a light reflector. Lumileds Lighting LLC, for example, produces highly reflective green, blue and ultraviolet LED devices of this type. It is expected that highly reflective yellow, red and infrared LEDs with high outputs and high luminance will also eventually be developed. However, even the new green, cyan, blue and ultraviolet gallium nitride, indium gallium nitride, aluminum gallium nitride and aluminum nitride LEDs do not have sufficient luminance for many applications.

LEDs, including inorganic light-emitting diodes and organic light-emitting diodes, emit incoherent light. On the other hand, semiconductor laser light sources, such as edge-emitting laser diodes and vertical cavity surface emitting lasers, generally emit coherent light. Coherent semiconductor laser light sources typically have higher brightness than incoherent light sources, but semiconductor laser light sources are not suitable for many applications such as displays due to the formation of undesirable speckle light patterns that result from the coherent nature of the light.

Most light-emitting color projection displays utilize three primary colors to form full-color images. The three primary colors are normally red (R), green (G) and blue (B), but some projection displays may also utilize additional colors such as white (W), yellow (Y), cyan (C) and magenta (M). The red, green and blue primary colors can be mixed to form thousands or millions of colors. However, such systems do not reproduce all the colors that a human eye can visualize. The colors that can be visualized by the human eye can be graphed in X and Y color coordinates as the 1931 CIE Chromaticity Diagram. A representation of the 1931 CIE Chromaticity Diagram is shown in FIG. 3A. The X and Y color coordinates of the pure colors, such as 700 nm, 600 nm, 500 nm and 400 nm are points on the "curved line of pure colors" in FIG. 3A. The straight line connecting the 400-nm and 700-nm points is the "line of purples", which are mixtures of 400-nm and 700-nm light. The enclosed area inside the "curved line of pure colors" and "line of purples" represents all the colors that are visible to the human eye. All the colors inside the enclosed area that are not on the curved line are mixtures of pure colors.

A cathode ray tube (CRT) computer monitor utilizes red, green and blue phosphors to display multicolor images. The approximate color coordinates for the resulting R, G and B primary colors are shown in FIG. 3A and form a triangle. Notice that there is considerable area outside the RGB triangle that falls within the range of colors visible to the human eye and represents colors that cannot be reproduced by the computer monitor. The shaded area inside the triangle represents all the colors that can be formed by mixing varying amounts of the R, G, and B primary colors. This shaded are is called the color gamut for a CRT computer monitor.

The total number of mixed colors and color grayscale levels that can be produced by a CRT monitor depends on the number of intensity levels that can be produced for each R, G and B color. For example, the line between R and G represents colors that can be produced by mixing only R and G. If the monitor can produce, for example, 100 intensity levels (grayscale levels) of R and 100 intensity levels (grayscale levels) of G, then R and G can be mixed 100×100 or 10,000 ways to produce many different colors and many different grayscale levels of particular colors. When R and G are mixed, the resulting color depends on the ratio of R to G. The grayscale level of the mixed color depends on the intensity level of the mixture. As an illustrative example, mixing intensity level 100 of the color R and intensity level 100 of the color G can produce the color yellow. The ratio of intensity level R to intensity level G is 100:100 or 1:1. Mixing intensity level 50 of the color R and intensity level 50 of the color G will produce the same yellow color since the ratio of the two intensity levels is still 1:1. However, the intensity or grayscale level of the 50:50 mixture is one-half of the intensity or grayscale level of the 100:100 mixture. Adding a third primary color B increases the number of possible colors. In this example, if the total number of intensity or grayscale levels of B is 100, then R, G and B can be mixed 100×100×100 or 1,000,000 ways to achieve a wide range of colors and multiple grayscale levels of the same color. The colors that are called white are mixtures of R, G and B and are located in the central region of the RGB triangle.

One can increase the color gamut of a display system by adding additional colors located outside the RGB triangle. For example, if one adds yellow (Y) and cyan (C) colors that have color coordinates outside the RGB triangle, the shaded area corresponding to the color gamut increases as shown in FIG. 3B. Therefore a wider range of colors can be produced by a display system that uses five primary colors (R, G, B, Y and C) than by a display system that uses three primary colors (R, G and B).

It would be highly desirable to develop LED-based projection display systems that utilize light recycling in order to increase the maximum output luminance of the systems. It would also be desirable to use LEDs to extend the color gamut and grayscale range of projection display systems. Furthermore, it would be desirable to develop LED-based displays where the color temperature and overall brightness of the display can be modified as desired. Possible uses include front and rear projection displays for television and avionics applications.

SUMMARY OF THE INVENTION

One embodiment of this invention is a projection display system that comprises at least one light-recycling illumination system and at least one imaging light modulator. The light-recycling illumination system further comprises a light source for generating light, a light-recycling cavity, a light output aperture and a light-collimating means. The light source is a plurality of light-emitting diode that each have a first reflecting electrode and a second reflecting electrode, wherein the total light-emitting area of the plurality of light-emitting diodes is area $A_{LED}$ and wherein the plurality of light-emitting diodes has a maximum intrinsic source luminance. The light-recycling cavity encloses the plurality of light-emitting diodes and reflects and recycles a portion of the light generated by the plurality of light-emitting diodes back to the first reflecting electrodes and the second reflecting electrodes of the plurality of light-emitting diodes. The light output aperture is located in a surface of the light-recycling cavity and has area $A_O$, wherein area $A_O$ is less than area $A_{LED}$. The plurality of light-emitting diodes and the light-recycling cavity direct at least a fraction of the light out of the light-recycling cavity through the light output aperture as uncollimated light having a maximum exiting luminance. Under some conditions, the maximum exiting luminance is greater than the maximum intrinsic source luminance. The light-collimating means has an input area that is adjacent to the light output aperture and that accepts the uncollimated light. The light-collimating means partially collimates the uncollimated light and directs the partially collimating light through an output area and to the imaging light modulator. The imaging light modulator, which is located in the optical path of the partially collimated light, spatially modulates the partially collimated light to form an image.

Another embodiment of this invention is a color sequential method of forming a full-color projection display image. In this embodiment, the time period for each frame of the full-color projection display image is divided into at least three sub-frames.

During the first sub-frame, all the pixels of an imaging light modulator are addressed to set the transmission of the imaging light modulator for light of a first color. Light of a first color is emitted from a first plurality of light-emitting diodes that each have a first reflecting electrode and a second reflecting electrode. A portion of the light of a first color is recycled back to the first reflecting electrodes and a second reflecting electrodes to increase the effective brightness of the first plurality of light-emitting diodes source. A fraction of the light of a first color is partially collimated and directed to the imaging light modulator and the imaging light modulator spatially modulates the partially collimated light of a first color to form a first image.

During the second sub-frame, all the pixels of the imaging light modulator are addressed to set the transmission of the imaging light modulator for light of a second color. Light of a second color is emitted from a second plurality of light-emitting diodes that each have a first reflecting electrode and a second reflecting electrode. A portion of the light of a second color is recycled back to the first reflecting electrodes and a second reflecting electrodes to increase the effective brightness of the second light source. A fraction of the light of a second color is partially collimated and directed to the imaging light modulator and the imaging light modulator spatially modulates the partially collimated light of a second color to form a second image.

During the third sub-frame, all the pixels of the imaging light modulator are addressed to set the transmission of the imaging light modulator for light of a third color. Light of a third color is emitted from a third plurality of light-emitting diodes that each have a first reflecting electrode and a second reflecting electrode. A portion of the light of a third color is recycled back to the first reflecting electrodes and a second reflecting electrodes to increase the effective brightness of the third plurality of light-emitting diodes. A fraction of the light of a third color is partially collimated and directed to the imaging light modulator and the imaging light modulator spatially modulates the partially collimated light of a third color to form a third image.

BRIEF DESCRIPTION OF THE DRAWINGS

A more complete understanding of the present invention, as well as other objects and advantages thereof not enumerated herein, will become apparent upon consideration of the following detailed description and accompanying drawings, wherein:

FIGS. 5C-5F show example light rays.

DETAILED DESCRIPTION OF THE PREFERRED EMBODIMENTS

The preferred embodiments of the present invention will be better understood by those skilled in the art by reference to the above figures. The preferred embodiments of this invention illustrated in the figures are not intended to be exhaustive or to limit the invention to the precise form disclosed. The figures are chosen to describe or to best explain the principles of the invention and its applicable and practical use to thereby enable others skilled in the art to best utilize the invention. The figures are not drawn to scale.

The embodiments of this invention are comprised of at least one illumination system and at least one imaging light modulator. The illumination system is further comprised of a light source, a light-recycling cavity, a light output aperture located in the surface of the light-recycling cavity and a light-collimating means.

The preferred light source of this invention is a plurality of light-emitting diodes (LEDs). In this specification, a plurality of LEDs refers to two or more LEDs. Preferred LEDs are inorganic light-emitting diodes that both emit internally generated light and reflect externally incident light.

Figure 2:
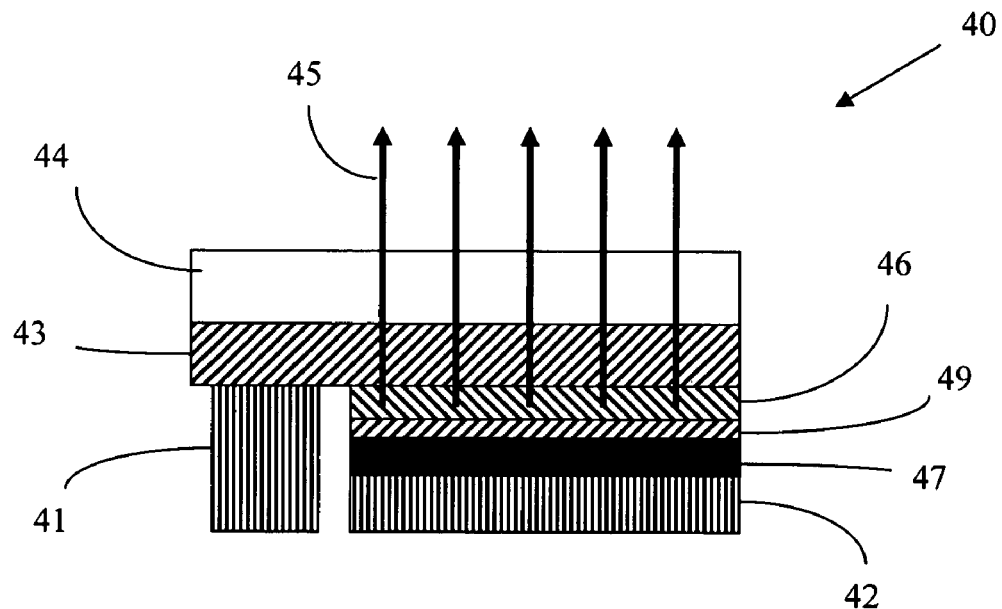
FIG. 2 is a side cross-sectional view of a prior art light source that has both emitting and reflecting surfaces.

LEDs can be constructed in a variety of ways. Any method can be used for constructing suitable LEDs for this invention as long as the LEDs are reflective to externally incident light. For example, the prior art LED illustrated in FIG. 2 was formed on a transparent, insulating growth substrate. For GaN-based LEDs, a suitable transparent growth substrate is sapphire. In the final flip-chip device as depicted in FIG. 2, the growth substrate becomes the top layer of the device and both electrical contacts are on the bottom of the device. LEDs of the type shown in FIG. 2 can have relatively high reflectivity to externally incident light, but suffer from relatively poor overall light output owing to low light extraction efficiency.

In another example (not shown) of an LED structure, the grow substrate is an electrical conductor. An example of an electrically conducting growth substrate for GaN-based devices is silicon carbide (SiC). When the growth substrate is conducting, one electrical contact can be on the top of the device and the other electrical contact can be on the bottom surface. However, SiC is not totally transparent. The absorption of the SiC can reduce the reflectivity of the LED to externally incident light.

Figure 4:
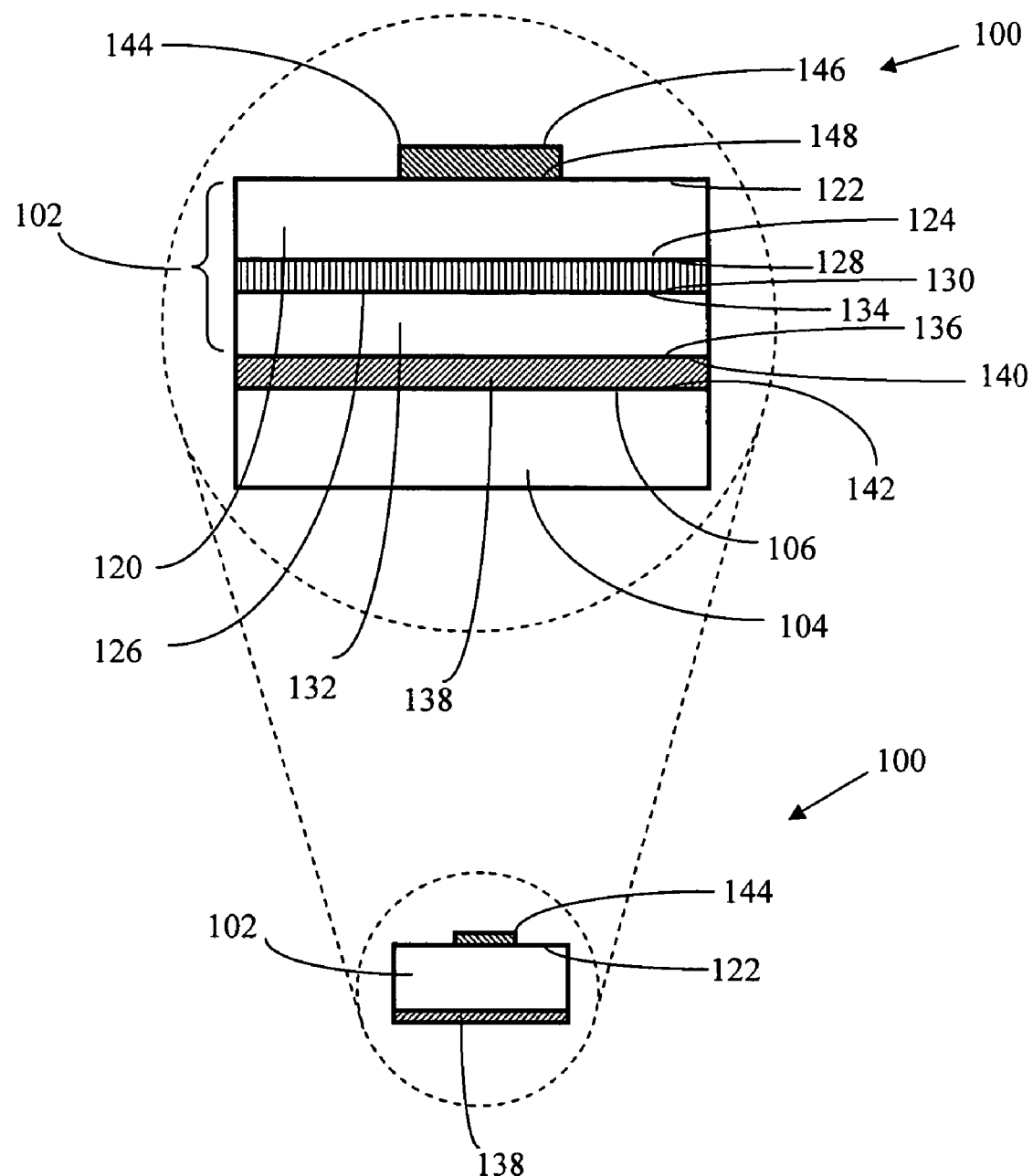
FIG. 4 is a cross-sectional view of a preferred light-emitting diode of this invention.

Preferred LEDs for this invention have both high reflectivity for externally incident light and high light output. A preferred type of LED for this invention is illustrated in FIG. 4 as LED 100.

In general, LED 100 includes a first reflecting electrode 144, a multilayer semiconductor structure 102 and a second reflecting electrode 138. The multilayer semiconductor structure 102 includes a first doped semiconductor layer 120, an active region 126 and a second doped semiconductor layer 132. The first doped semiconductor layer 120 and the second doped semiconductor layer 132 have opposite n and p conductivity types. For example, if the first doped semiconductor layer 120 is an n-doped layer, then the second doped semiconductor layer 132 is a p-doped layer. Conversely, if the first doped semiconductor layer 120 is a p-doped layer, then the second doped semiconductor layer 132 is an n-doped layer.

The active region 126 is interposed between the first doped semiconductor layer 120 and the second doped semiconductor layer 132. The active region 126 is in electrical contact with both the first doped semiconductor layer 120 and the second doped semiconductor layer 132. The active region 126 of LED 100 is, for example, a p-n homojunction, a p-n heterojunction, a double heterojunction, a single quantum well or a multiple quantum well of the appropriate semiconductor material for the LED 100.

The first reflecting electrode 144 is in electrical contact with the first doped semiconductor layer 120. The second reflecting electrode 138 is in electrical contact with the second doped semiconductor layer 132. When a voltage is applied by electrical connections (not shown) between the first reflecting electrode 144 and the second reflecting electrode 138, the active region 126 of LED 100 emits internally generated light. The internally generated light exits LED 100 through the top surface 122 of LED 100.

The first reflecting electrode 144 and the second reflecting electrode 138 of LED 100 may be fabricated from reflecting metals or partially transparent conducting oxides. For example, the first reflecting electrode 144 and the second reflecting electrode 138 may be formed from one or more metals or metal alloys containing, but not limited to, silver, aluminum, nickel, titanium, chromium, platinum, palladium, rhodium, rhenium, ruthenium and tungsten. In addition, the first reflecting electrode may also be fabricated from partially transparent conducting oxides such as indium tin oxide. If the first reflecting electrode is fabricated from a partially transparent conductive oxide, the electrode is only partially reflective.

Optionally the first reflecting electrode and the second reflecting electrode may be omni-directional reflectors that include at least two separate layers, a low refractive index transparent layer and a metal layer. Example low refractive index transparent layers include silicon dioxide, silicon nitride, magnesium fluoride, indium tin oxide, copper doped indium oxide and aluminum doped zinc oxide. The low refractive index transparent layer may be a solid layer or a porous layer. The low refractive index transparent layer thickness may be one-quarter wave or greater than one-quarter wave. Example metals are listed above and include silver and aluminum. If the low refractive index transparent layer is not a good electrical conductor, holes may be etched in the layer and metal deposited in the holes to form electrical connections through the layer.

In this specification, the first reflecting electrode 144 and the second reflecting electrode 138 are shown to be on opposite sides of LED 100. However, it is within the scope of this invention that the first reflecting electrode may be placed at other locations as long as it is in electrical contact with the first doped semiconductor layer 120. For example, as is well known by those skilled in the art, modifying the structure of LED 100 can allow both the first reflecting electrode and the second reflecting electrode to be located on the same side of LED 100. Such a structure is illustrated in FIG. 2.

LED 100 can be fabricated from GaN-based semiconductor materials containing gallium nitride (GaN), aluminum gallium nitride (AlGaN), indium gallium nitride (InGaN) and aluminum indium gallium nitride (AlInGaN). Other appropriate LED materials include, for example, aluminum nitride (AlN), boron nitride (BN), indium nitride (InN), aluminum gallium indium phosphide (AlGaInP), gallium arsenide (GaAs), indium gallium arsenide (InGaAs), indium gallium arsenide phosphide (InGaAsP), diamond or zinc oxide (ZnO), for example, but are not limited to such materials. Especially relevant LEDs for this invention are GaN-based LEDs that emit light in the ultraviolet, blue, cyan and green region of the optical spectrum and AlGaInP LEDs that emit light in the yellow and red regions of the optical spectrum. Also very relevant are LED material systems that exhibit low absorption throughout a substantial portion of their emission range. Examples of the latter materials include, but are not limited to, ZnO, BN, AlN and diamond, all of which have low absorption throughout the visible spectrum and have shorter wavelength emission spectra. The shorter wavelength emission can lead to improvements in wavelength conversion efficiency when used in conjunction with wavelength conversion materials such as phosphors.

As noted above, LED 100 may be fabricated from any suitable light-emitting semiconductor material such as the materials listed above. To better illustrate the embodiments of this invention, LED 100 is assumed for purposes of illustration in FIG. 4 to be a flip-chip, GaN-based LED having a top first reflecting electrode 144 and a bottom second reflecting electrode 138. It should be noted, however, that a flip-chip structure is not required.

To briefly summarize the important fabrication steps for this flip-chip, GaN-based, illustrative example, a first doped semiconductor layer is fabricated on a growth substrate such as sapphire. An active region is fabricated on the first doped semiconductor layer. A second doped semiconductor layer is fabricated on the active region. A second reflecting electrode is deposited onto the second doped semiconductor layer opposite the growth substrate, followed by the attachment of a sub-mount or base to the second reflecting electrode. The structure is inverted (flipped) and a liftoff process removes the growth substrate, exposing the surface of the first doped semiconductor layer that was originally attached to the growth substrate. Finally, a first reflecting electrode is deposited and patterned on the exposed surface of the first doped semiconductor layer opposite the second reflecting electrode.

The structure and fabrication of the illustrative example LED 100 shown in FIG. 4 will now be described in greater detail. This example focuses on GaN-based semiconductors that are commonly used for blue and green LEDs. Red and yellow LEDs are based on other semiconductor materials.

In this illustrative example, the first doped semiconductor layer 120 is an n-doped GaN layer, which is epitaxially deposited or otherwise conventionally fabricated on a sapphire growth substrate (not shown). The n-doped GaN semiconductor layer 120 has a first or upper surface 122 and a second or lower surface 124, opposite the first surface 122.

The active region 126 is a GaN-based multiple quantum well structure, which is epitaxially deposited or otherwise conventionally fabricated on the first doped semiconductor layer 120. The GaN-based multiple quantum well active region 126 has a first or upper surface 128, deposited or fabricated on the second surface 124 of the first doped semiconductor layer 120, and a second or lower surface 130, opposite the first surface 128. The active region 126 emits internally generated light in an emitting wavelength range when a voltage is applied across the first reflecting electrode 144 and the second reflecting electrode 138. The emitting wavelength range can include any optical wavelength. For an LED having a multiple quantum well active region 126, the emitting wavelength range typically has a full width of approximately 20 nm at the half-maximum points of the wavelength range. For visual and display applications, preferably the emitting wavelength range is between about 400 nm and about 700 nm.

The second doped semiconductor layer 132 is a p-doped GaN layer, which is epitaxially deposited or otherwise conventionally fabricated on the active region 126. The p-doped GaN semiconductor layer has a first or upper surface 134, epitaxially deposited or otherwise fabricated on the second surface 130 of the active region 126, and a second or lower surface 136, opposite the first surface 134.

The second reflecting electrode 138 of LED 100 is silver and is deposited or otherwise conventionally fabricated on the second doped semiconductor layer 132 by standard means such as evaporation or sputtering. The second reflecting electrode 138 has a first, upper and inner surface 140 fabricated on the second surface 136 of the second doped semiconductor layer, and a second or lower surface 142, opposite the first surface 140. The upper surface 140 of the second reflecting electrode 138 is a reflecting surface for both internally generated light emitted by the active region 126 and externally incident light directed to LED 100.

After the second reflecting electrode 138 is formed on the second doped semiconductor layer 132, a sub-mount or base (such as base 104) is attached to the lower surface 142 of the second reflecting electrode 138. A liftoff process utilizing an excimer laser or a wet etching step removes the original sapphire substrate (not shown), exposing surface 122 of the first doped semiconductor layer 120.

The first reflecting electrode 144 is aluminum, which is deposited or otherwise conventionally fabricated on the first doped semiconductor layer 120. The first reflecting electrode 144 has a first, outer or upper surface 146, and a second, inner or lower surface 148 deposited or fabricated on the first surface 122 of the first doped semiconductor layer 120. The second surface 148 is opposite the first surface 146.

The inner surface 148 of the first reflecting electrode 144 is an inner reflecting surface for the first doped semiconductor layer 120 of LED 100. The outer surface 146 of the first reflecting electrode 144 is an outer reflecting surface for externally incident light directed to LED 100.

The first reflecting electrode 144 only partially covers the surface 122 of the first doped semiconductor layer 120. Portions of the surface 122 of the first doped semiconductor layer 120, not covered by the first reflecting electrode 144, are exposed and those exposed portions of the surface 122 of the first doped semiconductor layer 120 are an output or exit surface for the light emitted by the LED 100.

The reflectivity of LED 100 to externally incident light depends on several factors. These factors include the reflectivity of the first reflecting electrode 144 and the reflectivity of the second reflecting electrode 138. Increasing the reflectivity of the first reflecting electrode 144 and/or the second reflecting electrode 138 will increase the reflectivity of LED 100 to externally incident light.

A common electrode material for the outer surface 146 of the first reflecting electrode in prior art light emitting devices is gold. Gold has very good electrical properties, but is a poor optical reflector for visible light in the range of 400 nm to 550 nm. For LEDs that emit light in the 400 -550 nm range or thereabouts, it is advantageous to replace gold with a more reflective material. In order to improve the reflectivity of LED 100 to externally incident light, preferably the first reflecting electrode 144 has a reflectivity greater than 60 percent in the emitting wavelength range. More preferably, the first reflecting electrode 144 has a reflectivity greater than 80 percent in the emitting wavelength range. Suitable materials for the first reflecting electrode that have a reflectivity greater than 80 percent include aluminum and silver. In the illustrative example for LED 100, the first reflecting electrode is fabricated from aluminum.

The second reflecting electrode 138 covers a larger surface area than the first reflecting electrode 144. Consequently, the reflectivity of the second reflecting electrode is more critical than the reflectivity of the first metal electrode. In order to improve the reflectivity of LED 100 to externally incident light, preferably the reflectivity of the second reflecting electrode 138 is greater than 92 percent in the emitting wavelength range. More preferably the reflectivity of the second reflecting electrode is greater than 96 percent in the emitting wavelength range. Most preferably, the reflectivity of the second reflecting electrode is greater than 98 percent in the emitting wavelength range. A suitable material for the second reflecting electrode that has a reflectivity greater than 98 percent is silver. In the illustrative example for LED 100, the second reflecting electrode 138 is fabricated from silver.

Other factors that affect the overall reflectivity of LED 100 include the absorption coefficients of the LED structure, including the absorption coefficients of the first doped semiconductor layer 120, the active region 126 and the second doped semiconductor layer 132. The absorption coefficients of these layers are important since any externally incident light that is reflected by the second reflecting electrode 138 must pass through these layers. By lowering the absorption coefficients of the first doped semiconductor layer 120, the active region 126 and/or the second doped semiconductor layer 132, the reflectivity of LED 100 to externally incident light will increase.

Usually, the absorption coefficients of the first doped semiconductor layer 120, the active region 126 and the second doped semiconductor layer 132 in LED 100 are not the same. If the different semiconductor layers that make up LED 100 have different absorption coefficients, the absorption coefficient for LED 100 is defined in this specification as the thickness-weighted-average absorption coefficient for all the semiconductor layers in the multilayer semiconductor structure 102. The weighting function is the fractional thickness of each semiconductor layer in the multilayer semiconductor structure 102. In order to improve the reflectivity of LED 100 to externally incident light, preferably the absorption coefficient (i.e. the thickness-weighted average absorption coefficient) of the semiconductor layers in the multilayer semiconductor structure 102 in the emitting wavelength range of the internally generated light is less than 50 $cm^{-1}$.

In prior art GaN-based LEDs, the absorption coefficient of the semiconductor layers in the emitting wavelength range is generally greater than 50 $cm^{-1}$. In order to minimize the absorption coefficient of a LED, the absorption coefficient for each semiconductor layer of the LED must be minimized. This can be accomplished by improving the deposition processes for the different semiconductor layers in order to reduce impurities or defects and to improve the crystalline structure of the layers. For example, hydride vapor phase epitaxy (HVPE) can be used to epitaxially grow the first doped semiconductor layer and the second doped semiconductor layer. HVPE does not have the carbon impurities that can be present in the metal-organic chemical vapor deposition (MOCVD) processes normally used in GaN LED fabrication. Alternatively, if MOCVD is used to deposit the semiconductor layers, a higher deposition temperature can be used to reduce carbon impurities and crystalline defects in the layers. Other alternate processes that lead to improved GaN crystal quality include molecular beam epitaxy (MBE) and high-pressure high-temperature (HPHT) crystal growth.

The overall reflectivity of LED 100 to externally incident light depends on the factors described above. In order to improve the efficiency and output brightness of the projection display systems of this invention, preferably the reflectivity of LED 100 to externally incident light is greater than 40 percent. More preferably, the reflectivity of LED 100 to externally incident light is greater than 50 percent. Most preferably, the reflectivity of LED 100 to externally incident light is greater than 60 percent.

It is well known by those skilled in the art that LED 100 may include additional layers in order to adjust and improve the operation of the LED 100. For example, a current spreading layer may be inserted between the lower surface 148 of the first reflecting electrode 144 and the upper surface 122 of the first doped semiconductor layer 120. Such a current spreading layer will have the same conductivity type as the first doped semiconductor layer and will improve the uniformity of current injection across the entire active region. In addition, a current spreading layer may be inserted between the lower surface 136 of the second doped semiconductor layer and the upper surface 140 of the second reflecting electrode 138. The latter current spreading layer will have the same conductivity type as the second doped semiconductor layer. As another example, an electron blocking layer may inserted either between the lower surface 124 of the first doped semiconductor layer 120 and the upper surface 128 of the active region 126 or between the lower surface 130 of the active region 126 and the upper surface 134 of the second doped semiconductor layer 132. The electron blocking layer reduces the escape of electrons from the active region. If the current spreading layers or the electron blocking layers absorb part of the light passing through the layers, the reflectivity of LED 100 to externally incident light will be reduced. In order to minimize these effects, the absorption coefficients and thicknesses of any current spreading layers and/or electron blocking layers are preferably minimized.

In order to simplify the remainder of the figures in this specification, LED 100 will be illustrated as having three elements, a first reflecting electrode 144, a multilayer semiconductor structure 102 and a second reflecting electrode 138. Internally generated light is emitted by the multilayer semiconductor structure. The first reflecting electrode 144 and the second reflecting electrode 138 reflect externally incident light.

Embodiments of this invention may contain two or more LEDs. Although each LED in the figures is illustrated in an identical manner, it is within the scope of this invention that multiple LEDs in an embodiment may not all be identical. For example, if an embodiment of this invention has a plurality of LEDs, it is also within the scope of this invention that some of the LEDs may emit different colors of light. Example LED colors include, but are not limited to, wavelengths in the infrared, visible and ultraviolet regions of the optical spectrum. For example, one or more of the LEDs in a light-recycling cavity may emit red light, one or more of the LEDs may emit green light and one or more of the LEDs may emit blue light. If an embodiment, for example, contains LEDs that emit red, green and blue light, then the red, green and blue colors may be emitted concurrently to produce a single composite output color such as white light. Alternatively, the red, green and blue colors may each be emitted at different times to produce different colors in different time periods. The latter mode of operation is normally called color sequential or field sequential operation.

The projection display systems of this invention include at least one light-recycling illumination system and at least one imaging light modulator. The light-recycling illumination system is a light-recycling cavity having a light output aperture. LEDs are disposed on the inside surfaces of the light-recycling cavity.

Each LED in FIGS. 5-11 and FIGS. 17-20 is illustrated with a first reflecting electrode 144, a multilayer semiconductor structure 102 that emits internally generated light, and a second reflecting electrode 138. The first reflecting electrode of each LED faces the interior of the light-recycling cavity and the second reflecting electrode is positioned behind the emitting layer and adjacent to the inside surface of the light-recycling cavity. In this configuration, light can be emitted from all surfaces of the multilayer semiconductor structure that are not in contact with the first reflecting electrode and the second reflecting electrode.

The light-recycling illumination system contains a plurality of LEDs. For a single LED, the light emitting area is defined as the area of the active region 126 or, equivalently, the area of the multilayer semiconductor structure 102. The total light-emitting area of the plurality of LEDs is the sum of the areas of all of the active regions of the plurality of LEDs or, equivalently, the sum of the areas of all of the multilayer semiconductor structures of the plurality of LEDs. The total light-emitting area of the plurality of LEDs is denoted as area $A_{LED}$.

The plurality of LEDs has a maximum intrinsic source luminance that depends on the design of the LEDs and the driving electrical power applied to the LEDs. The maximum intrinsic source luminance is determined in the following manner. First, the luminance is measured for each LED in the plurality of LEDS when the light-recycling cavity is not present and when no other LED is directing light to the LED under measurement. The measurements are done with each LED powered at the same level as in the illumination system and are done as a function of emitting angle. From these luminance measurements, a single maximum luminance value can be determined for all the LEDs. This maximum value is defined as the maximum intrinsic source luminance.

The light-recycling cavity of this invention is a light-reflecting element that at least partially encloses the light source. The light-recycling cavity may be any three-dimensional surface that encloses an interior volume. For example, the surface of the light-recycling cavity may be in the shape of a cube, a rectangular three-dimensional surface, a sphere, a spheroid, an ellipsoid, an arbitrary three-dimensional faceted surface or an arbitrary three-dimensional curved surface. Preferably the three-dimensional shape of the light-recycling cavity is a faceted surface with flat sides in order to facilitate the attachment of the LEDs to the inside surfaces of the envelope. In general, LEDs are usually flat and the manufacture of the light-recycling cavity will be easier if the surfaces to which the LEDs are attached are also flat. Preferable three-dimensional shapes have a cross-section that is a square, a rectangle or a polygon.

The light-recycling cavity reflects and recycles a portion of the light emitted by the light source back to the light source. Preferably the reflectivity $R_E$ of the inside surfaces of the light-recycling cavity is at least 50%. More preferably, the reflectivity $R_E$ is at least 70%. Most preferably, the reflectivity $R_E$ is at least 90%. Ideally, the reflectivity $R_E$ should be as close to 100% as possible in order to maximize the efficiency and exiting luminance of the illumination system.

The light-recycling cavity may be fabricated from a bulk material that is intrinsically reflective. A bulk material that is intrinsically reflective may be a diffuse reflector or a specular reflector. Preferably a bulk material that is intrinsically reflective is a diffuse reflector. Diffuse reflectors reflect light rays in random directions and prevent reflected light from being trapped in cyclically repeating pathways. Specular reflectors reflect light rays such that the angle of reflection is equal to the angle of incidence.

Alternatively, if the light-recycling cavity is not fabricated from an intrinsically reflective material, the interior surfaces of the light-recycling cavity must be covered with a reflective coating. The reflective coating may be a specular reflector, a diffuse reflector or a diffuse reflector that is backed with a specular reflector.

Diffuse reflectors can be made that have very high reflectivity (for example, greater than 98%). Examples of diffuse reflectors include, but are not limited to, fluoropolymer materials such as Spectralon™ from Labsphere, Inc. and polytetrafluoroethylene film from manufacturers such as Fluorglas (sold under the trade name Furon™), W.L. Gore and Associates, Inc. (sold under the trade name DRP™), or E.I. du Pont de Nemours & Company (sold under the trade name of Teflon™), films of barium sulfate, porous polymer films containing tiny air channels such as polyethersulfone and polypropylene filter materials made by Pall Gelman Sciences, and polymer composites utilizing reflective filler materials such as, for example, titanium dioxide. A preferred diffuse reflecting material is DRP™ made by W.L. Gore and Associates, Inc. Note that the thickness of a diffuse reflector needed to achieve high reflectivity can be reduced if a specular reflector is used as a backing layer on the diffuse reflector.

Most specular reflective materials have reflectivity ranging from about 80% to about 98.5%. Examples of specular reflective materials include, but are not limited to, Silverlux™, a product of 3M Corporation, and other carrier films of plastic that have been coated with a thin metallic layer such as silver, aluminum or gold. The thickness of the metallic coating may range from about 0.05 micrometers to about 0.1 millimeter, depending on the materials used and the method of manufacturing the metal coating. Other examples of specular reflective films that have high reflectivity include photonic bandgap reflective materials and Vikuiti™ ESR (Enhanced Specular Reflector) made by 3M Corporation. The ESR film has a reflectivity of greater than 98% across the visible light spectrum.

The interior volume of the light-recycling cavity that is not occupied by the light source may be occupied by a vacuum, may be filled with a light transmitting gas or may be filled or partially filled with a light-transmitting solid. Any gas or solid that fills or partially fills the light-recycling cavity should transmit light emitted by the light source. Examples of light-transmitting gases are air, nitrogen and inert gases such as argon. Examples of light-transmitting solids include inorganic glasses such as silicon dioxide or sapphire and organic polymers such as polymethylmethacrylate, polystyrene, polycarbonate or a silicone-containing material.

The interior volume of the light-recycling cavity may also contain a wavelength conversion layer. Illumination systems that contain a wavelength conversion layer are described in U.S. patent application Ser. No. 10/814,044 entitled "ILLUMINATION SYSTEMS UTILIZING MULTIPLE WAVELENGTH LIGHT RECYCLING," which is herein incorporated by reference. For example, red light may be produced by an illumination system that incorporates an LED that emits red light or red light may be produced by an illumination system that incorporates an LED that emits ultraviolet light and that also incorporates a wavelength conversion layer that converts the ultraviolet light to red light.

The light-recycling cavity has a light output aperture. The LEDs and the light-recycling cavity direct at least a fraction of the internally generated light emitted by the LEDs and the externally incident light reflected by the first reflecting electrode and the second reflecting electrode of each LED out of the light-recycling cavity through the light output aperture as incoherent light having a maximum exiting luminance. The total light output aperture area is area $A_O$. The area $A_O$ is less than the total light-emitting area $A_{LED}$ of the plurality of LEDs in the light-recycling cavity. An output aperture may have any shape including, but not limited to, a square, a rectangle, a polygon, a circle, an ellipse, an arbitrary faceted shape or an arbitrary curved shape. Preferred shapes include rectangular shapes that have the same length-to-width aspect ratio as the imaging light modulators used in the projection display system. For example, if the imaging light modulator is a rectangle that has a length-to-width aspect ratio of 16:9, then preferably the shape of the light output aperture is a rectangle that also has a length-to-width aspect ratio of 16:9.

Various embodiments of this invention that utilize light recycling will now be described.

Figure 5A:
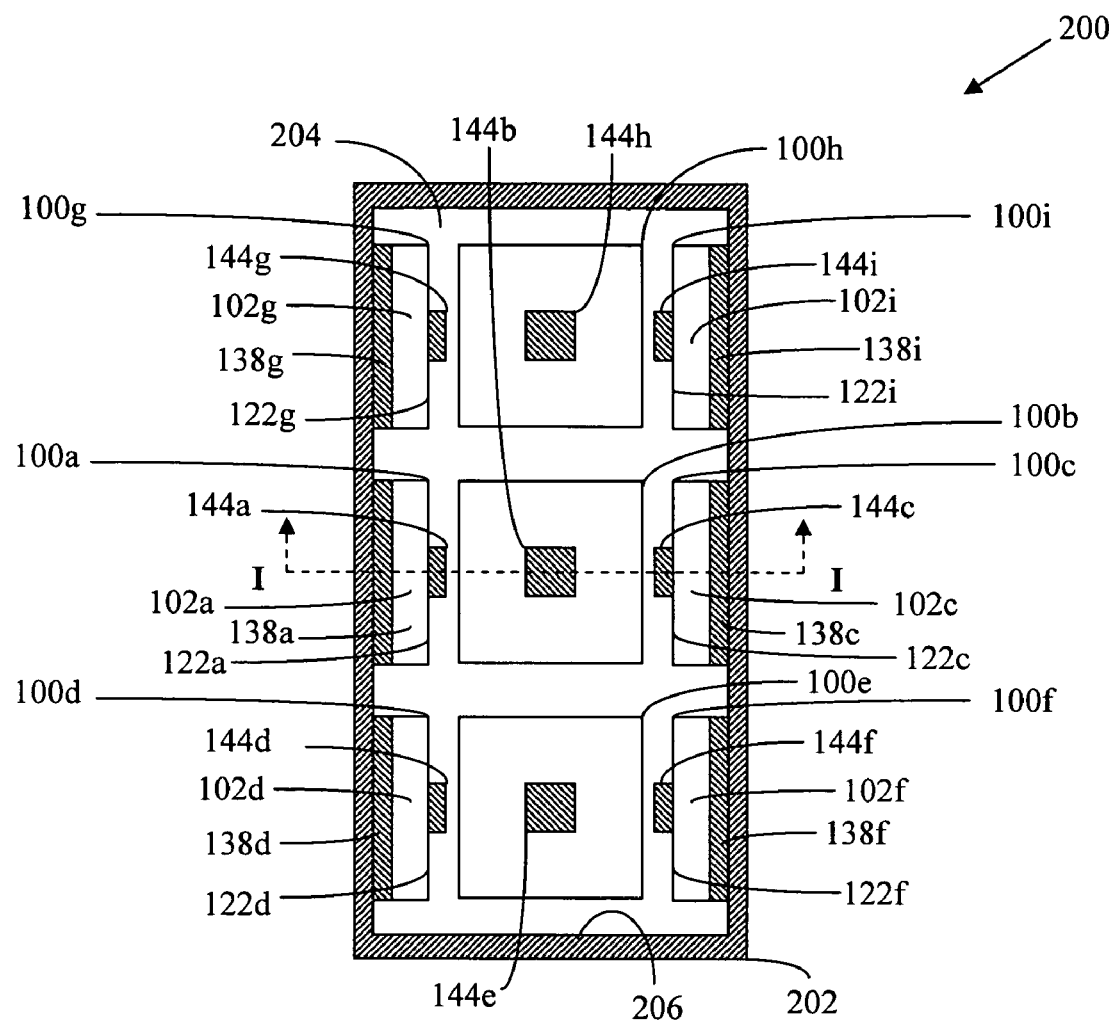
FIG. 5A is a top plan view of a light-recycling cavity of this invention that includes nine light-emitting diodes.
Figure 5B:
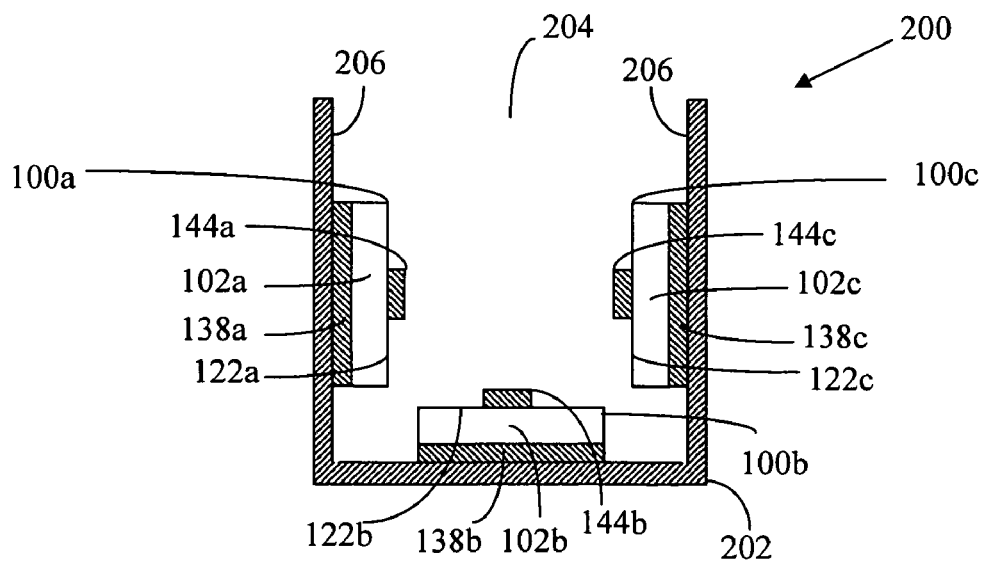
FIGS. 5B-5F are side cross-sectional views along the I-I plane of the light-recycling cavity shown in FIG. 5A.

One embodiment of this invention is light-recycling illumination system 200 shown FIGS. 5A-5F. FIG. 5A is a top plan view of illumination system 200 looking down into light-recycling cavity 202 through the light output aperture 204 and showing nine LEDs lining the inside surfaces 206 of the envelope. The number of LEDs was chosen to be nine only for illustrative purposes. Illumination system 200 can have more or less than nine LEDs. The nine LEDs are labeled 100a, 100b, 100c, 100d, 100e, 100f, 100g, 100h and 100i. FIG. 5B is a side cross-sectional view along the I-I plane indicated in FIG. 5A. Side cross-sectional views in FIGS. 5C-5F show the paths of some representative light rays emitted from the LEDs.

The rectangular three-dimensional shape of the surface of the light-recycling cavity 202, the square cross-sectional shape of the light-recycling cavity 202 along the I-I plane and the rectangular shape of the light output aperture 204 are illustrative examples used for ease of understanding of the descriptions. It should also be noted that the drawing is merely a representation of the structure; the actual and relative dimensions may be different.

As noted previously, the light-recycling cavity 202 may be any three-dimensional surface that encloses an interior volume. For example, the surface of the light-recycling cavity may be in the shape of a cube, a rectangular three-dimensional surface, a sphere, a spheroid, an ellipsoid, an arbitrary three-dimensional faceted surface or an arbitrary three-dimensional curved surface. Preferably the three-dimensional shape of the light-recycling cavity is a faceted surface with flat sides in order to facilitate the attachment of LEDs to the inside surfaces of the envelope. The only requirement for the three-dimensional shape of the light-recycling cavity 202 is that a fraction of any light emitted from an LED within the light-recycling cavity must also exit from the light output aperture of the light-recycling cavity within a finite number of reflections within the light-recycling cavity, i.e. there are no reflective dead spots within the light-recycling cavity where the light emitted from the LED will endlessly reflect without exiting the light-recycling cavity through the light output aperture.

The cross-section of the light-recycling cavity 202, such as the square cross-section shown in FIG. 5B of I-I plane indicated in FIG. 5A, may have any shape, both regular and irregular, depending on the shape of the three-dimensional surface. Other examples of possible cross-sectional shapes include a rectangle, a taper, a polygon, a circle, an ellipse, an arbitrary faceted shape or an arbitrary curved shape. Preferable cross-sectional shapes are a square, a rectangle or a polygon.

In light-recycling illumination system 200, the inside surfaces of the light-recycling cavity 202, except for the area covered by the nine LEDs and the area occupied by the light output aperture 204, are light reflecting surfaces. The reflecting surfaces recycle a portion of the light emitted by the light source back to the light source. In order to achieve high light reflectivity, the light-recycling cavity 202 may be fabricated from a bulk material that is intrinsically reflective or the inside surfaces of the light-recycling cavity 202 may be covered with a reflective coating. The bulk material or the reflective coating may be a specular reflector, a diffuse reflector or a diffuse reflector that is backed with a specular reflector. Preferably the bulk reflective material or the reflective coating is a diffuse reflector. Examples of reflective materials were described previously. Preferably the reflectivity $R_E$ of the inside surfaces of the light-recycling cavity 202 that are not occupied by the nine LEDs and the light output aperture 204 is at least 50%. More preferably, the reflectivity $R_E$ is at least 70%. Most preferably, the reflectivity $R_E$ is at least 90%. Ideally, the reflectivity $R_E$ should be as close to 100% as possible in order to maximize the efficiency and the maximum exiting luminance of the illumination system.

The square cross-sectional shape of illumination system 200 shown in FIG. 5B has a first side containing the light output aperture 204, a second side, a third side and a fourth side. The first side is opposite and parallel to the third side. The second side is opposite and parallel to the fourth side. The first side and third side are perpendicular to the second side and fourth side. The four sides of the illumination system shown in cross-section in FIG. 5C plus the two remaining sides (not shown in the cross-sectional view) of the six-sided rectangular surface form the interior of the light-recycling cavity.

The light source for light-recycling illumination system 200 is a plurality of LEDs labeled 100a, 100b, 100c, 100d, 100e, 100f, 100g, 100h and 100i. The number of LEDs was chosen to be nine only for illustrative purposes. The LEDs emit internally generated light of any optical wavelength or range of wavelengths. The nine LEDs may all emit internally generated light of the same wavelength or the nine LEDs may emit light of two or more wavelengths. In FIGS. 5B, LED 100a is positioned interior to the second side of the illumination system. As shown in FIG. 5A, LED 100d and LED 100g are also positioned on the second side of illumination system 200. LEDs 100b, 100e and 100h are positioned on the third side of illumination system 200. LEDs 100c, 100f and 100i are positioned on the fourth side. Preferably the wavelength or wavelengths of light emitted by each of the nine LEDs is greater than about 200 nanometers and less than about 700 nanometers. If there is no wavelength conversion layer inside light-recycling cavity to convert ultraviolet light to visible light, preferably the wavelength is greater than about 400 nanometers and less than about 700 nanometers. The total light-emitting area of the plurality of LEDs in light-recycling illumination system 200 is area $A_{LED}$.

Each LED has a first reflecting electrode, a multilayer semiconductor structure that emits internally generated light and a second reflecting electrode. For example in FIG. 5B, LED 100a has a first reflecting electrode 144a, a multilayer semiconductor structure 102a and a second reflecting electrode 138a. The first reflecting electrode of each LED extends into the interior of the light-recycling cavity. The second reflecting electrode of each LED is adjacent to the inside surfaces 206 of the light-recycling cavity. For example, the second reflecting electrode 138a of LED 100a is adjacent to the second side of the light-recycling cavity. The second reflecting electrode 138b of LED 100b is adjacent to the third side of the light-recycling cavity. The second reflecting electrode 138c of LED 100c is adjacent to the fourth side of the light-recycling cavity.

The light output aperture 204 is in the first side of the illumination system. A fraction of the internally generated light emitted from the plurality of LEDs exits the light output aperture. Furthermore, a fraction of the light reflected and recycled back to the LEDs as externally incident light by the inside surfaces of the light-recycling cavity and by the first reflecting electrodes and the second reflecting electrodes of the plurality of LEDs exits the light output aperture. As noted, the aperture may have any shape including, but not limited to, a square, a rectangle, a polygon, a circle, an ellipse, an arbitrary faceted shape or an arbitrary curved shape. The total light output aperture area is area $A_O$.

Light may be emitted from multilayer semiconductor structure of each LED through one or more of the surfaces of multilayer semiconductor structure that do not contact the first reflecting electrode or the second reflecting electrode. For example, light may be emitted through surface 122a of LED 100a, surface 122b of LED 100b, surface 122c of LED 100c, surface 122d of LED 100d, surface 122e of LED 100e, surface 122f of LED 100f, surface 122g of LED 100g, surface 122h of LED 100h and surface 122i of LED 100i. FIGS. 5C-5F show illustrative examples of light rays emitted through surface 122a of LED 100a located on the second side of light-recycling illumination system 200. The other eight LEDs can emit light in a similar manner.

Figure 5C:
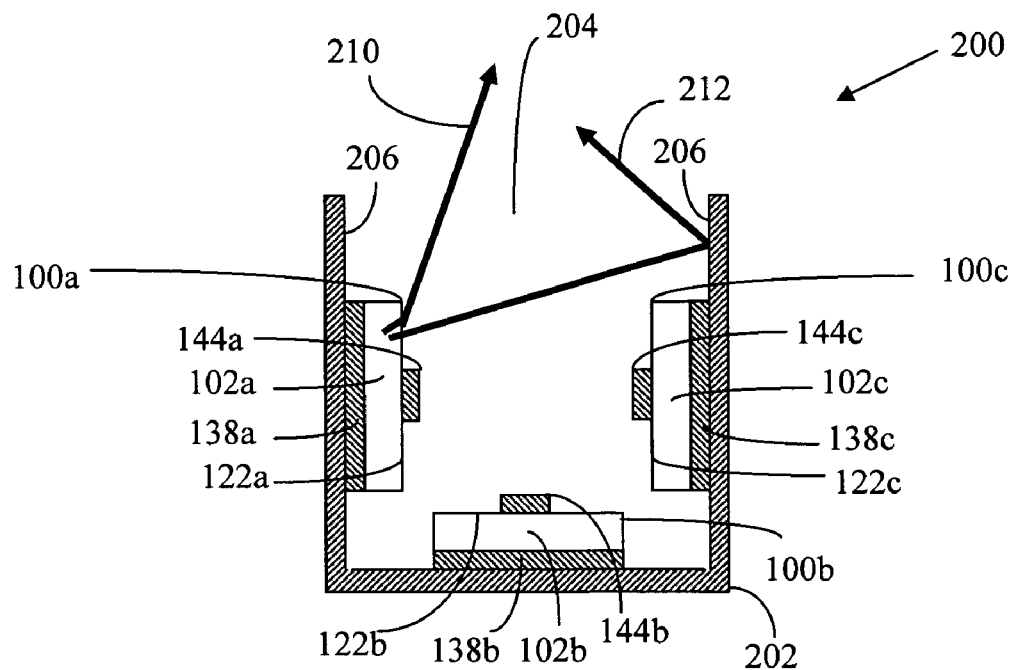

In FIG. 5C, a first light ray 210 is emitted from the multilayer semiconductor structure 102a through surface 122a of LED 100a on the second side, passes through the interior of the light-recycling cavity 202 and exits through the light output aperture 204 on the first side without reflecting off the reflecting sides of the light-recycling cavity and without reflecting off the other eight LEDs.

A second light ray 212 is emitted from the multilayer semiconductor structure 102a through surface 122a of LED 100a on the second side, passes through the interior of the light-recycling cavity and is reflected by inside surface 206 of the light-recycling cavity 202 on the fourth side. The reflected ray 212 then passes through the interior of the light-recycling cavity to exit through the light output aperture 204 on the first side. This is merely an illustrative example since the second ray 212 can reflect a finite number of times from the reflective surfaces of any and all of the sides and any and all of the LEDs before exiting the light-recycling cavity through the light output aperture.

Figure 5D:
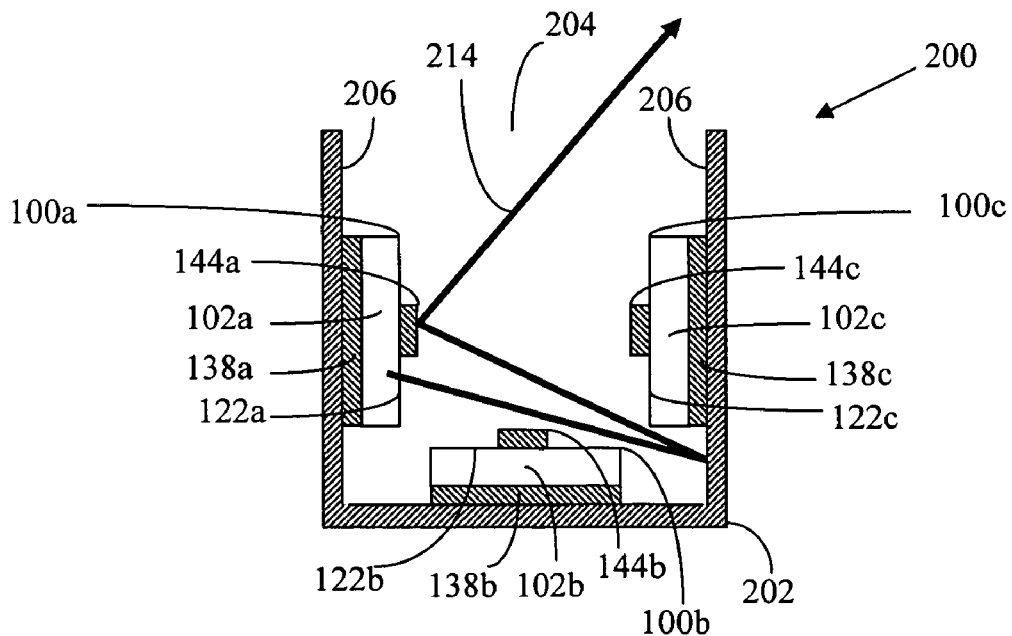

In FIG. 5D, a third light ray 214 is emitted from the multilayer semiconductor structure 102a through surface 122a of LED 100a on the second side in a first time period, passes through the interior of the light-recycling cavity 102 and is reflected by the inside surface 206 of the light-recycling cavity 202 on the fourth side. Third light ray 214 then passes through the interior of the light-recycling cavity and is directed to the first reflecting electrode 144a of LED 100a on the second side as externally incident light. Third light ray 214 is reflected by the first reflecting electrode 144a in a second time period, passes though the interior of the light-recycling cavity and exits the light-recycling cavity through the light output aperture 204 on the first side. When the third light ray 214 reflects off the first reflecting electrode 144a of LED 100a in a second time period, it adds to light concurrently being emitted by LED 100a in the second time period, thereby increasing the effective brightness (luminance) of LED 100a.

Third light ray 214 was reflected by the inside surface 206 and by the first reflecting electrode 144a. In general, however, the first reflecting electrode 144a and the inside surfaces 206 of the light-recycling cavity are not perfect reflectors and have a reflectivity less than 100%. In addition, some of the internally generated light, such as first light ray 210, will exit the light output aperture without reflection. Only a portion of the internally generated light, such as third light ray 214, will be recycled back to the LEDs as externally incident light. Only a fraction of the internally generated light and the recycled externally incident light will exit through the light-output aperture.

Figure 5E:
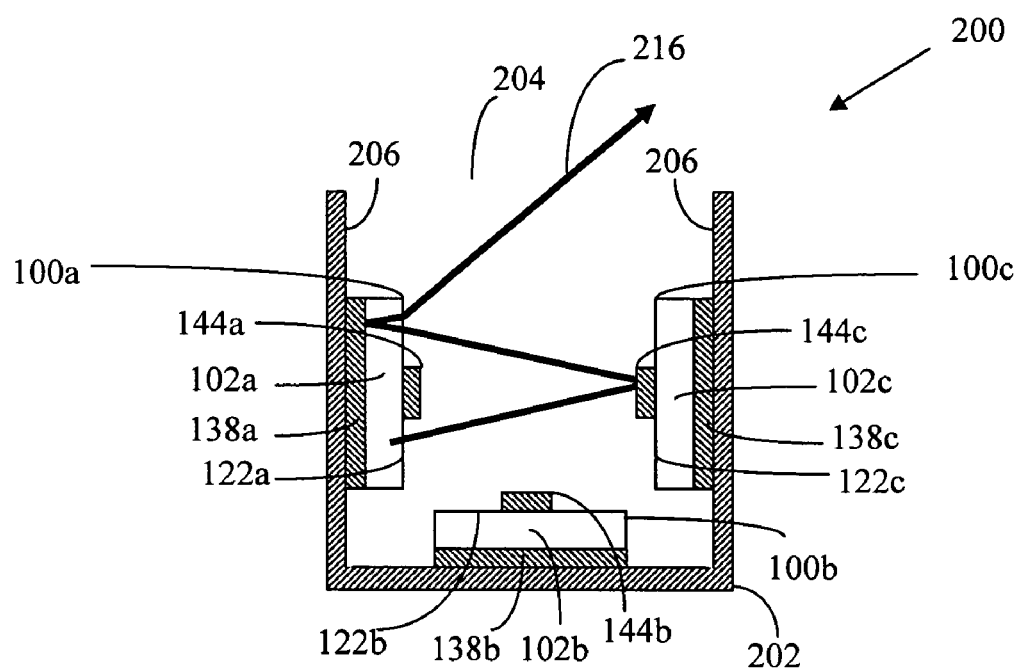

In FIG. 5E, a fourth light ray 216 is emitted from the multilayer semiconductor structure 102a through surface 122a of LED 100a on the second side during a first time period, passes through the interior of the light-recycling cavity 202 and is reflected by the first reflecting electrode 144c of LED 100c on the fourth side. The reflected fourth light ray passes through the interior of the light-recycling cavity and is recycled back to LED 100a on the second side as externally incident light. The fourth light ray 216 is transmitted through surface 122a and the multilayer semiconductor structure 102a of LED 100a to reflect off the second reflecting electrode 138a LED 100a. The fourth light ray 216 is transmitted through the multilayer semiconductor structure 102a and through the surface 122a during a second time period, passes through the interior of the light-recycling cavity and finally exits the light output aperture 204. When the fourth light ray 216 is transmitted through surface 122a of LED 100a in a second time period, it adds to light concurrently being emitted by LED 100a in the second time period, thereby increasing the effective brightness (luminance) of LED 100a. In addition, the reflection of the fourth light ray 216 from the first reflecting electrode 144c of LED 100c increases the effective brightness of LED 100c.

Figure 5F:
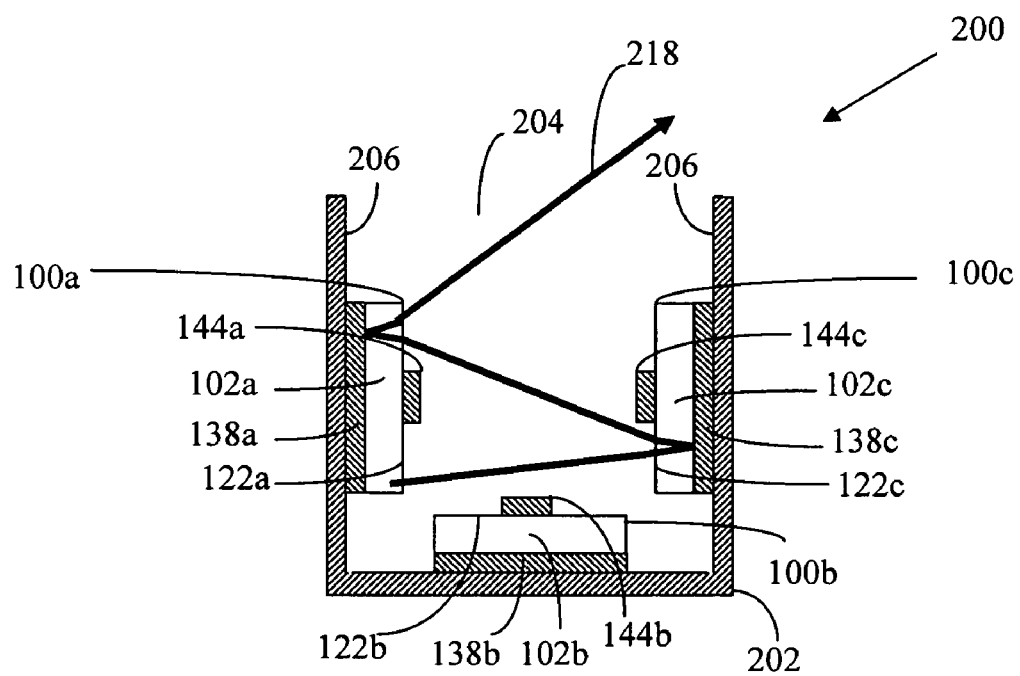

In FIG. 5F, a fifth light ray 218 is emitted from the multilayer semiconductor structure 102a through surface 122a of LED 100a on the second side during a first time period, passes through the interior of the light-recycling cavity 202 and is directed to LED 100c on the fourth side. Fifth light ray 218 passes through surface 122c, passes through the multilayer semiconductor structure 102c and is directed to the second reflecting electrode 138c of LED 100c. Fifth light ray 218 is reflected by the second reflecting electrode 138c of LED 100c on the fourth side. The reflected fifth light ray passes through the multilayer semiconductor structure 102c, passes through surface 122c and is recycled back through the interior of the light-recycling cavity to LED 100a on the second side as externally incident light. The fifth light ray 218 is transmitted through surface 122a and the multilayer semiconductor structure 102a of LED 100a to reflect off the second reflecting electrode 138a LED 100a. The fifth light ray 218 is transmitted through the multilayer semiconductor structure 102a and through the surface 122a during a second time period, passes through the interior of the light-recycling cavity and finally exits the light output aperture 204. When the fifth light ray 218 is transmitted through surface 122a of LED 100a in a second time period, it adds to light concurrently being emitted by LED 100a in the second time period, thereby increasing the effective brightness (luminance) of LED 100a. In addition, the reflection of the fifth light ray 218 from the second reflecting electrode 138c of LED 100c increases the effective brightness of LED 100c.

Light rays 210 and 212 are not recycled back to the light source. Light rays 214, 216 and 218 are recycled back to the light source. Only a portion of the light emitted by the light source is recycled back to the light source.

When light rays 214, 216 and 218 are recycled back to LED 100a and are reflected by LED 100a in a second time period, the rays increase the effective brightness of LED 100a so that the effective brightness is then higher than the maximum intrinsic brightness of LED 100a measured in the absence of light recycling.

The maximum exiting luminance of the light exiting the light output aperture cannot be greater than the effective luminance of the light source. However, by utilizing a light-recycling cavity to recycle a portion of the light emitted by the light source back to the first reflecting electrodes and the second reflecting electrodes of the plurality of LEDs, the effective luminance of the LEDs can be increased so that the maximum exiting luminance of the light exiting the light output aperture can then be greater than the maximum intrinsic source luminance of the LEDs measured in the absence of light recycling. Note that when the maximum exiting luminance of the light exiting the light output aperture of illumination system 200 is compared to the maximum intrinsic source luminance of identical LEDs in the absence of light recycling, the LEDs of the illumination system 200 and the identical LEDs used in the reference measurement are of the same design and are operated at the same electrical power. Also note that measuring the exiting luminance over the full range of exiting angles and selecting the maximum luminance value determines the maximum exiting luminance.

The fourth light ray 216 and the fifth light ray 218 will usually be unaffected transmitting through the multilayer semiconductor structure 102a of LED 100a whether the multilayer semiconductor structure 102a is emitting light or not. The fourth light ray 216 and the fifth light ray 218 could, alternatively, reflect off the light-recycling cavity on the first or third side before reflecting off the second reflecting electrode 138a of LED 100a on the second side. This is merely an illustrative example since light rays 216 and 218 can reflect a finite number of times from the reflective surfaces of any and all the sides before or after reflecting off the first reflecting electrodes or the second reflecting electrode of any of the LEDs, once or any finite number of times, before the light rays 216 and 218 exit the light-recycling cavity through the light output aperture 204.

The maximum reflectivity of the inside surfaces of light-recycling illumination system 200 and the resulting maximum exiting luminance exiting from the light output aperture 204 is achieved by preferably having the entire interior surfaces of illumination system 200 be reflective except for the total area $A_O$ of the output aperture 204. The total inside area of the light-recycling cavity is $A_T$, which includes area $A_O$ and the total light-emitting area $A_{LED}$ of the plurality of LEDs.

The plurality of LEDs have first reflecting electrodes and second reflecting electrodes that reflect light. The plurality of LEDs has total light-emitting area $A_{LED}$. The remaining inside area of the light-recycling cavity that is not covered by the total light-emitting area $A_{LED}$ of the LEDs and the area $A_O$ of the output aperture is denoted as remaining area $A_R$. Preferably the entire remaining area $A_R$ of the light-recycling cavity should have a reflective surface of reflectivity $R_E$ to maximize the luminance exiting from the light output aperture or apertures. As noted previously, the reflectivity $R_E$ is preferably at least 50%. More preferably, the reflectivity $R_E$ is at least 70%. Most preferably, the reflectivity $R_E$ is at least 90%. Ideally the reflectivity $R_E$ should be as close to 100% as possible in order to maximize the efficiency and the maximum exiting luminance of the illumination system.

Since the area $A_{LED}$ and the area $A_R$ are not perfect reflectors and do absorb some of the light during each reflection, the maximum illumination system efficiency and the maximum exiting luminance are achieved by minimizing the number of light reflections. For a given fixed total light-emitting area $A_{LED}$ and a given fixed total area $A_O$ of the light output aperture, the maximum exiting luminance directed from the light output aperture is achieved by minimizing the remaining area $A_R$ in order to minimize the number of reflections. Usually it is not possible for the remaining area $A_R$ to be zero, however, since it is usually not possible to arrange the LEDs in the illumination system to cover the entire area of the light-recycling cavity that is not occupied by the light output aperture.

The light-recycling illumination system 200 can achieve an enhanced maximum exiting luminance that is greater than the maximum intrinsic source luminance of the light source only if the total light output aperture area $A_O$ of the light output aperture 204 is less than the total light-emitting area $A_{LED}$ of the plurality of LEDs. This area requirement for exiting luminance enhancement can be understood from the following theoretical examples. First assume that the inside surfaces of a theoretical illumination system have no absorption losses, i.e. areas $A_{LED}$ and $A_R$ all have 100% reflectivity. Also assume that the plurality of LEDs emits light in a Lambertian distribution. Note that a Lambertian emitter is an emitter that has a constant luminance for all emitting angles from −90 degrees to +90 degrees.

If the light output area $A_O$ is equal to the total light-emitting area $A_{LED}$, then all the light flux emitted by the source will exit the theoretical illumination system in the same area and will, in most cases, will have the same Lambertian distribution. If the output distribution of the light exiting the light output aperture is Lambertian, then the exiting luminance will be equal to the maximum intrinsic source luminance.

If the light output area $A_O$ of the theoretical illumination system is larger than the total light-emitting area $A_{LED}$, the light exiting the light output aperture can have the same Lambertian distribution but will have a maximum exiting luminance that is less than the maximum intrinsic source luminance due to the output light flux being spread over a larger area. The exiting luminance directed from the light output aperture will be lower by a factor of $A_{LED}/A_O$.

If the light output area $A_O$ of the theoretical illumination system is smaller than the total light-emitting area $A_{LED}$ and no light is lost or absorbed inside the illumination system, the light exiting the light output area can have the same Lambertian distribution but will have a maximum exiting luminance that is greater than the maximum intrinsic source luminance due to the reduced area of the light output aperture. The maximum exiting luminance directed from the light output aperture will be greater by a factor of $A_{LED}/A_O$. To achieve a maximum exiting luminance that is greater than the maximum intrinsic source luminance, it is therefore a requirement that the output area $A_O$ be less than the total light-emitting area $A_{LED}$.

However, the area requirement that $A_O$ must be less than $A_{LED}$ is not the only requirement needed in order to achieve an enhancement of the maximum exiting luminance in an illumination system. In a typical illumination system, the reflectivity of the first reflecting electrodes and the second reflecting electrodes of the LEDs and the reflectivity $R_E$ will be less than 100%, which will lower the maximum exiting luminance enhancement. Light that does not exit the light output aperture 204 on the first attempt may be absorbed by the plurality of LEDs or the light-recycling cavity as it is reflected one or more times inside the light-recycling cavity. These losses will reduce the exiting luminance. Therefore, in order to achieve an enhancement of the maximum exiting luminance in a typical illumination system, reflectivity of the first reflecting electrodes and the second reflecting electrodes of the LEDs and the reflectivity $R_E$ must be relatively high even if they are not 100%. The preferred values for the reflectivity of the first reflecting electrodes and the second reflecting electrodes of the LEDs and for $R_E$ were listed previously.

Furthermore, in a typical illumination system, the light source may not emit light in a wide Lambertian (−90 degrees to +90 degrees) angular distribution but in a narrower angular distribution. When a light source initially emits light in a narrow angular distribution and when the emitted light then undergoes multiple reflections inside the illumination system, the light exiting the light output aperture will have a wider angular distribution than the initial angular distribution. The output distribution can approximate a Lambertian distribution. Expanding the original narrow angular distribution to a wider output distribution inside the illumination system also reduces the maximum exiting luminance of the light exiting the light output aperture. Therefore, in order to achieve an enhancement of the maximum exiting luminance in a typical illumination system, the angular distribution of the light emitted by the light source should be as close to a Lambertian distribution as possible.

The maximum theoretical luminance enhancement is given by the ratio of the areas $A_{LED}/A_O$ as shown above. For example, if $A_{LED}$ equals 30 mm$^2$ and $A_O$ equals 10 mm$^2$, then the maximum theoretical exiting luminance enhancement is $A_{LED}/A_O$ or 3. The maximum value is achieved only if the LED is a Lambertian emitter and only if the reflectivity of the first reflecting electrodes and the second reflecting electrodes of the LEDs and the reflectivity $R_E$ each equal 100%. If the LEDs are not a perfect Lambertian emitter or if the reflectivity of the first reflecting electrodes and the second reflecting electrodes of the LEDs and the reflectivity $R_E$ are each less than 100%, as is normally the case, enhancement of the maximum exiting luminance can still be achieved but the enhancement will be less than the maximum theoretical value. In such cases, the area $A_O$ may need to be significantly less than $A_{LED}$ in order to achieve a maximum exiting luminance that is greater than the maximum intrinsic source luminance. Preferably, the area $A_O$ of the light output aperture 204 is less than or equal to 50% of the total light-emitting area $A_{LED}$ of the plurality of LEDs. In addition, for some applications it is desirable that the area $A_O$ of the light output aperture 204 be small and comparable in size to the area of an arc lamp source. For those applications, preferably the area $A_O$ of the light output aperture 204 is less than 25 mm$^2$ in area. More preferably, the area $A_O$ of the light output aperture 204 is less than 10 mm$^2$.

Figure 6:
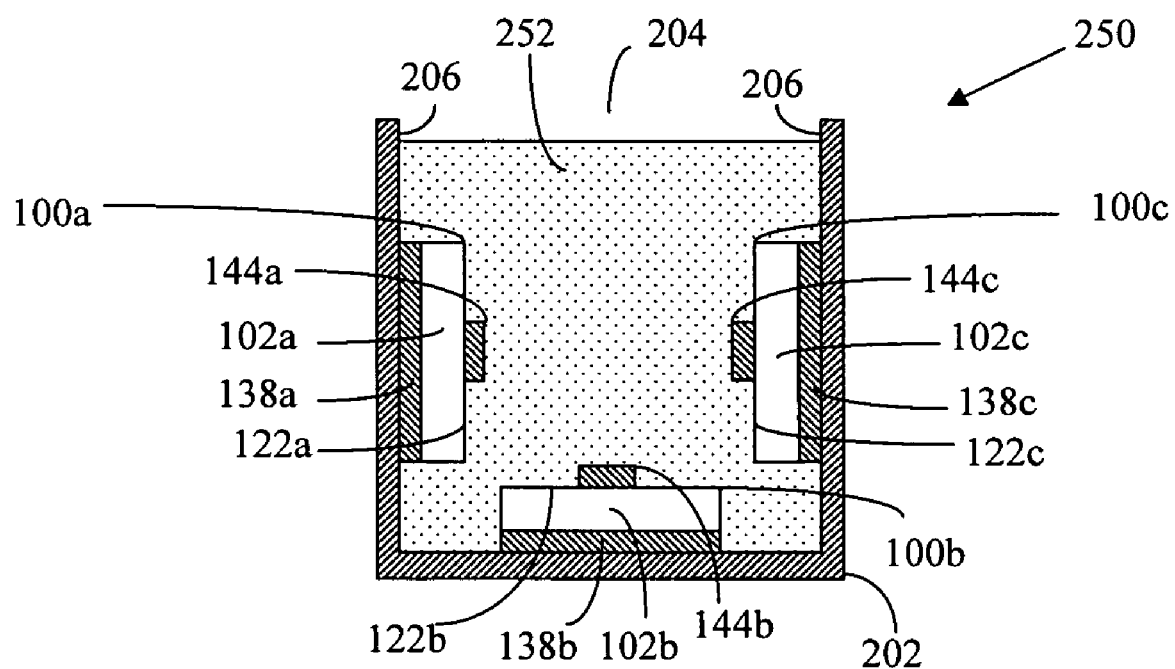
FIG. 6 is a side cross-sectional view of an embodiment of this invention in which the light-recycling cavity is substantially filled with a light-transmitting solid.

Another embodiment of this invention is shown in side cross-section in FIG. 6. Light-recycling illumination system 250 is identical to light-recycling illumination system 200 except that the interior volume of the light-recycling cavity 202 is substantially filled with a light-transmitting solid 252. Alternatively, light-transmitting solid 252 can partially fill or completely fill the light-recycling cavity.

Preferably the light-transmitting solid 252 is in contact with a light output surfaces of LEDs. For example, the light-transmitting solid 252 is in contact with surface 122a of LED 100a, surface 122b of LED 100b and surface 122c of LED 100c. The surfaces 122 of the other LEDs are also in contact with light-transmitting solid 252 but are not shown in this cross-sectional view. By placing a light-transmitting solid in contact with a light output surfaces of the LEDs, the difference in refractive index between the light output surfaces and the environment external to the light output surfaces will be reduced relative to having air at the interface of the light output surfaces. Reducing the refractive index difference reduces the amount of light that undergoes total internal reflection inside the LEDs and increases the efficiency of light emission from the LEDs. This effect can result in an overall increase in the efficiency of the illumination system. The highest efficiency of light emission from the LEDs will occur if the effective refractive index of the light-transmitting solid is equal to or greater than the refractive index of the light output surface.

If necessary, the effective refractive index of the light transmitting solid 252 can be increased by incorporating ultrafine powders of high index materials into the light-transmitting solid. Preferably, the ultrafine powders are made from materials having a bulk index of refraction greater than 1.60. Ultrafine powders are powders with particle sizes less than about 300 nanometers. Exemplary ultrafine powders can be made from materials such as, for example, tin oxide, titanium oxide, zinc oxide, cerium oxide and antimony pentoxide.

As mentioned previously, a wavelength conversion layer can be formed inside the light-recycling cavity. One way this can be accomplished is by incorporating a wavelength conversion material in the light-transmitting solid 252. The wavelength conversion material converts a portion of the light of a first color emitted by the light source into light of a second color, different than the light of a first color. Wavelength conversion materials include powdered phosphor materials, quantum dot materials, luminescent dopant materials or a plurality of such materials.

Powdered phosphor materials are typically optical inorganic materials doped with ions of lanthanide (rare earth) elements or, alternatively, ions such as chromium, titanium, vanadium, cobalt or neodymium. The lanthanide elements are lanthanum, cerium, praseodymium, neodymium, promethium, samarium, europium, gadolinium, terbium, dysprosium, holmium, erbium, thulium, ytterbium and lutetium. Optical inorganic materials include, but are not limited to, sapphire ($Al_2O_3$), gallium arsenide (GaAs), beryllium aluminum oxide ($BeAl_2O_4$), magnesium fluoride ($MgF_2$), indium phosphide (InP), gallium phosphide (GaP), yttrium aluminum garnet (YAG or $Y_3Al_5O_{12}$), terbium-containing garnet, yttrium-aluminum-lanthanide oxide compounds, yttrium-aluminum-lanthanide-gallium oxide compounds, yttrium oxide ($Y_2O_3$), calcium or strontium or barium halophosphates $(Ca,Sr,Ba)_5(PO_4)_3(Cl,F)$, the compound $CeMgAl_{11}O_{19}$, lanthanum phosphate ($LaPO_4$), lanthanide pentaborate materials ((lanthanide)(Mg,Zn)$B_5O_{10}$), the compound $BaMgAl_{10}l_{17}$, the compound $SrGa_2S_4$, the compounds $(Sr,Mg,Ca,Ba)(Ga,Al,In)_2S_4$, the compound SrS, the compound ZnS and nitridosilicate. There are several exemplary phosphors that can be excited at 250 nm or thereabouts. An exemplary red emitting phosphor is $Y_2O_3:Eu^{3+}$. An exemplary yellow emitting phosphor is YAG:$Ce^{3+}$. Exemplary green emitting phosphors include $CeMgAl_{11}O_{19}:Tb^{3+}$, ((lanthanide)$PO_4:Ce^{3+},Tb^{3+}$) and $GdMgB_5O_{10}:Ce^{3+},Tb^{3+}$. Exemplary blue emitting phosphors are $BaMgAl_{10}O_{17}:Eu^{2+}$ and $(Sr,Ba,Ca)_5(PO_4)_3Cl:Eu^{2+}$. For longer wavelength LED excitation in the 400-450 nm wavelength region or thereabouts, exemplary optical inorganic materials include yttrium aluminum garnet (YAG or $Y_3Al_5O_{12}$), terbium-containing garnet, yttrium oxide ($Y_2O_3$), $YVO_4$, $SrGa_2S_4$, $(Sr,Mg,Ca,Ba)(Ga,Al,In)_2S_4$, SrS, and nitridosilicate. Exemplary phosphors for LED excitation in the 400-450 nm wavelength region include YAG:$Ce^{3+}$, YAG:$Ho^{3+}$, YAG:$Pr^{3+}$, $SrGa_2S_4:Eu^{2+}$, $SrGa_2S_4:Ce^{3+}$, SrS:$Eu^{2+}$ and nitridosilicates doped with $Eu^{2+}$.

Quantum dot materials are small particles of inorganic semiconductors having particle sizes less than about 40 nanometers. Exemplary quantum dot materials include, but are not limited to, small particles of CdS, CdSe, ZnSe, InAs, GaAs and GaN. Quantum dot materials can absorb light at one wavelength and then re-emit the light at different wavelengths that depend on the particle size, the particle surface properties, and the inorganic semiconductor material. Sandia National Laboratories has demonstrated white light generation using 2-nanometer CdS quantum dots excited with near-ultraviolet LED light. Efficiencies of approximately 60% were achieved at low quantum dot concentrations dispersed in a large volume of transparent host material. Because of their small size, quantum dot materials dispersed in transparent host materials exhibit low optical backscattering.

Luminescent dopant materials include, but are not limited to, organic laser dyes such as coumarin, fluorescein, rhodamine and perylene-based dyes. Other types of luminescent dopant materials are lanthanide dopants, which can be incorporated into polymer materials. The lanthanide elements are lanthanum, cerium, praseodymium, neodymium, promethium, samarium, europium, gadolinium, terbium, dysprosium, holmium, erbium, thulium, ytterbium and lutetium. An exemplary lanthanide element is erbium.

Figure 7:
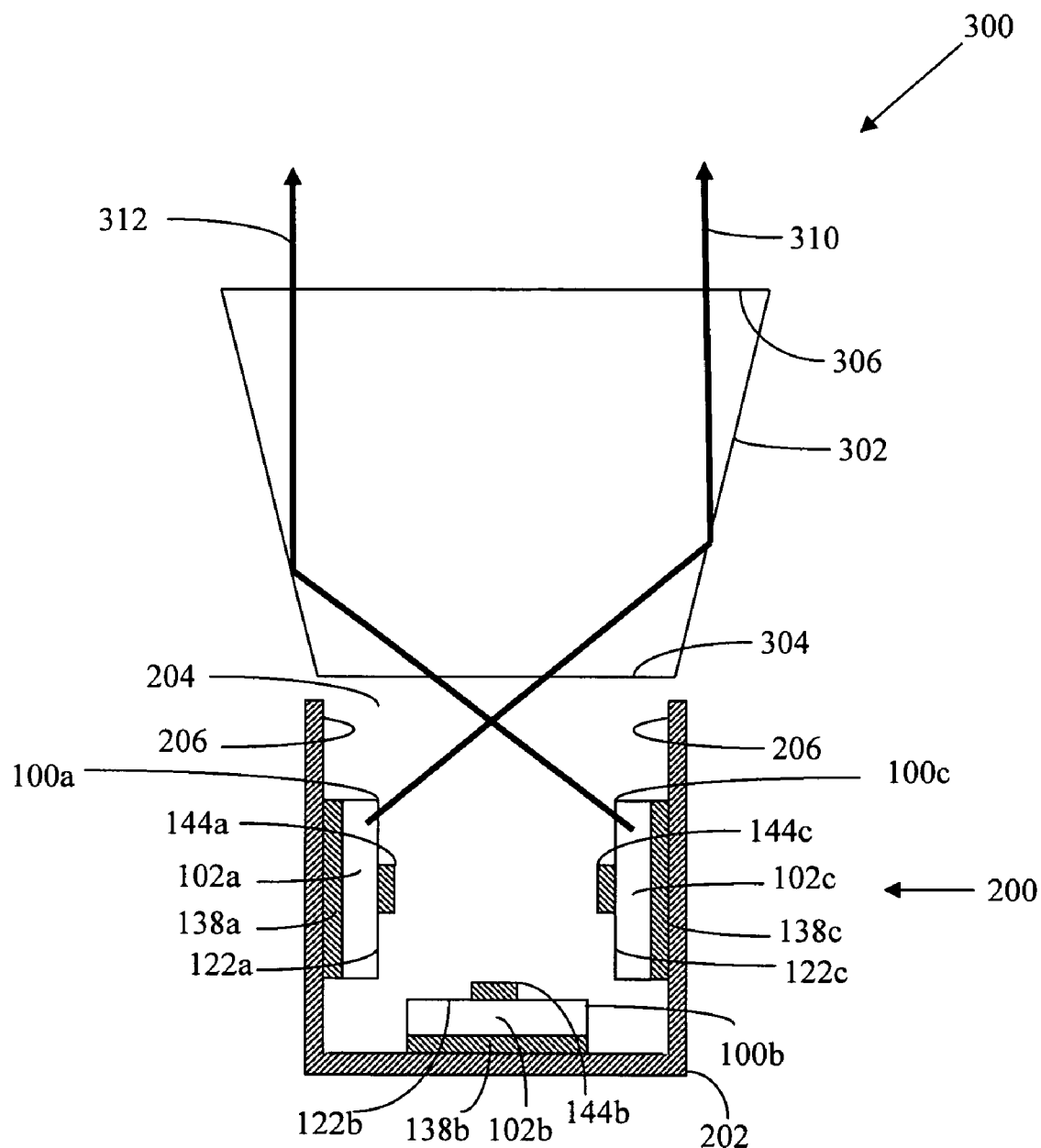
FIG. 7 is a side cross-sectional view of an embodiment of this invention that has a light-collimating means.

Another embodiment of this invention is light-recycling illumination system 300 shown in side cross section in FIG. 7. Light-recycling illumination system 300 is similar to light-recycling illumination system 200 except that light-recycling illumination system 300 further comprises a light-collimating means. In general, a light-collimating means can be any optical element or combination of elements that at least partially collimates the light exiting from the light output aperture 204. For example, the light-collimating means can be a compound parabolic reflector, a convex lens, a tapered light guide, or a combination of two or more such elements.

Light-recycling illumination system 300 in FIG. 7 is identical to light-recycling illumination system 200 except that light-recycling illumination system 300 further comprises a light-collimating means 302. In FIG. 7, light-collimating means 302 is a tapered light guide for illustrative purposes. A tapered light guide that transports light by reflecting light from the inside surfaces of the tapered light guide. The tapered light guide may be constructed from a solid transparent material. If the tapered light guide is constructed from such a solid transparent material, light can pass through the material and reflect from the inside surfaces of the tapered light guide by total internal reflection. Alternatively, the tapered light guide may be a hollow structure and the sides of the tapered light guide must then be covered with a reflective coating in order to reflect light. Light-collimating means 302 has an input surface 304, which is adjacent to the light output aperture 204 and which accepts uncollimated light, and an output surface 306. The input surface 304 accepts uncollimated light from the light output aperture 204. The light-collimating means 302 partially collimates the previously uncollimated light and transmits the partially collimated light through the output surface 306. In order for the light-collimating means to partially collimate the light exiting the light output aperture 306, the area of input surface 304 must be less than the area of the output surface 306. Equation 5 gives the mathematical relationship between the input and output areas and the input and output solid angle distributions of the light.

Representative light rays 310 and 312 shown in FIG. 7 illustrate the function of the light-collimating means 302 when light-collimating means 302 is a tapered light guide. Light ray 310 is emitted from the multilayer semiconductor structure 102a of LED 100a on the second side, passes through surface 122a of LED 100a, passes through the interior of the light-recycling cavity 202, passes through the light output aperture 204 on the first side and passes through input surface 304 of the light-collimating means 302 as uncollimated light. Light ray 310 is reflected by the sides of the light-collimating means 302 and exits the light-collimating means through output surface 306 as partially collimated light.

Light ray 312 is emitted from the multilayer semiconductor structure 102c of LED 100c on the fourth side, passes through surface 122c of LED 100c, passes through the interior of light-recycling cavity 202, passes through the light output aperture 204 on the first side and enters the light-collimating means through input surface 304. Light ray 312 is reflected by the sides of the light-collimating means and exits the light-collimating means through output surface 306 as partially collimated light.

The degree of light collimation required from the light-collimating means depends on the application. The light that exits through the light output aperture 204 typically has a Lambertian (output angles of −90 degrees to +90 degrees or a solid angle of $2\pi$) or near Lambertian angular distribution. The degree of collimation exiting the light-collimating means 302 can be adjusted as needed by changing the area of the output surface 306 relative to the area of the input surface 304 utilizing the mathematical relationship of Equation 5. If the input refractive index $n_{in}$ of the light-collimating means is equal to the output refractive index $n_{out}$ of the light-collimating means, then Equation 4 can be used instead and the light output solid angle distribution $\Omega_{out}$ from the light-collimating means is given by $$\Omega_{out} = \Omega_{in}(Area_{in})/(Area_{out}), \quad \text{[Equation 6]}$$

where $\Omega_{in}$ is the light input solid angle distribution into the light-collimating means, $Area_{in}$ is the area of the input surface 304 and $Area_{out}$ is the area of the output surface 306.

For applications requiring a high degree of light collimation, the light-collimating means 302 partially collimates the light so that the light output distribution is preferably within the angular range of −35 degrees to +35 degrees. More preferably, light-collimating means 302 partially collimates the light so that the light output distribution is within the angular range of −25 degrees to +25 degrees. Most preferably, light-collimating means 302 partially collimates the light so that the light output distribution is within the angular range of −15 degrees to +15 degrees.

Figure 8A:
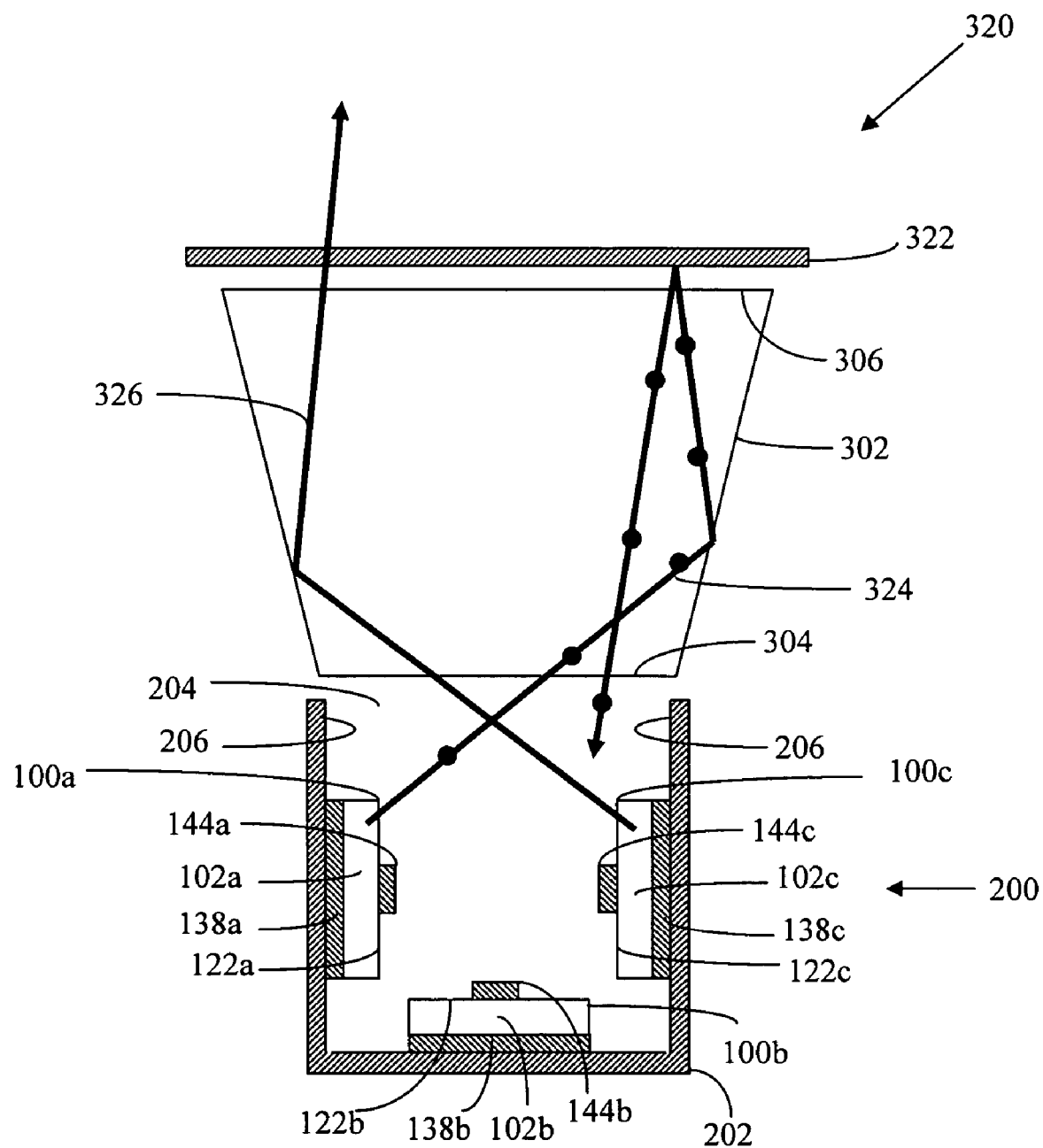
FIG. 8A is a side cross-sectional view of an embodiment of this invention that has both a light-collimating means and a planar reflective polarizer.
Figure 8B:
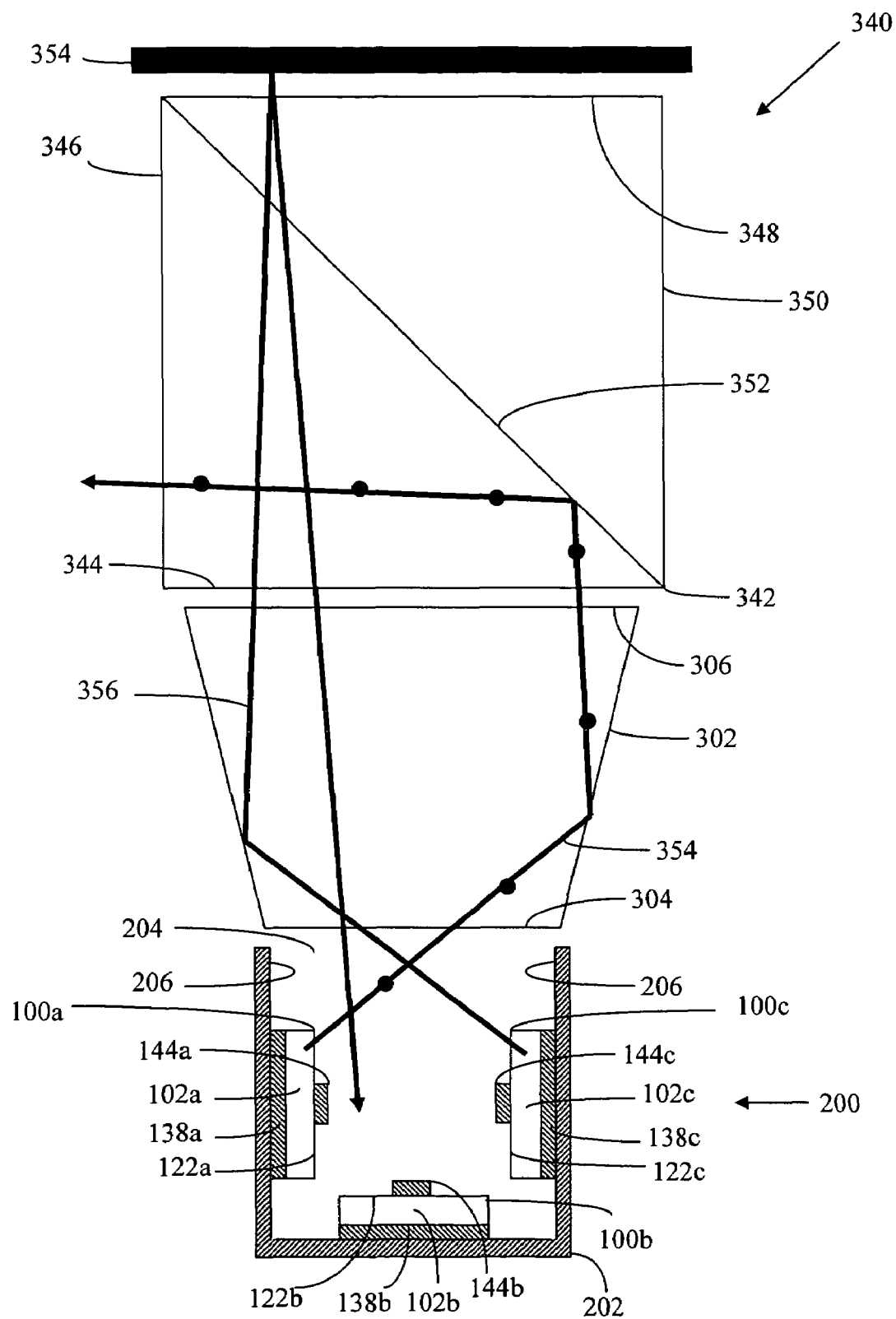
FIG. 8B is a side cross-sectional view of an embodiment of this invention that has both a light-collimating means and a beam-splitting prism polarizer.

The embodiment in FIG. 7 illustrates a light-recycling illumination system that incorporates a light-collimating means. It is also possible to have embodiments of this invention that comprise both a light-collimating means and a polarizer operating in combination. One embodiment of a light-recycling illumination system utilizing a polarizer is shown in FIG. 8A. The polarizer illustrated in FIG. 8A is a planar reflective polarizer. FIG. 8B shows another embodiment of this invention that comprises both a light-collimating means and a different type of reflective polarizer.

FIG. 8A is a side cross-sectional view of light-recycling illumination system 320. Light-recycling illumination system 320 is identical to light-recycling illumination system 300 in FIG. 7 that has a light-collimating means, except that light-recycling illumination system 320 further comprises a planar reflective polarizer 322. A planar reflective polarizer is any planar polarizer that reflects light of a first polarization state and transmits light of a second polarization state. The light may have any wavelength or color. Polarization states can be states of linear polarization or states of circular polarization. Examples of suitable planar reflective polarizers are Vikuiti™ Dual Brightness Enhancement Film (DBEF) made by 3M Corporation and polarizers made by NanoOpto Corporation and Moxtek Incorporated that utilize subwavelength optical elements or wire-grid optical elements.

The planar reflective polarizer 322 is positioned adjacent to the output surface 306 of light-collimating means 302. Planar reflective polarizer 322 reflects light of a first polarization state and transmits light of a second polarization state. Planar reflective polarizer 322 reflects and recycles light of the first polarization state back through the light-collimating means 302 and back into the light-recycling cavity 202. Light of a first polarization state that has been recycled back into the light-recycling cavity 202 can be reflected multiple times within the light-recycling cavity and thereby be partially converted into light of a second polarization state. Recycled light that has been converted into light of a second polarization state may then exit the light-recycling cavity through light output aperture 204, pass through light-collimating means 302 and finally pass through planar reflective polarizer 322. This recycled and polarization converted light adds to the light output of illumination system 320. The efficiency and the maximum exiting luminance of illumination system 320 are thereby increased.

Representative light rays 324 and 326 shown in FIG. 8A illustrate the function of the light-collimating means 302 and the planar reflective polarizer 322. Light ray 324 of a first polarization state (illustrated by a solid line with superimposed dots) is emitted from the multilayer semiconductor structure 102a of LED 100a on the second side, passes through surface 122a of LED 100a, passes through the interior of light-recycling cavity 202 and passes through the light output aperture 204 on the first side. Light ray 324 of a first polarization state enters the input surface 304 of light-collimating means 302 as uncollimated light. Light ray 324 of a first polarization state is reflected by the sides of light-collimating means 302 and exits the light-collimating means through the output surface 306 as partially collimated light. The light ray 324 of a first polarization state is then reflected by planar reflective polarizer 322, passes through light-collimating means 302 a second time and reenters the light-recycling cavity 202 to eventually be partially converted into light of a second polarization state.

Light ray 326 of a second polarization state (illustrated by a solid line) is emitted from the multilayer semiconductor structure 102c of LED 100c on the fourth side, passes through surface 122c of LED 100c, passes through the interior of the light-recycling cavity 202 and passes through the light output aperture 204 on the first side. Light ray 326 of a second polarization state passes through input surface 304 of the light-collimating means 302 as uncollimated light. Light ray 326 of a second polarization state is reflected by the sides of the light-collimating means 302 and then exits through the output surface 306 of the light-collimating means 302 as partially collimated light. The light ray 326 then passes through planar reflective polarizer 322 and exits illumination system 320 as partially collimated light of a second polarization state.

FIG. 8B is a side cross-sectional view of light-recycling illumination system 340. Light-recycling illumination system 340 is identical to light-recycling illumination system 300 that has a light-collimating means, except that light-recycling illumination system 340 further comprises a reflective polarizer. In this illustration, the reflective polarizer is a beam-splitting prism polarizer 342. The characteristics and function of a beam-splitting prism polarizer are well known to those skilled in the art. The beam-splitting prism polarizer 342 has an input surface 344, a first output surface 346 perpendicular to the input surface, a second output surface 348 parallel and opposite to the input surface, a third output surface 350 and a partially reflecting diagonal surface 352. The polarizing element of the beam-splitting prism polarizer is the partially reflecting diagonal surface 352 located along a prism diagonal. The partially reflecting diagonal surface is oriented at an angle of approximately 45 degrees with respect to the output surface 306 of the light-collimating means 302. The partially reflecting diagonal surface 352 reflects light of a first polarization state to the first output surface 346 and transmits light of a second polarization state to the second output surface 348. The light may have any wavelength or color.

Note that in the previous embodiment shown in FIG. 8A, the planar reflective polarizer 322 could also have been placed at a 45-degree angle relative to the plane of the output surface 306 of the light-collimating means 302. Such an orientation of the planar reflective polarizer 322 will allow the planar reflective polarizer to function in a similar manner as the beam-splitting prism polarizer 342 illustrated in FIG. 8B.

The beam-splitting prism polarizer 342 is positioned adjacent to the output surface 306 of light-collimating means 302. The partially reflecting diagonal surface 352 of the beam-splitting prism polarizer 342 reflects light of a first polarization state to a reflector 192 and transmits light of a second polarization state to a reflector 354. Reflector 354 reflects and recycles the light of a first polarization state back through the beam-splitting prism polarizer 342, back through the light-collimating means 302 and back into the light-recycling cavity 202. Light of a first polarization state that has been recycled back into the light-recycling cavity 202 can be reflected multiple times within the light-recycling cavity and thereby be partially converted into light of a second polarization state. Recycled light that has been converted into light of a second polarization state may then exit the light-cycling envelope through light output aperture 204, pass through light-collimating means 302, enter input surface 344 of beam-splitting prism polarizer 342, be reflected by the partially reflecting diagonal surface 352 and finally pass through the first output surface 346 of beam-splitting prism polarizer 342. This recycled and polarization converted light adds to the light output of illumination system 340. The efficiency and the maximum exiting luminance of illumination system 340 are thereby increased.

Representative light rays 354 and 356 shown in FIG. 8B illustrate the function of the light-collimating means 302 and the beam-splitting prism polarizer 342. Light ray 354 of a first polarization state is emitted from the multilayer semiconductor structure 102a of LED 100a on the second side, passes through surface 122a LED 100a, passes through the interior of light-recycling cavity 202 and exits light-recycling cavity 202 through light output aperture 204 on the first side. Light ray 354 of a first polarization state enters the input surface 304 of light-collimating means 302 as uncollimated light. Light ray 354 of a first polarization state is reflected by the sides of light-collimating means 302 and exits the light-collimating means through the output surface 306 as partially collimated light. The light ray 354 of a first polarization state enters beam-splitting prism polarizer 342 through input surface 344, is reflected by partially reflecting diagonal surface 352 and exits through first output surface 346.

Light ray 356 of a second polarization state is emitted from the multilayer semiconductor structure 102c of LED 100c on the fourth side, passes through surface 122c of LED 100c, passes through the interior of the light-recycling cavity 202 and exits through the light output aperture 204 on the first side. Light ray 356 of a second polarization state passes through input surface 304 of the light-collimating means 302 as uncollimated light. Light ray 356 of a second polarization state is reflected by the sides of the light-collimating means 302 and then exits through the output surface 306 of the light-collimating means 302 as partially collimated light. Light ray 356 passes through input surface 344 of the beam-splitting prism polarizer 342, passes through partially reflecting diagonal surface 352, exits the beam-splitting prism polarizer 342 through the second output surface 348 and is directed to reflector 354. Light ray 356 of a second polarization state is reflected by reflector 354, is directed backwards through the second output surface 348, back through the partially reflecting diagonal surface 352, back through the input surface 344, back through the light-collimating means 302 a second time and back into the light-recycling cavity 202. Light ray 356 of a second polarization state can then be converted to light of a first polarization state by the light recycling envelope 202.

Projection display systems can be designed that utilize both the light-recycling illumination systems described above and imaging light modulators to form spatially varying and time varying images. Imaging light modulators include, but are not limited to, devices such as liquid crystal display (LCD) devices, liquid-crystal-on-silicon (LCOS) devices and digital light processor (DLP) devices. LCD, LCOS and DLP devices are comprised of two-dimensional arrays of pixels, or picture elements, that can be individually controlled to form an image by varying the amount of light that each pixel transmits to a magnifying projection lens and to a viewing screen. The number of different light transmission levels that can be achieved for each pixel depends on the imaging light modulator design. For example, in some imaging light modulators, the number of light transmission levels that can be achieved for each pixel is 256 or higher. LCD and LCOS devices utilize liquid crystals, polarizing optical components and electronic driver circuits to individually control the amount of light transmission for each pixel. DLP devices utilize an array of micro-mirrors and associated electronic driver circuits to individually control the amount of light directed to a viewing screen by each pixel. DLP devices are not affected by the polarization state of the light.

Embodiments of this invention that utilize one light-recycling illumination system and one imaging light modulator in order to make relatively simple projection display systems will be described first. Such systems can be combined to make more complex projection display systems. These three embodiments will be followed by embodiments of projection display systems that utilize three light-recycling illumination systems and one imaging light modulator. Finally, embodiments with three light-recycling illumination systems and three imaging light modulators will be described. Other combinations of light-recycling illumination systems and imaging light modulators are within the scope of this invention. For example, projection display systems having two, four, five or six light-recycling illumination systems and two, four, five or six imaging light modulators are within the scope of this invention.

Figure 9:
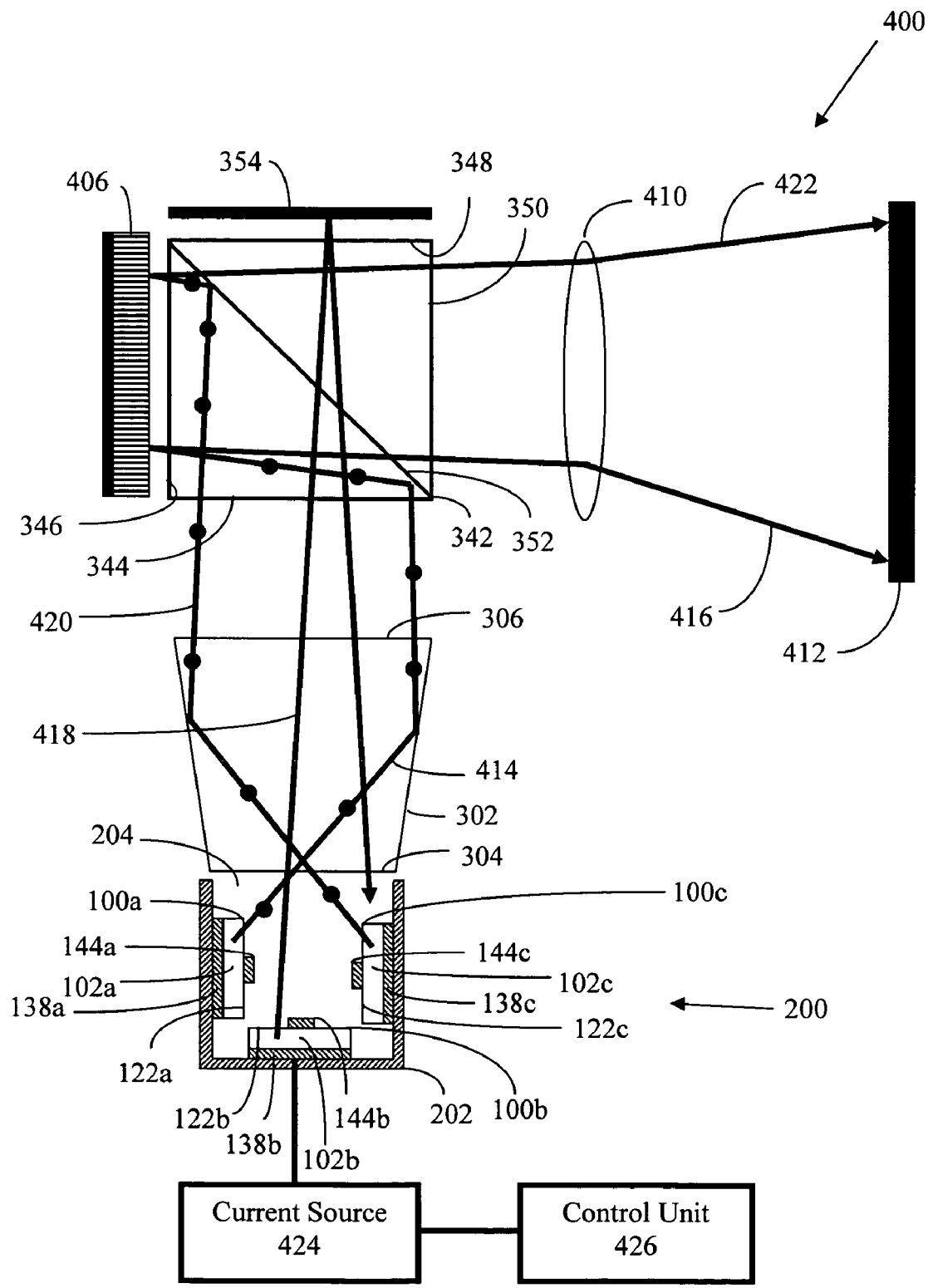
FIG. 9 is a side cross-sectional view of a projection display system of this invention that has one light-recycling illumination system and one imaging light modulator. The imaging light modulator is a LCOS device.

Another embodiment of this invention is projection display system 400 illustrated in side cross-section in FIG. 9. Projection display system 400 incorporates a single LCOS imaging light modulator. FIG. 9 is similar to FIG. 8B except that FIG. 9 includes an imaging light modulator 406, a projection lens 410 and a viewing screen 412.

The main elements of the projection display system 400 are a light-recycling illumination system 200, a reflective polarizer, an imaging light modulator 406, a reflector 354, a projection lens 410 and a viewing screen 412. The light-recycling illumination system 200 includes nine LEDs. The nine LEDs are 100a, 100b, 100c, 100d, 100e, 100f, 100g, 100h and 100i. The number of LEDs was chosen to be nine only for illustrative purposes. Only three LEDs denoted as 100a, 100b and 100c are illustrated in the cross-sectional view shown in FIG. 9. The nine LEDs can emit internally generated light of only one wavelength or the nine LED can emit light of two or more wavelengths. In this illustrative example, the nine LEDs are assumed to emit only one wavelength of light, for example, red light. The light-recycling illumination system also includes a light-recycling cavity 202, a light output aperture 204 and light-collimating means 302. The reflective polarizer can be any type of reflective polarizer, but is illustrated to be a beam-splitting prism polarizer 342. The characteristics and properties of the LEDs, the light-recycling cavity 202, the light output aperture 204, the light-collimating means 302 and the beam-splitting prism polarizer 342 have been described previously. The area of the light output aperture 204 is less than the total light-emitting area of the nine LEDs and, in some cases, the maximum exiting luminance from the light output aperture is greater than the maximum intrinsic source luminance.

The imaging light modulator 406 in FIG. 9 is a reflective device. For example, imaging light modulator can be an LCOS device that utilizes liquid crystals to modulate the light reflectivity of a two-dimensional array of pixels. Preferably light of a single polarization state is directed to the LCOS device. The beam-splitting prism polarizer 342 directs light of a single polarization state to the imaging light modulator 406 by reflecting light of a first polarization state to the imaging light modulator via the partially reflecting diagonal surface 352 and transmitting light of a second polarization state to the reflector 354. To form an image, each pixel of the imaging light modulator converts a portion of the light of a first polarization state into light of a second polarization state. The portion will vary for each pixel. The converted light of a second polarization state is then transmitted as an image through the partially reflecting diagonal surface 352 and through the projection lens 410 to the viewing screen 412. Light of a first polarization state that is directed to the imaging light modulator 406 and that is not converted by the imaging light modulator to light of a second polarization state is reflected (not shown) by the partially reflecting diagonal surface 352 and recycled back through the light-collimating means 302 and back into the light-recycling cavity 202. Recycling light of a first polarization state back to the light-recycling cavity to be reused can increase the efficiency and the maximum exiting luminance of the projection display system.

Light of a second polarization state emitted by the LEDS passes through the partially reflecting diagonal surface 352 of beam-splitting prism polarizer 342 and is directed to reflector 354. Reflector 354 reflects the light of a second polarization state back through the beam-slitting prism polarizer 342, back through the light-collimating means 302 and back into the light-recycling cavity 202 where it can be reflected multiple times and partially converted to light of a first polarization state. Recycling light of a second polarization state back to the light-recycling cavity to be converted to light of a first polarization state can increase the efficiency and the maximum exiting luminance of the projection display system.

In FIG. 9 a light ray of a first polarization state is indicated by superimposing dots onto the line representing the light ray. A light ray of a second polarization state has no superimposed dots.

Representative light rays 414, 416, 418, 420 and 422 shown in FIG. 9 illustrate the operation of projection display system 400. Only a few rays are shown in order to simplicity the figure. Although a typical ray may reflect one or more times inside the light-recycling cavity 202 before exiting the light output aperture 204, these extra reflections are not shown in order to simplify the figure.

Light ray 414 of a first polarization state is emitted by the multilayer semiconductor structure 102a of LED 100a on the second side and passes through surface 122a into the interior of the light-recycling cavity 202. Light ray 414 of a first polarization state passes through the interior of light-recycling cavity 202, passes through light output aperture 204 and enters input surface 304 of light-collimating means 302 as uncollimated light. Light ray 414 of a first polarization state is reflected by the sides of light-collimating means 302 and exits the light-collimating means 302 through the output surface 306 as partially collimated light. Light ray 414 of a first polarization state enters input surface 344 of beam-splitting prism polarizer 342, is reflected by the partially reflecting diagonal surface 352 and is directed to a pixel of imaging light modulator 406. The pixel of imaging light modulator 406 reflects and converts all or part of light ray 414 of a first polarization state into light ray 416 of a second polarization state, forming one pixel of an image. Light ray 416 of a second polarization state passes through the partially reflecting diagonal surface 352 of beam-splitting prism polarizer 342, is directed through projection lens 410 to viewing screen 412. Although not shown in FIG. 9, any part of light ray 414 of a first polarization state that is not converted to red light ray 416 of a second polarization state by the pixel of the imaging light modulator is reflected by the imaging light modulator, is also reflected by the partially reflecting diagonal surface 352 and is recycled back through the light-collimating means 302 into the light-recycling cavity 202. Any such recycled light can be redirected out of the light-recycling cavity 202 and can increase the efficiency and the maximum exiting luminance of projection display 400.

Light ray 418 of a second polarization state is emitted by the multilayer semiconductor structure 102b of LED 100b on the third side and passes through surface 122b of LED 100b. Light ray 418 of a second polarization state passes through the interior of light-recycling cavity 202, passes through light output aperture 204 and enters input surface 304 of light-collimating means 302 as uncollimated light. Light ray 418 of a second polarization state passes is partially collimated by the light-collimating means 302 and exits the light-collimating means 302 through the output surface 306. Light ray 418 of a second polarization state enters beam-splitting prism polarizer 342, is not reflected by the partially reflecting diagonal surface 352 and is directed through the second output surface 348 of beam-splitting prism polarizer 342. Light ray 418 of a second polarization state is directed to reflector 354, is reflected by reflector 354 and is recycling back through the illumination system. Light ray 418 of a second polarization state passes back through the beam-splitting prism polarizer, passes back through the light-collimating means 302 and passes back into the light-recycling cavity 202. Any such recycled light can be redirected out of the light-recycling cavity 202 and can increase the efficiency and the maximum exiting luminance of projection display 400.

Light ray 420 of a first polarization state is emitted by the multilayer semiconductor structure 102c of LED 100c on the fourth side and passes through surface 122c of LED 100c. Light ray 420 of a first polarization state passes through the interior of light-recycling cavity 202, passes through light output aperture 204 and enters input surface 304 of light-collimating means 302 as uncollimated light. Light ray 420 of a first polarization state is reflected by the sides of light-collimating means 302 and exits the light-collimating means 302 through the output surface 306 as partially collimated light. Light ray 420 of a first polarization state enters beam-splitting prism polarizer 342, is reflected by the partially reflecting diagonal surface 352 and is directed to a pixel of imaging light modulator 406. The pixel of imaging light modulator 406 reflects and converts all or part of light ray 420 of a first polarization state into blue light ray 422 of a second polarization state, forming one pixel of a blue image. Light ray 422 of a second polarization state passes through the partially reflecting diagonal surface 352 of beam-splitting prism polarizer 342, is directed through projection lens 410 to viewing screen 412. Although not shown in FIG. 9, any part of light ray 420 of a first polarization state that is not converted to light ray 422 of a second polarization state by the pixel of the imaging light modulator is reflected by the imaging light modulator, is also reflected by the partially reflecting diagonal surface 352 and is recycled back through the light-collimating means 302 into the light-recycling cavity 202. Any such recycled light can be redirected out of the light-recycling cavity 202 and can increase the efficiency and the maximum exiting luminance of projection display 400.

Current source 424 supplies electrical current to the nine LEDs. The individual electrical connects to each LED are not shown. Control unit 426 controls the current source 424.

Figure 10:
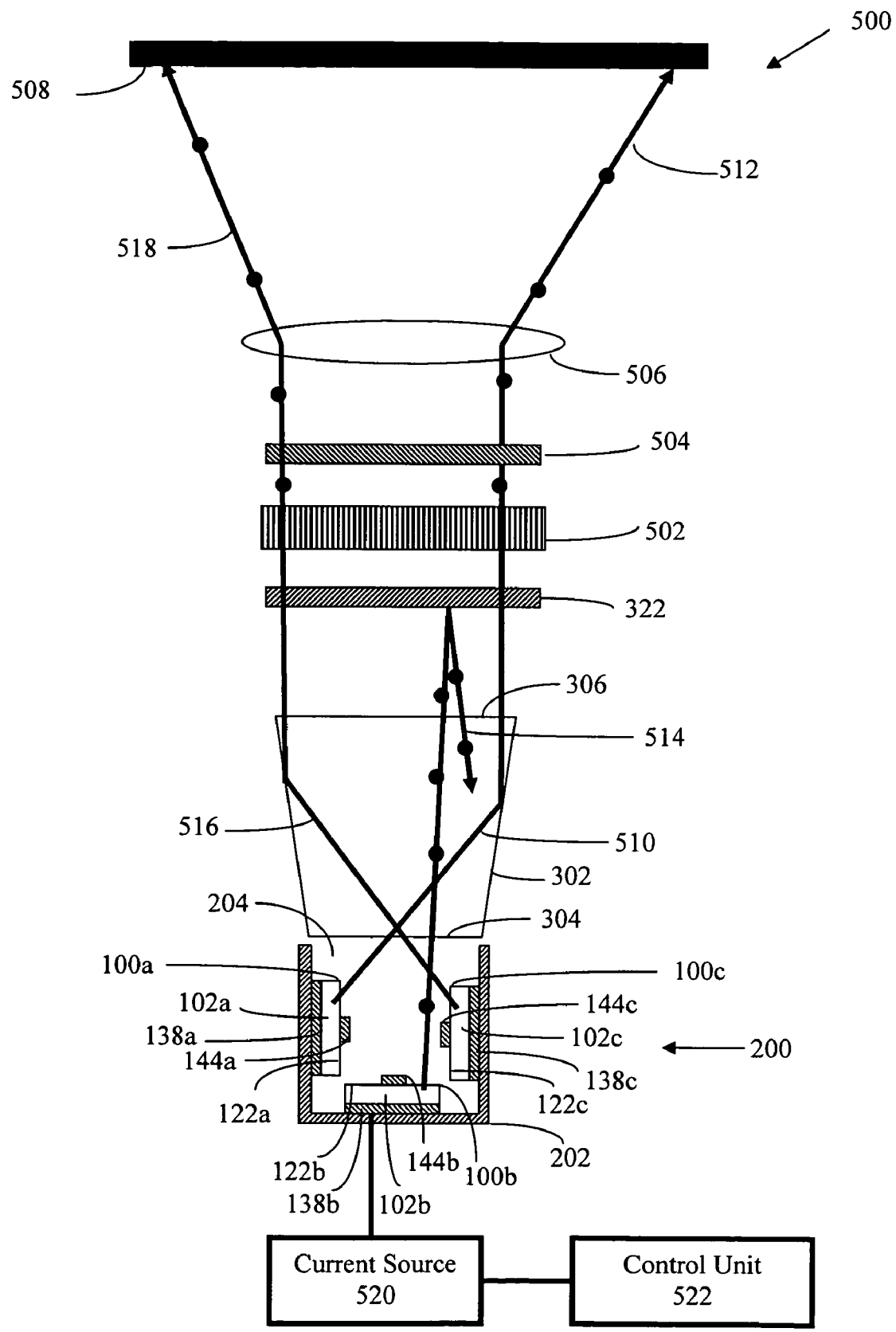
FIG. 10 is a side cross-sectional view of a projection display system of this invention that has one light-recycling illumination system and one imaging light modulator. The imaging light modulator is a LCD device.

FIG. 10 is a side cross-sectional view of another embodiment of this invention. FIG. 10 illustrates projection display system 500 that incorporates one light-recycling illumination system and one imaging light modulator. FIG. 10 is similar to FIG. 8A except that FIG. 10 includes an imaging light modulator 502, a second polarizer 504, a projection lens 506 and a viewing screen 508.

The main elements of the projection display system 500 are a light-recycling illumination system 200, a first polarizer 322, an imaging light modulator 502, a second polarizer 504, a projection lens 506 and a viewing screen 508. The light-recycling illumination system 200 includes nine LEDs. The nine LEDs are 100a, 100b, 100c, 100d, 100e, 100f, 100g, 100h and 100i. The number of LEDs was chosen to be nine only for illustrative purposes. Only three LEDs denoted as 100a, 100b and 100c are illustrated in the cross-sectional view shown in FIG. 10. The nine LEDs can emit internally generated light of only one wavelength or the nine LED can emit light of two or more wavelengths. In this illustrative example, the nine LEDs are assumed to emit only one wavelength of light, for example, red light. The nine LEDs emit both light of a first polarization state and light of a second polarization state. The light-recycling illumination system 200 also includes a light-recycling cavity 202, a light output aperture 204 and light-collimating means 302. The first polarizer can be any type of polarizer, but is illustrated to be a planar reflective polarizer 322 as in FIG. 8A. The characteristics and properties of the LEDs, the light-recycling cavity 202, the light output aperture 204, the light-collimating means 302 and the planar reflective polarizer 3222 have been described previously. The area of the light output aperture 204 is less than the light-emitting area of the nine LEDs and, in some cases, the maximum exiting luminance from the light output aperture is greater than the maximum intrinsic source luminance.

The imaging light modulator 502 in FIG. 10 is a light-transmitting device, for example an LCD device. LCD light-transmitting devices utilize liquid crystals to modulate the light transmission of a two-dimensional array of pixels. Preferably light of a single polarization state is directed to the LCD device. The planar reflecting polarizer 322 directs light of a single polarization state to the imaging light modulator 502 by reflecting light of a first polarization state back to the light-recycling cavity and transmitting light of a second polarization state to the imaging light modulator 502. To form an image, each pixel of the imaging light modulator converts a portion of the incident light of a second polarization state to light of a first polarization state. The portion converted to a first polarization state will vary for each pixel. A second polarizer 504 allows the light of a first polarization state to be transmitted and reflects or absorbs light of a second polarization state. The light of a first polarization state generated by all the pixels of the imaging light modulator 502 forms an image that is transmitted through the projection lens 506 to the viewing screen 508.

Planar reflective polarizer 322 reflects the light of a first polarization state back through the light-collimating means 302 and back into the light-recycling cavity 202 where it can be reflected multiple times and partially converted to light of a second polarization state. Recycling light of a first polarization state back to the light-recycling cavity to be converted to light of a second polarization state can increase the efficiency and the maximum exiting luminance of the projection display system.

Representative light rays 510, 512, 514, 516 and 518 illustrate the operation of projection display system 500. Only a few rays and only a few reflections are shown in order to simplicity the figure.

Light ray 514 of a first polarization state is emitted by the multilayer semiconductor structure 102b of LED 100b on the third side and passes through surface 122b of LED 100b. Light ray 514 of a first polarization state passes through the interior of light-recycling cavity 202, passes through light output aperture 204 and enters input surface 304 of light-collimating means 302 as uncollimated light. Light ray 514 of a first polarization state is reflected by the sides of light-collimating means 302 and exits the light-collimating means 302 through the output surface 306 as partially collimated light. Light ray 514 of a first polarization state is reflected and recycled by planar reflecting polarizer 322 back into the light-collimating means 302. Eventually light ray 514 of a first polarization state will return to the light-recycling cavity where light ray 514 will be reflected multiple times and be partially converted to light of a second polarization state. Converting recycled light of a first polarization state into light of a second polarization state can increase the efficiency and the maximum exiting luminance of projection display system 500.

Light ray 510 of a second polarization state is emitted by the multilayer semiconductor structure 102a of LED 100a on the second side and passes through surface 122a of LED 100a. Light ray 510 of a second polarization state passes through the interior of light-recycling cavity 202, passes through light output aperture 204, is partially collimated by light-collimating means 302, passes through planar reflective polarizer 322 and is directed to a pixel of imaging light modulator 502. The pixel of imaging light modulator 502 converts all or part of red light ray 510 of a second polarization state into light ray 512 of a first polarization state, forming one pixel of an image. Light ray 512 of a first polarization state passes through the second polarizer 504 and is directed through projection lens 506 to viewing screen 508. Although not shown in FIG. 10, any part of light ray 510 of a second polarization state that is not converted to light ray 512 of a first polarization state by the pixel of the imaging light modulator is reflected or absorbed by the second polarizer 504.

Light ray 516 of a second polarization state is emitted by the multilayer semiconductor structure 102c of LED 100c and passes through surface 122c of LED 100c. Light ray 516 of a second polarization state passes through the interior of light-recycling cavity 202, passes through light output aperture 204, is partially collimated by light-collimating means 302, passes through planar reflective polarizer 322 and is directed to a pixel of imaging light modulator 502. The pixel of imaging light modulator 502 converts all or part of light ray 516 of a second polarization state into light ray 518 of a first polarization state, forming one pixel of a green image. Light ray 518 of a first polarization state passes through the second polarizer 504 and is directed through projection lens 506 to viewing screen 508. Although not shown in FIG. 10, any part of light ray 516 of a second polarization state that is not converted to light ray 518 of a first polarization state by the pixel of the imaging light modulator is reflected or absorbed by the second polarizer 504.

Current source 520 supplies electrical current to the nine LEDs. The individual electrical connects to each LED are not shown. Control unit 522 controls the current source 520.

Figure 11:
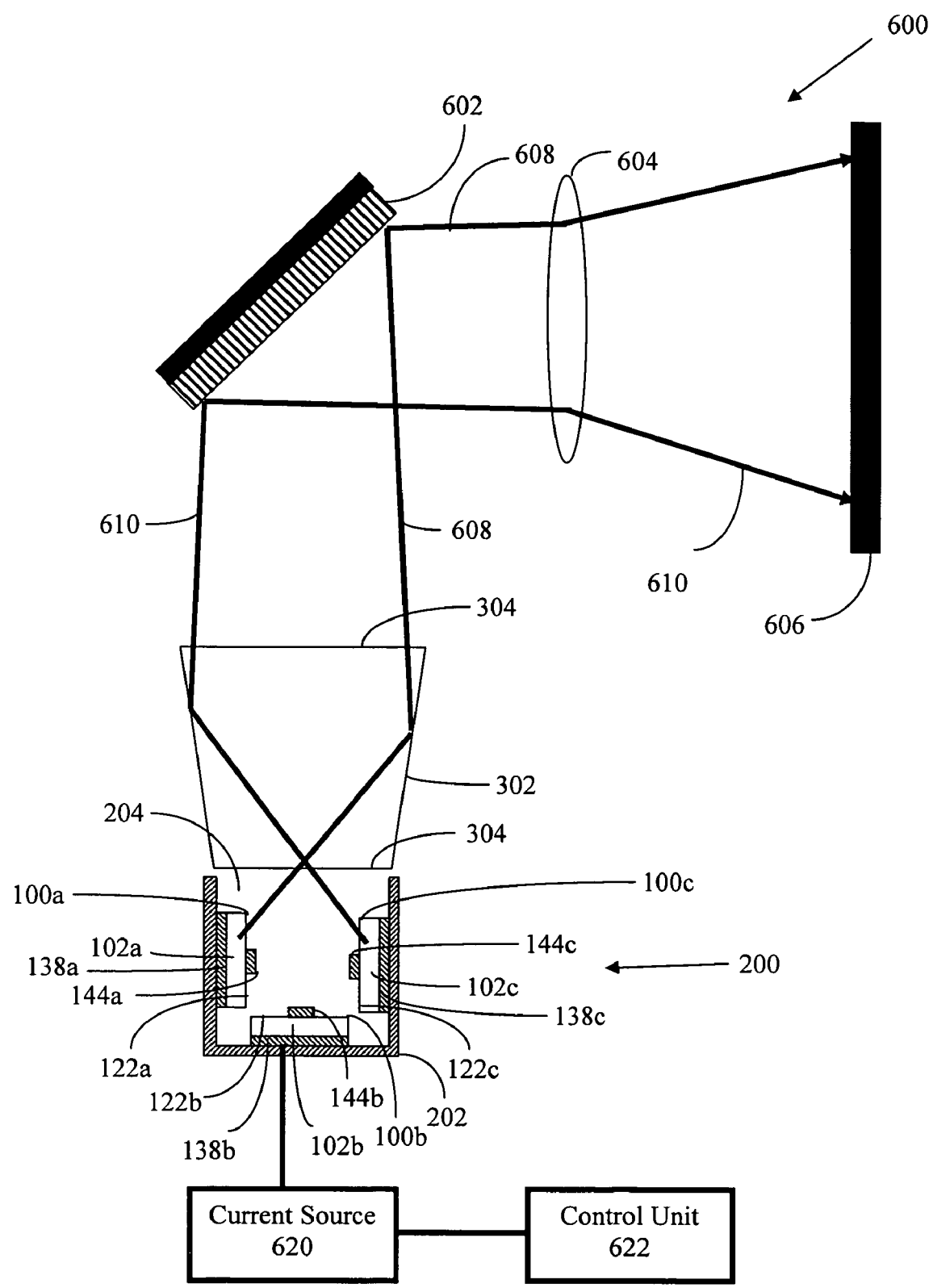
FIG. 11 is a side cross-sectional view of a projection display system of this invention that has one light-recycling illumination system and one imaging light modulator. The imaging light modulator is a DLP device.

FIG. 11 is a side cross-sectional view of another embodiment of this invention. FIG. 11 illustrates projection display system 600 that incorporates one light-recycling illumination system 200 and one imaging light modulator. FIG. 11 is similar to FIG. 9 except that in FIG. 11 the imaging light modulator 602 is a DLP device. Because DLP devices are not polarization sensitive, polarizing elements are not required in projection display system 600.

The main elements of the projection display system 600 are a light-recycling illumination system 200, an imaging light modulator 602, a projection lens 604 and a viewing screen 606. The light-recycling illumination system 200 includes nine LEDs. The nine LEDs are 100a, 100b, 100c, 100d, 100e, 100f, 100g, 100h and 100i. The number of LEDs was chosen to be nine only for illustrative purposes. Only three LEDs denoted as 100a, 100b and 100c are illustrated in the cross-sectional view shown in FIG. 11. The nine LEDs can emit internally generated light of only one wavelength or the nine LED can emit light of two or more wavelengths. In this illustrative example, the nine LEDs are assumed to emit only one wavelength of light, for example, red light. The nine LEDs emit both light of a first polarization state and light of a second polarization state. The light-recycling illumination system 200 also includes a light-recycling cavity 202, a light output aperture 204 and light-collimating means 302. The characteristics and properties of the LEDs, the light-recycling cavity 202, the light output aperture 204 and the light-collimating means 302 have been described previously. The area of the light output aperture 204 is less than the total light-emitting area of the nine LEDs and, in some cases, the maximum exiting luminance from the light output aperture is greater than the maximum intrinsic source luminance.

The imaging light modulator 602 in FIG. 11 is a reflective DLP device. To form an image, each pixel of the imaging light modulator directs a portion of the incident light to the projection lens 604 and viewing screen 606. The portion directed to the viewing screen will vary for each pixel.

Figure 1:
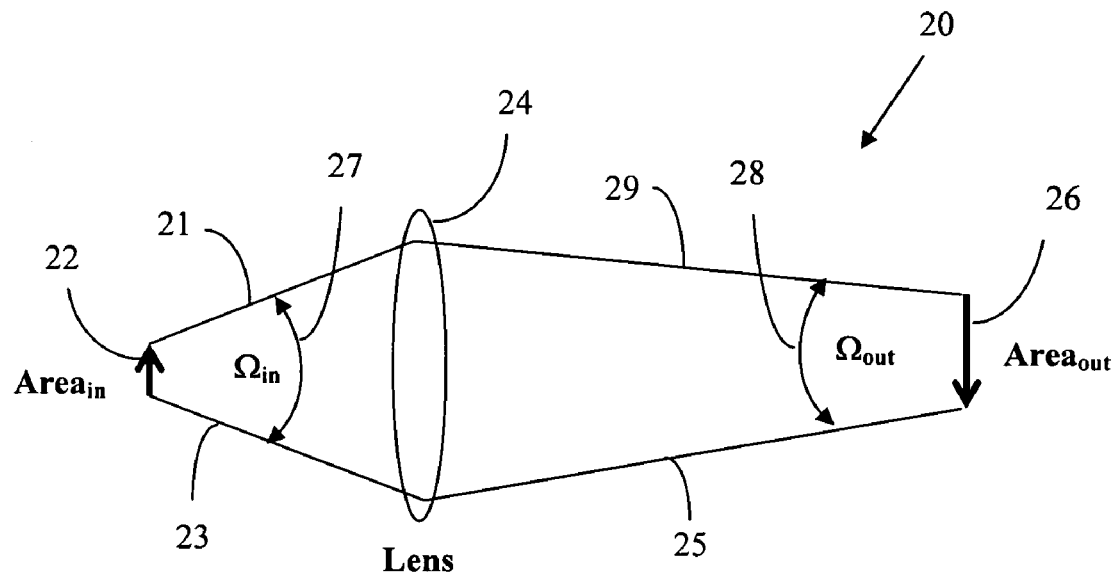
FIG. 1 is a cross-sectional side view of a conventional optical system of the prior art.

Representative light rays 608 and 610 shown in FIG. 1 illustrate the operation of projection display system 600. Although only two light rays of the second polarization state are shown in FIG. 11, light rays of the first polarization state will behave in a similar way. Multiple ray reflections inside the light-recycling cavity 202 are not shown in order to simplify the figure.

Light ray 608 of a second polarization state is emitted by the multilayer semiconductor structure 102a of LED 100a on the second side and passes through surface 122a of LED 100a. Light ray 608 of a second polarization state passes through the interior of light-recycling cavity 202, passes through light output aperture 204, is partially collimated by light-collimating means 302 and is directed to a pixel of imaging light modulator 602. The pixel of imaging light modulator 602 forms one pixel of an image by reflecting all or part of light ray 608 of a second polarization state to projection lens 604 and to viewing screen 606.

Light ray 610 of a second polarization state is emitted by the multilayer semiconductor structure 102c of LED 100c on the fourth side and passes through surface 122c of LED 100c. Light ray 610 of a second polarization state passes through the interior of light-recycling cavity 202, passes through light output aperture 204, is partially collimated by light-collimating means 302 and is directed to a pixel of imaging light modulator 602. The pixel of imaging light modulator 602 forms one pixel of an image by reflecting all or part of light ray 610 of a second polarization state to projection lens 604 and to viewing screen 606.

Current source 620 supplies electrical current to the nine LEDs. The individual electrical connects to each LED are not shown. Control unit 622 controls the current source 620.

The nine LEDs in projection display system 400 in FIG. 9 are supplied with electrical power by current source 424. Control unit 426 controls the operation of current source 424. The nine LEDs in projection display system 500 in FIG. 10 are supplied with electrical power by current source 520. Control unit 522 controls the operation of current source 520. The nine LEDs in projection display system 600 in FIG. 11 are supplied with electrical power by current source 620. Control unit 622 controls the operation of current source 620. In conventional projection displays, the light sources are operated continuously. However, this does not result in the best possible image contrast for a display. When the imaging light modulator is addressed and the pixel information is changing, light is still passing through the imaging light modulator. This lowers the overall contrast of the display.

Figure 12A:
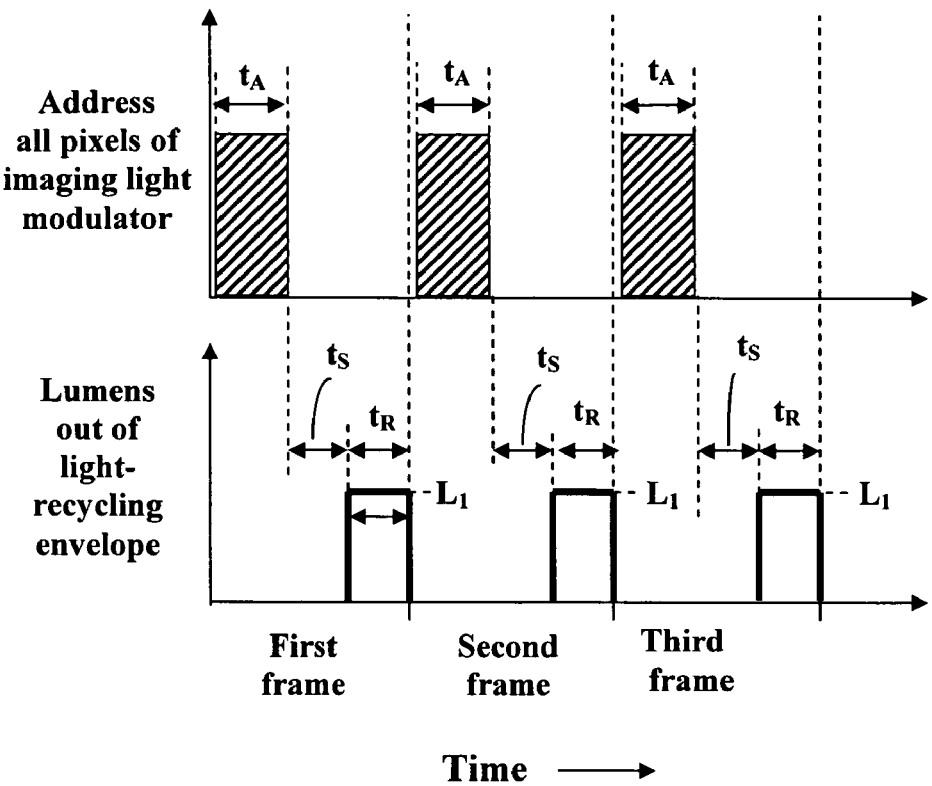
FIGS. 12A and 12B show examples of a time sequence for pulsed light operation of an imaging light modulator.

It is an embodiment of this invention that the current source 424, the current source 520 and the current source 620 are operated in pulsed mode. This operational mode is illustrated in FIG. 12A. During the time $t_A$ that the imaging light modulator is addressed and the image is changing, the LEDs are turned off so that no light is passing through the imaging light modulator. After new pixel information has been addressed to the imaging light modulator and the imaging light modulator has stabilized in an additional time $t_S$ to form a new image, then the LEDs are turned on for a time $t_R$ (where R refers to, for example, red light) at a current level that provides $L_1$ lumens out of the light-recycling cavity. In this manner, the LEDs are turned on only after the imaging light modulator has stabilized to a new image and the contrast of the projection display is maximized.

Figure 12B:
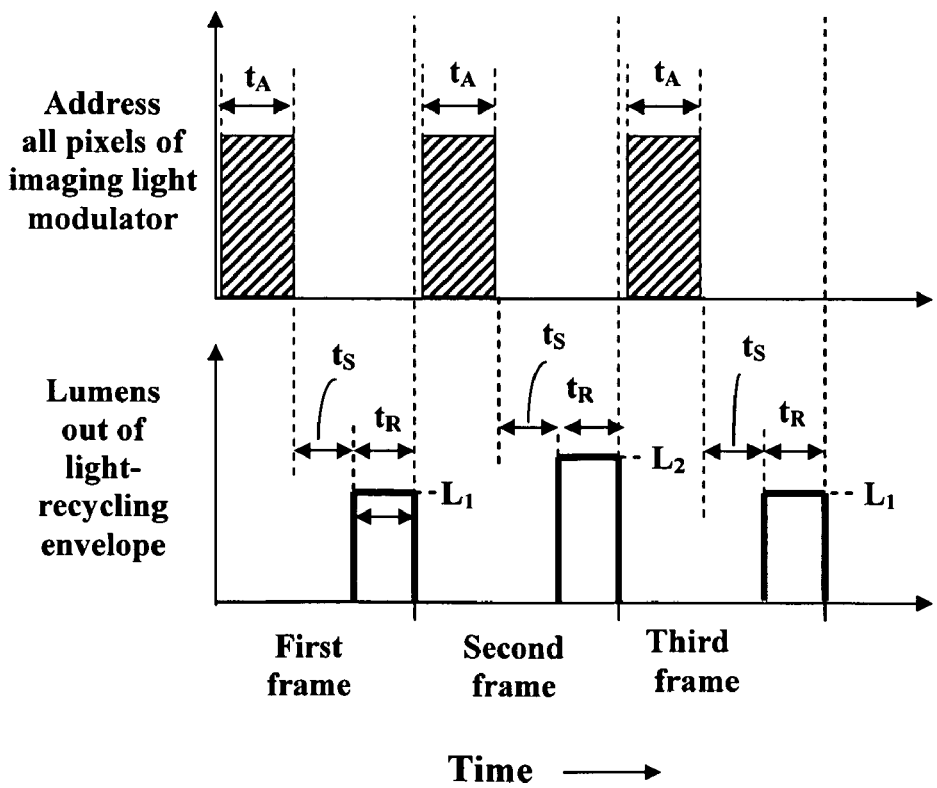

It is another embodiment of this invention that the light output of the light-recycling cavity can be dynamically changed from frame to frame in order to compensate for changes in the ambient brightness surrounding the projection display or to compensate for changes in the image if the projected scene goes from to dark to bright and then back to dark. This is illustrated in FIG. 12B. In the second frame the lumens out $L_2$ is higher than the lumens out $L_1$ for the first and third frame. The light output is controlled by the respective current sources and control units. Dynamically changing the light output allows the imaging light modulator to operate at its maximum contrast for both light and dark scenes.

FIGS. 9, 10 and 11 illustrate embodiments of this invention that comprise one light-recycling illumination system and one imaging light modulator. Other embodiments of this invention are possible that utilize one imaging light modulator but that include, for example, three light-recycling illumination systems and one light-combining means.

Most projection display systems of the prior art utilize three non-identical primary colors, a first color, a second color, and a third color, to form color images. Although not a requirement, in most displays the first color, the second color and the third color are red (R), green (G) and blue (B). It is also possible to use the colors white (W), yellow (Y), cyan (C) and magenta (M) as additional colors in projection displays.

In the embodiments of this invention that follow, the first color, the second color and the third color used for three-color projection display systems are assumed, for purposes of illustration and simplicity, to be the primary colors red, green and blue. The red, green and blue primary colors can each be generated by two methods. The color red, for example, can be generated directly by one or more red-emitting LEDs. However, a second way to generate red light in another embodiment of this invention is to coat one or more ultraviolet-emitting LEDs with a wavelength conversion layer that converts the ultraviolet light into red light. Similarly, the green and blue colors can be generated directly or can be generated by wavelength conversion using ultraviolet emitting LEDs and the appropriate wavelength conversion layers.

A full color image can be formed in a projection display system by concurrently spatially superimposing a red image, a green image and a blue image to form a full-color frame in a frame time period $t_F$. The frame frequency $f_F$ or the number of frames imaged per second is given by the equation $$f_F = 1/t_F.$$ [Equation 7]

In order to form continuously changing images of a moving object that do not flicker, the frame frequency $f_F$ is typically 50 Hz or higher. In other words, at least 50 new full-color frames are formed by the projection display system every second.

A projection display system that utilizes concurrent, spatially superimposed images of three primary colors will generally require three imaging light modulators, one for the red image, one for the green image and one for the blue image. An embodiment of this invention that utilizes three imaging light modulators will be described later in the specification. Furthermore, to fabricate a similar projection display system that uses five primary colors requires five imaging light modulators to generate five independent images that can be concurrently superimposed.

It is also possible to form full-color images in a projection display system using just one imaging light modulator by utilizing a color sequential means to form the images. The color sequential operation of a display is sometimes also called field sequential operation.

To implement color sequential means using three colors, the following sequence of events occurs. The time period for each image frame is divided into three sub-frames. During the first sub-frame, all the pixels of the imaging light modulator are addressed to set the transmission of the imaging light modulator for light of a first color. The light of a first color is emitted from a first plurality of LEDs where each LED has a first reflecting electrode and a second reflecting electrode. A portion of the light of a first color is recycled back to the first reflecting electrodes and the second reflecting electrodes of the first plurality of LEDs to increase the effective brightness of the first plurality of LEDs. A fraction of the light of a first color is partially collimated by a light-collimating means and directed to the imaging light modulator. The imaging light modulator spatially modulates the partially collimated light of a first color to form a first image.

During the second sub-frame, all the pixels of the imaging light modulator are addressed to set the transmission of the imaging light modulator for light of a second color. The light of a second color is emitted from a second plurality of LEDs where each LED has a first reflecting electrode and a second reflecting electrode. A portion of the light of a second color is recycled back to the first reflecting electrodes and the second reflecting electrodes of the second plurality of LEDs to increase the effective brightness of the second plurality of LEDs. A fraction of the light of a second color is partially collimated by a light-collimating means and directed to the imaging light modulator. The imaging light modulator spatially modulates the partially collimated light of a second color to form a second image.

During the third sub-frame, all the pixels of the imaging light modulator are addressed to set the transmission of the imaging light modulator for light of a third color. The light of a third color is emitted from a third plurality of LEDs where each LED has a first reflecting electrode and a second reflecting electrode. A portion of the light of a third color is recycled back to the first reflecting electrodes and the second reflecting electrodes of the third plurality of LEDs to increase the effective brightness of the third plurality of LEDs. A fraction of the light of a third color is partially collimated by a light-collimating means and directed to the imaging light modulator. The imaging light modulator spatially modulates the partially collimated light of a third color to form a third image.

The first image, second image and third images must be generated very rapidly so that the human eye and brain visualize a composite full-color display image instead of three single-color images. An electronic or a computer control unit (not shown) manages the timing sequence for the color sequential means. The first, second and third plurality of LEDs may be a located in the same light-recycling cavity or the first, second and third light sources may be located in separate light-recycling cavities.

Figure 17:
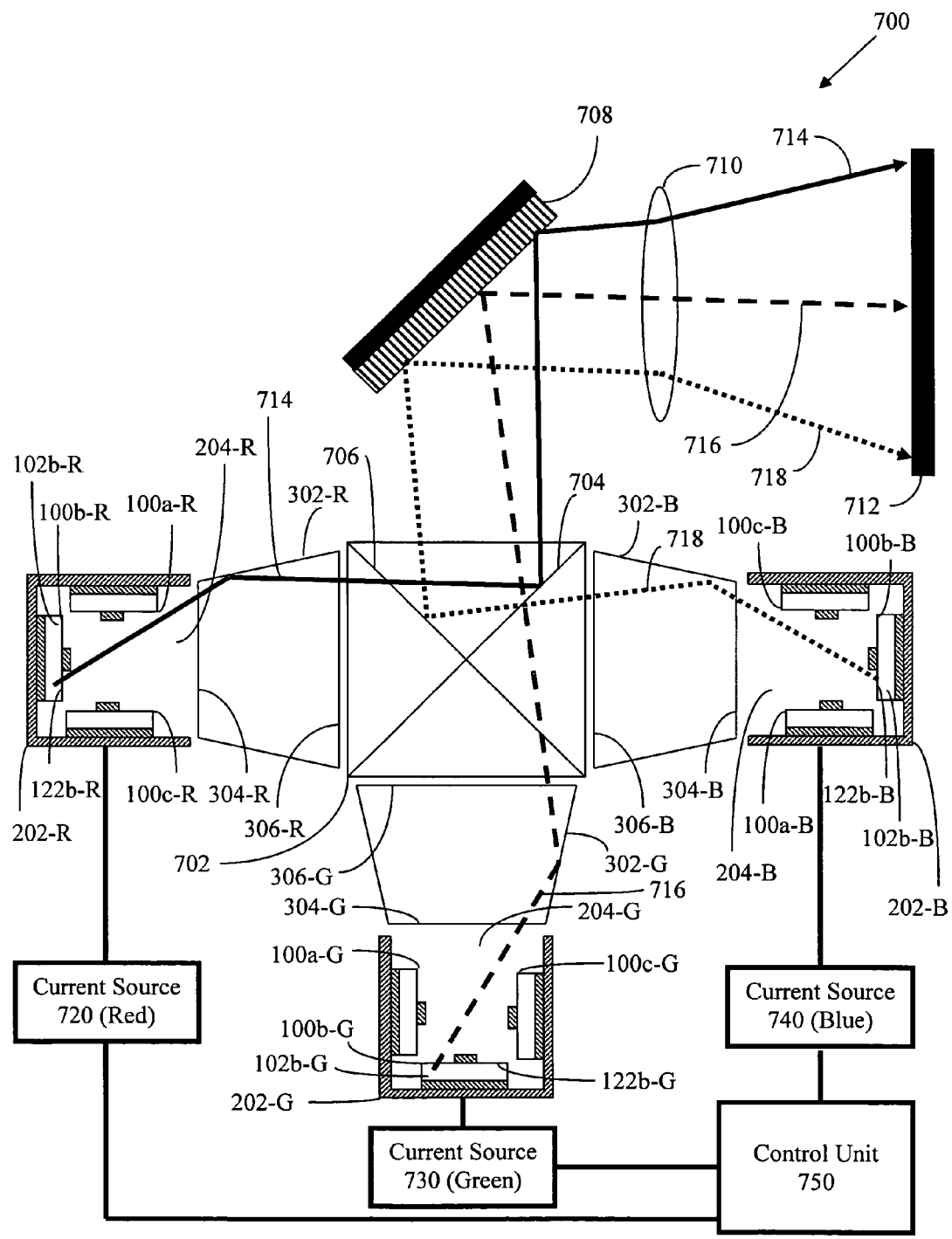
FIG. 17 is a side cross-sectional view of an embodiment of this invention that incorporates three light-recycling illumination systems and one imaging light modulator.

An examples of embodiments of this invention that incorporate only one imaging light modulator and that use a color sequential means to generate full-color images are illustrated in FIG. 17. Utilizing a single imaging light modulator can reduce the cost and optical complexity of the projection display system.

LED-based light sources have several advantages over prior art high-intensity-discharge (HID) lamps for projection display systems utilizing color sequential means to form full-color images. First, LED light sources can be turned off while the imaging light modulator is being addressed for a particular color. HID sources cannot be turned off, which can lower the contrast and image quality of the display.

Second, LED sources can emit one color at a time as required for the color sequential means. This results in a highly efficiency system with no wasted light and no mechanical moving parts. In contrast to this, HID sources emit all colors at the same time. A mechanical color wheel, for example, can be used to select one primary color at a time from the HID source for color sequential operation while discarding the other two primary colors. This is very inefficient and requires mechanical moving parts to select single colors. Color scrolling systems can also be used with HID lamps. The color scrolling systems can use all three colors at the same time but mechanical moving parts are still needed.

Third, LED-based light sources can provide pure primary colors whereas HID sources generate colors that have a wide wavelength range. Starting with pure LED-generated primary colors will increase the color gamut of the projection display.

An embodiment of this invention that utilizes a color sequential means to form full-color images will be described in FIG. 13 using three primary colors. In general, color sequential means can also be done using more than three primary colors. For example, color sequential means can also be accomplished with four, five or six primary colors.

Figure 13:
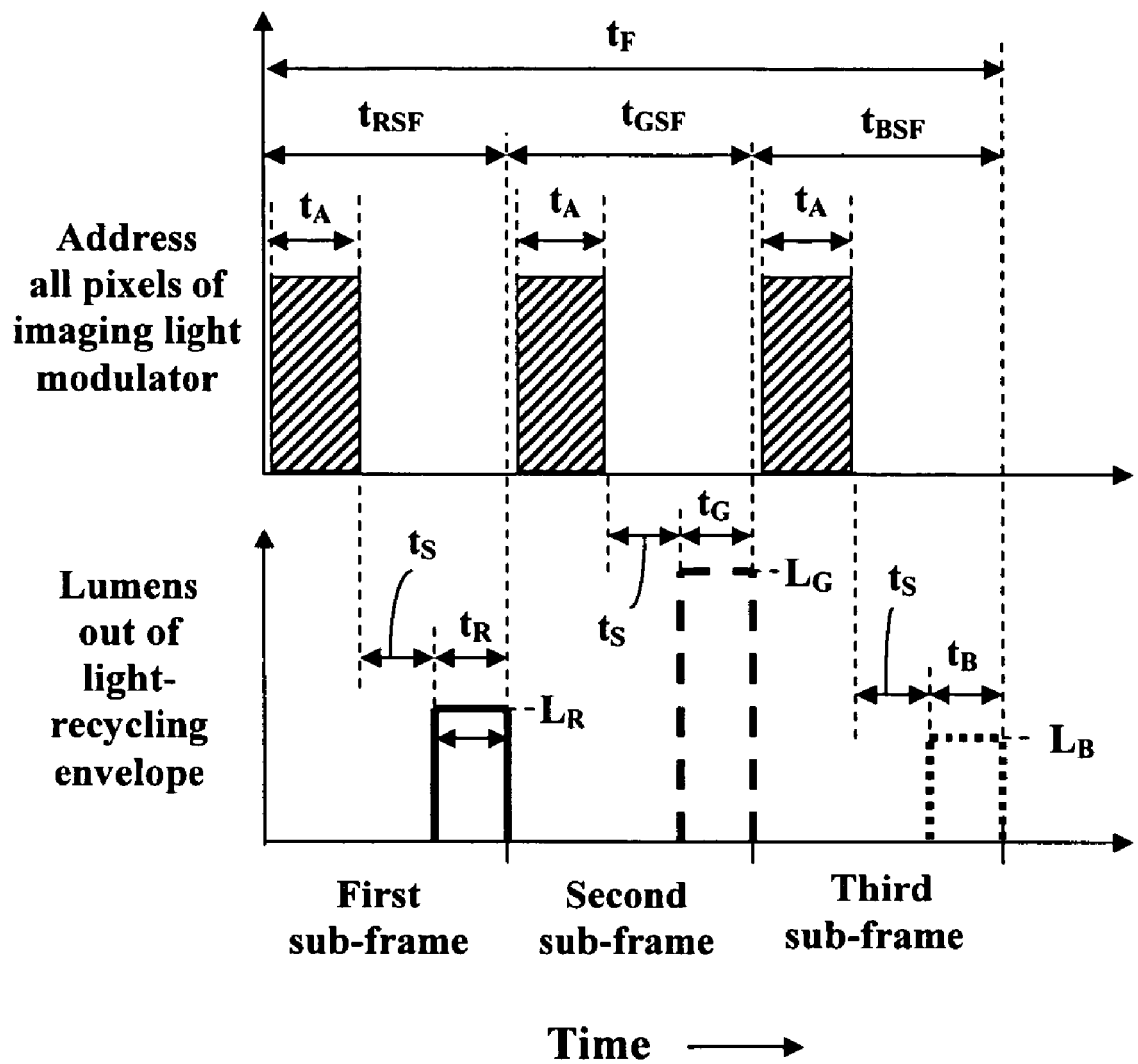
FIG. 13 is an example of a color sequential time sequence for a projection display system that includes one imaging light modulator and three light-recycling illumination systems. The color sequential time sequence utilizes three sub-frames per image frame.

FIG. 13 illustrates an example of the time sequence of events for color sequential operation using three primary colors. The three colors are chosen, for purposes of illustration, to be red, green and blue. This timing sequence is an illustrative example and other timing sequences can be utilized. A control unit (not shown) manages the color sequential operation and divides each frame corresponding to a full-color image and a time period $t_F$ into three sub-frames, one for each primary color. In general, the number of sub-frames per full-color frame equals the number of primary colors used. In color sequential operation, a first image is formed in a first color and in a first sub-frame, a second image is formed in a second color and in a second sub-frame and a third image is formed in a third color and in a third sub-frame. If the time intervals involved are shorter than the response time of the eye and brain, the eye and brain will integrate the three images into one full-color image (or full-color frame). For illustrative purposes, we will assume that the three primary colors are red, green and blue. Then the first image is a red image, the second image is a green image and the third image is a blue image.

At the initial stage of the color sequential operation for three colors as shown in FIG. 12, all LED sources are in the "off" state and do not emit light. At the beginning of the first sub-frame, all the pixels of the imaging light modulator are addressed in time $t_A$ in order to set the transmission of each pixel for the red image. After all pixels are addressed, the imaging light modulator sometimes requires an additional settling time $t_S$ for the pixels to settle to the correct state. Next the red LEDs are turned on and the imaging light modulator is illuminated for a time period $t_R$ in order to form a red image. During the time that the red LEDs are emitting red light, a portion of the red light is recycled back to the red LEDs by the light-recycling cavity to increase the effective brightness of the red LEDs. The light-recycling cavity (for example, the light-recycling cavity 202 in FIG. 16), has an output of $L_R$ lumens of red light during the time period $t_R$. At the end of time $t_R$, the red LEDs are turned off. The sum of the three times, $t_A$ plus $t_S$ plus $t_R$, is equal to the time for the first (red) sub-frame or $t_{RSF}$.

At the start of the second sub-frame, all the LEDs are in the "off" state and all the pixels of the imaging light modulator are addressed in time $t_A$ in order to set the transmission of each pixel for green light. After all pixels are addressed, the imaging light modulator again sometimes requires an additional settling time $t_S$ for the pixels to settle to the correct state. Next the green LEDs are turned on and the imaging light modulator is illuminated for a time period $t_G$ in order to form a green image. During the time that the green LEDs are emitting green light, a portion of the green light is recycled back to the green LEDs by the light-recycling cavity to increase the effective brightness of the green LEDs. The light-recycling cavity has an output of $L_G$ lumens of green light during the time period $t_G$. At the end of time $t_G$, the green LEDs are turned off. The total of the three times, $t_A$ plus $t_S$ plus $t_G$, is equal to the time for the second (green) sub-frame $t_{GSF}$.

At the start of the third sub-frame, all the LEDs are in the "off" state and all the pixels of the imaging light modulator are addressed in time $t_A$ in order to set the transmission of each pixel for blue light. After all pixels are addressed and after an additional settling time $t_S$, the blue LEDs are turned on and the imaging light modulator is illuminated for a time period $t_B$ in order to form a blue image. During the time that the blue LEDs are emitting blue light, a portion of the blue light is recycled back to the blue LEDs by the light-recycling cavity to increase the effective brightness of the blue LEDs. The light-recycling cavity has an output of $L_G$ lumens of blue light during the time period $t_B$. At the end of the time $t_B$, the blue LEDs are turned off. The sum of the three times, $t_A$ plus $t_S$ plus $t_B$, is equal to the time for the third (blue) sub-frame $t_{GSF}$.

If $t_R$ equals $t_O$ equals $t_B$, then the three sub-frame times $t_{RSF}$, $t_{GSF}$ and $t_{BSF}$ are equal in length. It is normal to have sub-frames that are equal in length, but this is not a requirement.

If the projection display uses three primary colors, there will be three sub-frames for every full-color frame. The frequency of the sub-frame images will be three times the frequency of the full-color frames. For example, if the frequency of the full-color frames is 50 Hz, the frequency of the sub-frame images will be 150 Hz. Full-color frame frequencies greater than 50 Hz, corresponding to sub-frame frequencies greater than 150 Hz, may be required in order to form images of moving objects that do not exhibit flicker or color breakup. Color breakup is a stroboscopic effect in which the color images appear as flashes of light rather than continuous images. Color breakup can occur if an observer's eyes move rapidly from point to point on the projected image or color breakup can sometimes be seen in the peripheral vision of the observer's eyes. As an illustrative example, the full-color frame frequency may need to be 75 Hz or higher and the sub-frame frequency may need to be 225 Hz or higher in order to eliminate flicker and color breakup. The maximum sub-frame frequency that can be utilized will depend upon on the time $t_A$ with which the imaging light modulator can be addressed, the settling time $t_S$ of the imaging light modulator and the "on" times of the LEDs.

Normally the red, green and blue LEDs are illuminated in some fixed order and the order does not change. For example, in FIG. 13 the red LEDs are illuminated first, the green LEDs are illuminated second and the blue LEDs are illuminated third. This sequence is then repeated to give the sequence R, G, B, R, G, B, R, G, B and so forth.

One embodiment of this invention is an apparatus and a method for reducing the color breakup phenomenon by randomizing the order in which the red, green and blue LEDs are illuminated. For example, in the first full-color frame, the order of illumination may be R, G and B. In the second full-color frame, the order of illumination may be changed to G, R, and B. In the third full-color frame, the order may be changed again to B, G and R. Storing the R, G, and B images ahead of time in a computer buffer memory and then transferring the images in random order to the imaging light modulator can be used to achieve color randomization. Similar procedures can be done for four-color, five-color and six-color projection display systems.

The brightness of an LED-based projection display system can be changed over a wide operating range without affecting the display image quality or power efficiency. In contrast to this, the brightness of a projection display system that utilizes an HID lamp cannot be dimmed over a wide range without making the HID lamp either unstable or lowering the lamp output efficiency. The overall brightness of an LED-based projection display of this invention can be specified by setting the output lumens of the light-recycling cavity to some predetermined values. For example, when the red LEDs are on, the red light output exiting the light-recycling cavity can be set to $L_R$ lumens for a time period of $t_R$ as illustrated in FIG. 13. When the green LEDs are on, the green light output can be set to $L_G$ lumens for a time period of $t_G$. When the blue LEDs are on, the blue light output can be set to $L_B$ lumens for a time period of $t_B$. Sometimes one would like to raise or lower the overall brightness of the projection display in order to compensate for changes in the ambient light level but without changing the output grayscale range of the display. For example, at night in a darkened room, the brightness of the display can be lower than the display brightness in bright sunlight.

One embodiment of this invention is an apparatus and a method for modifying the overall brightness of the projection display system while retaining the full grayscale range of the imaging light modulator. One can lower the overall brightness of the LED-based projection display in two different ways. Assume, for example, that one wants to lower the overall brightness by 50 percent. One method is to lower each of the LED outputs, the red light output $L_R$ from the first light source, the green light output $l_G$ from the second light source and the blue light output $L_B$ from the third light source, by the same numerical factor of 50 percent. The second method is to cut each of the LED "on" times, the red light emitting time $t_R$, the green light emitting time $t_G$ and blue light emitting time $t_B$, by the same numerical factor of 50 percent. Either method will lower the display brightness and not effect the grayscale range of the imaging light modulator. Similar procedures can be done for four-color, five-color and six-color projection display systems.

The color temperature of a HID-lamp based projection display system cannot be adjusted by changing the lamp color temperature. HID lamps are normally run at one electrical power setting that gives a maximum output efficiency and has just one color temperature. If one wishes to affect a change of color temperature for the HID-based display, the settings of the imaging light modulator must be modified.

One embodiment of this invention is an apparatus and a method for modifying the color temperature of a projection display system without affecting the imaging light modulator. In contrast to an HID-lamp based projection display, it is easy to change the effective color temperature of an LED-based projection display system. If one assumes that the LED "on" times $t_R$, $t_G$ and $t_B$ as shown in FIG. 13 are equal, then one can provide one color temperature by setting the ratio of the LED outputs, the red light output $L_R$, the green light output $L_G$ and the blue light output $L_B$, to some value. For example, setting $L_R:L_G:L_B$ equal to 12:80:8 will give one color temperature. To change the color temperature, it is only necessary to change the $L_R:L_G:L_B$ ratio. For example, one can change to the ratio $L_R:L_G:L_B$ equal to 15:80:5. The latter ratio has more red light and less blue light than the previous ratio and results in a lower color temperature. Note that it is also possible to change the color temperature of the display by changing the ratio of the LED "on" times rather than the ratio of the LED light output. For example, instead of setting the ratio of the red light emitting time $t_R$ to the green light emitting time $t_G$ to the blue light emitting time $t_B$ (or $t_R:t_G:t_B$) equal to 1:1:1, the ratio can be changed to 1.05:1.00:0.95. The latter ratio again will produce more red light and less blue light coming from the display and result in a lower color temperature. Similar procedures can be done for four-color, five-color and six-color projection display systems.

Figure 14:
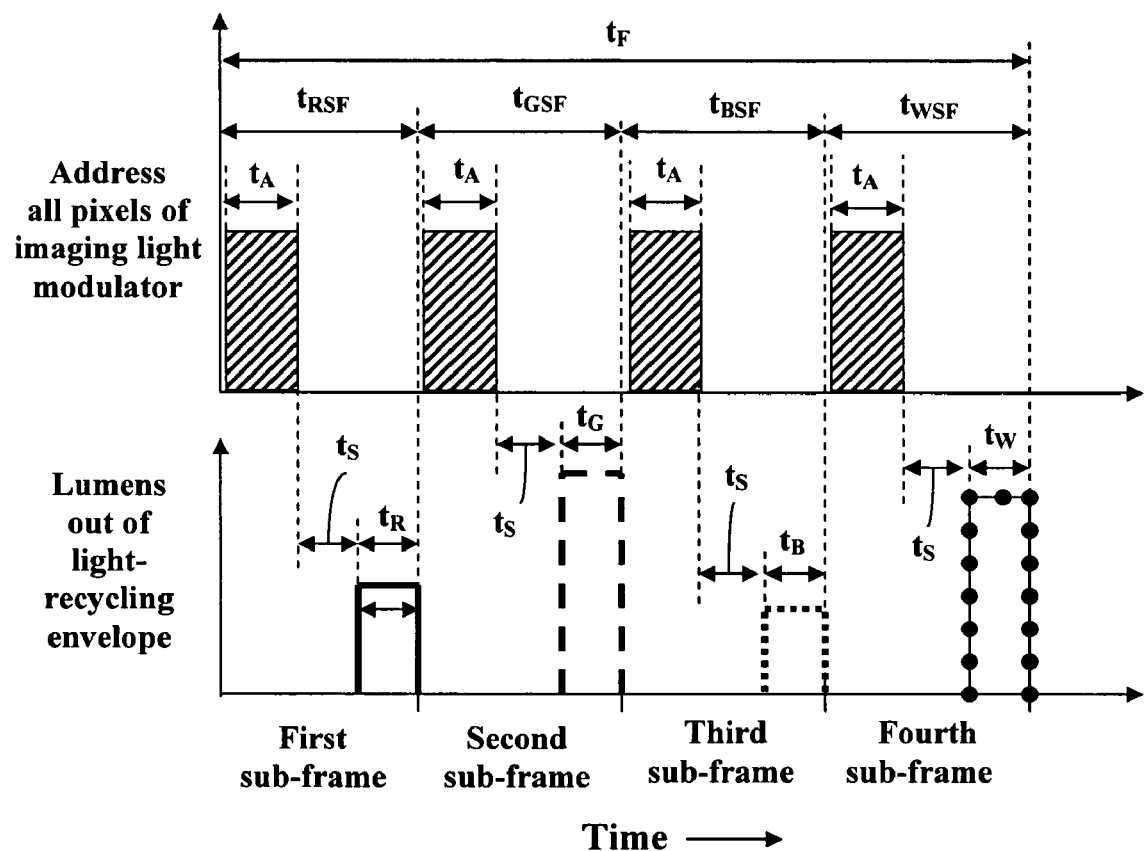
FIG. 14 is an example of a color sequential time sequence that utilizes four sub-frames per image frame.

The color sequential means illustrated in FIG. 13 is a three-color system with three sub-frame images per full-color frame. It is also possible to have a color sequential means that utilizes four colors and has four sub-frame images per full-color frame. Examples of the fourth color include, but are not limited to, white, yellow, cyan and magenta. An embodiment of this invention utilizing a four-color, color sequential means is illustrated in FIG. 14 using white light as the fourth color. Using white light as an additional color can increase the brilliance or sparkle of projection images of bright objects.

White light can be generated by several different methods. A few examples of the methods are listed here. First, illuminating simultaneously the red, green and blue LEDs that are used in the first, second and third sub-frames can generate white light. No additional LEDs are needed for this first method. Second, adding an additional one or more blue LEDs that are coated with green and red wavelength conversion layers will generate white light by combining the blue light from the LED with the green and red light generated by the two wavelength conversion layers. Third, adding one or more ultraviolet-emitting LEDs that are coated with red, green and blue wavelength conversion layers will generate white light by combining the red, green and blue light generated by the three wavelength conversion layers.

FIG. 14 is similar to FIG. 13 except for the addition of the fourth (white) sub-frame of the color sequential means. The operation of first three sub-frames is the same as described above for FIG. 13. The operation of the fourth sub-frame is as follows. At the start of the fourth sub-frame, all the LEDs are in the "off" state and all the pixels of the imaging light modulator are addressed in time $t_A$ in order to set the transmission of each pixel for white light. After all pixels are addressed, the imaging light modulator sometimes requires an additional settling time $t_S$ for the pixels to settle to the correct state. Next the white light is turned on and the imaging light modulator is illuminated for a time period $t_B$ in order to form a white image. During the time that the white light is being emitted, a portion of the light is recycled back to the first reflecting electrodes and the second reflecting electrodes of the emitting LEDs to increase the effective brightness of the emitting LEDs. The light-recycling cavity or envelopes have an output of $L_W$ lumens of white light during the time period $t_W$. At the end of the time $t_W$, the white light is turned off. The sum of the three times, $t_A$ plus $t_S$ plus $t_W$, is equal to the time for the fourth (white) sub-frame $t_{WSF}$.

Figure 15:
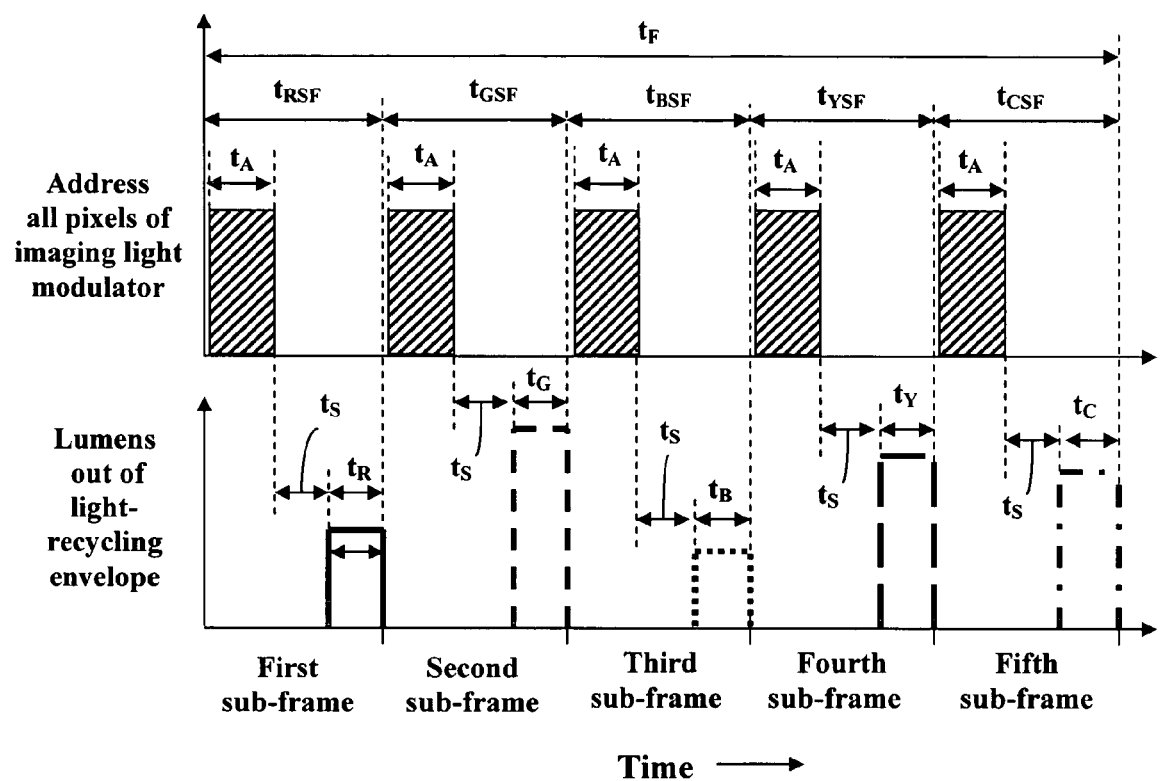
FIG. 15 is an example of a color sequential time sequence that utilizes five sub-frames per image frame.

It is also possible to have a color sequential means that utilizes five or six colors and has, respectively, five or six sub-frame images per full-color frame. Examples of the fifth and sixth colors include, but are not limited to, white, yellow, cyan and magenta. An embodiment of this invention utilizing a five-color, color sequential means is illustrated in FIG. 15. FIG. 15 is similar to the example in FIG. 13 except for the additions of yellow as the fourth color and cyan as the fifth color. Note that one could also produce a six-color display using the five colors in FIG. 15 plus adding magenta as the sixth color.

Figure 3A:
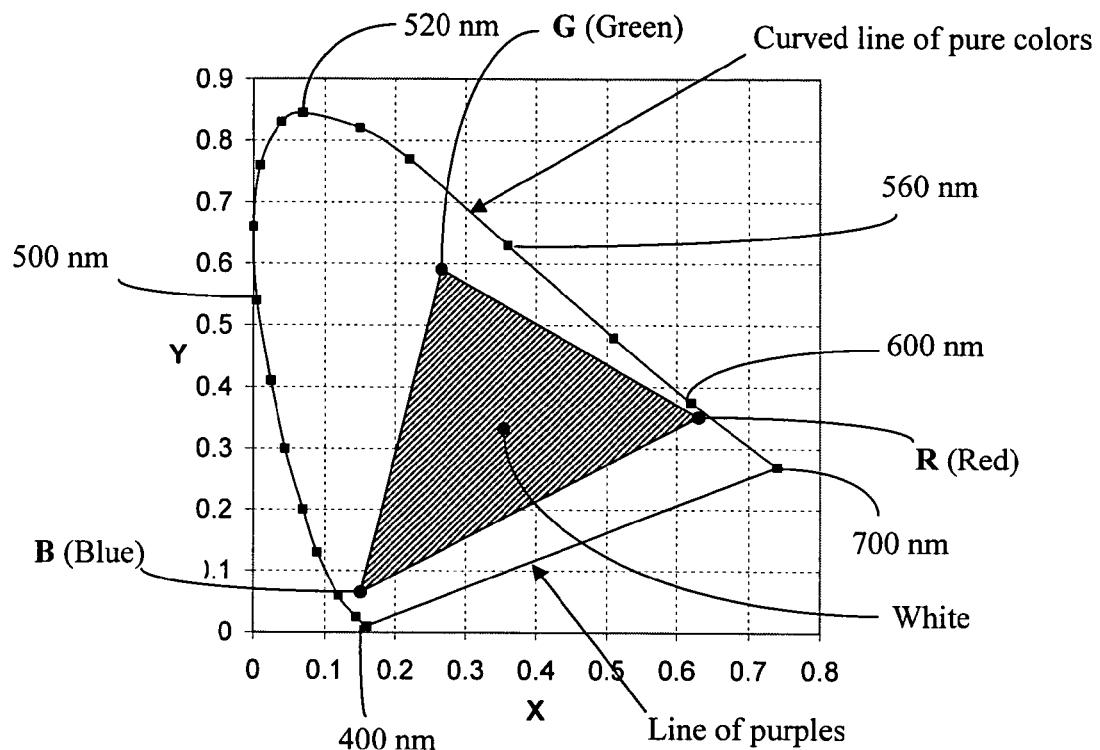
FIGS. 3A and 3B are examples of CIE Chromaticity Diagrams.
Figure 3B:
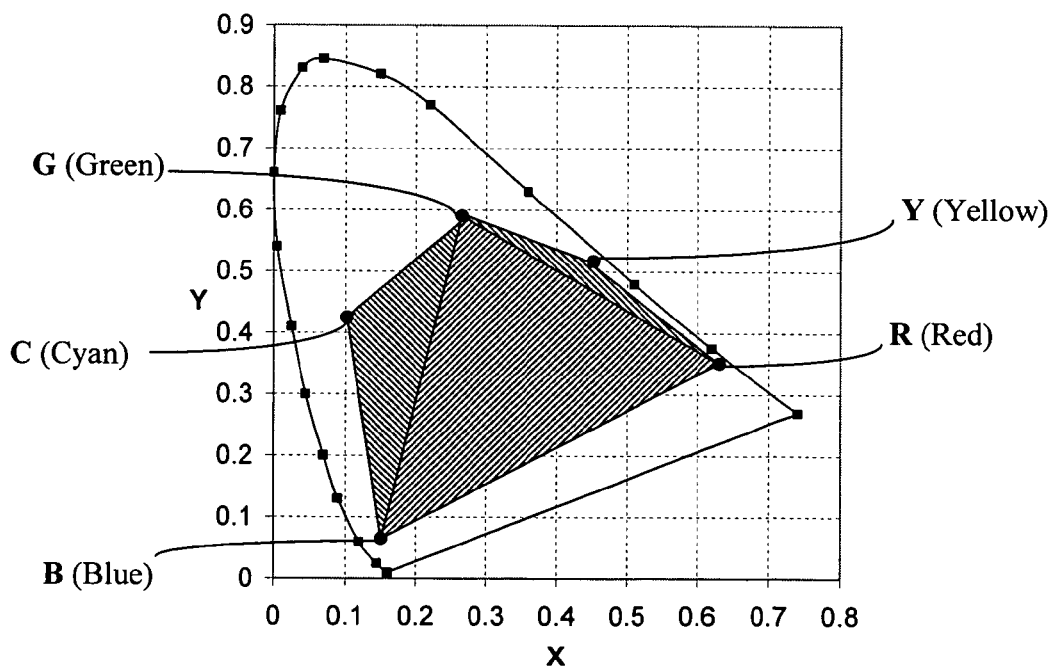
Figure 16:
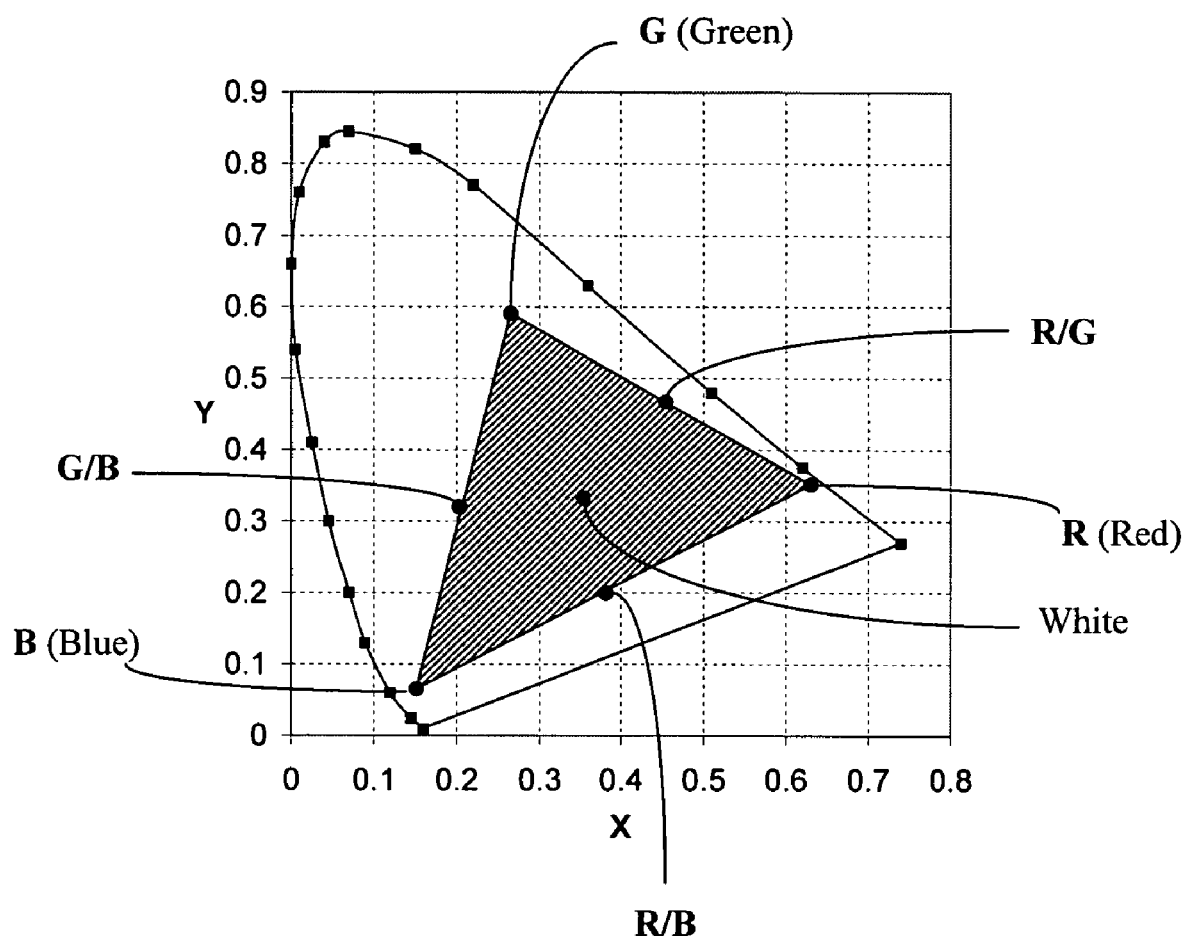
FIG. 16 is another example of a CIE Chromaticity Diagram.

The color yellow can be produced two different ways. First, one can utilize one or more yellow-emitting LEDs to produce yellow light. Adding separate yellow-emitting LEDs will increase the color gamut of the projection display as illustrated in FIG. 3B. Second, one can simultaneously illuminate the red LEDs and the green LEDs that are already incorporated in the projection display system. Illuminating both sets of LEDs simultaneously will generate yellow light. Producing yellow light by the second method can increase the number of grayscale levels that can be produced by the display, but will not increase the color gamut of the display. The resulting color gamut is illustrated in FIG. 16. The color yellow generated by simultaneously illuminating the red and green LEDs will produce the spot R/G shown on the CIE diagram in FIG. 16. The R/G spot is on the line connecting the colors R and G.

The color cyan can also be produced two different ways. First, one can utilize one or more cyan-emitting LEDs to produce cyan light. Adding separate cyan-emitting LEDs will increase the color gamut of the projection display as illustrated in FIG. 3B. Second, one can simultaneously illuminate the green LEDs and the blue LEDs that are already incorporated in the projection display system. Illuminating both sets of LEDs simultaneously will generate cyan light. Producing cyan light by the second method can again increase the number of grayscale levels that can be produced by the display, but will not increase the color gamut of the display. As illustrated in FIG. 16, the color cyan generated by simultaneously illuminating the green and blue LEDs will produce the spot G/B shown on the CIE diagram. The G/B spot is on the line connecting the colors G and B.

The color magenta is not a pure color. It can be generated by simultaneously illuminating the red LEDs and the blue LEDs that are already incorporated in the projection display system. Producing magenta light by this method can increase the number of grayscale levels that can be produced by the display, but will not increase the color gamut of the display. The color magenta generated by simultaneously illuminating the red and blue LEDs will produce the spot R/B shown on the CIE diagram shown in FIG. 16. The R/B spot is on the line connecting the colors R and G.

FIG. 15 is similar to FIG. 13 except for the addition of the fourth (yellow) sub-frame and the fifth (cyan) sub-frame of the color sequential means. The operation of first three sub-frames is the same as described above for FIG. 13. The operation of the fourth sub-frame in FIG. 15 is as follows. At the start of the fourth sub-frame, all the LEDs are in the "off" state and all the pixels of the imaging light modulator are addressed in time $t_A$ in order to set the transmission of each pixel for yellow light. After all pixels are addressed, the imaging light modulator sometimes requires an additional settling time $t_S$ for the pixels to settle to the correct state. Next the yellow light is turned on and the imaging light modulator is illuminated for a time period $t_Y$ in order to form a yellow image. During the time that the yellow light is being emitted, a portion of the yellow light is recycled back to the emitting LEDs by the light-recycling cavity to increase the effective brightness of the emitting LEDs. The light-recycling cavity has an output of $L_Y$ lumens of yellow light during the time period $t_Y$. At the end of the time $t_Y$, the yellow light is turned off. The sum of the three times, $t_A$ plus $t_S$ plus $t_Y$, is equal to the time for the fourth (yellow) sub-frame $t_{YSF}$.

At the start of the fifth sub-frame in FIG. 15, all the LEDs are in the "off" state and all the pixels of the imaging light modulator are addressed in time $t_A$ in order to set the transmission of each pixel for cyan light. After all pixels are addressed and after an additional settling time $t_S$, the cyan light is turned on and the imaging light modulator is illuminated for a time period $t_C$ in order to form a cyan image. During the time that the cyan light is being emitted, a portion of the cyan light is recycled back to the emitting LEDs by the light-recycling cavity to increase the effective brightness of the emitting LEDs. The light-recycling cavity has an output of $L_C$ lumens of cyan light during the time period $t_C$. At the end of the time $t_C$, the cyan light is turned off. The sum of the three times, $t_A$ plus $t_S$ plus $t_C$, is equal to the time for the fifth (cyan) sub-frame $t_{CSF}$.

The above examples illustrate the time sequence of events for the operation of a projection display system by color sequential means. One illustrative example of a projection display system that utilizes the color sequential means will now be described.

Another embodiment of this invention is projection display system 700 illustrated in a side cross-sectional view in FIG. 17. Projection display system 700 incorporates a single imaging light modulator and utilizes a color sequential means for image formation. FIG. 17 is similar to FIG. 11 except that FIG. 17 includes three light-recycling illumination systems, each for a different color, and a light-combining means to combine the three colors from the three light-recycling illumination systems. One of the light-recycling illumination systems contains a plurality of red LEDs, one of the light-recycling illumination systems contains a plurality of green LEDs and one of the light-recycling illumination systems contains a plurality of blue LEDs.

The main elements of the projection display system 700 are the three light-recycling illumination systems, a light-combining means 702, an imaging light modulator 708, a projection lens 710 and a viewing screen 712. The light-recycling illumination systems include, respectively, three LED light sources, three light-recycling cavities 202-R, 202-G and 202-B, three light output apertures 204-R, 204-G and 204-B and three light-collimating means 302-R, 302-G and 302-B. The letters "R", "G" and "B" denote, respectively, the colors red, green and blue. Light-recycling cavity 202-R encloses nine red-emitting LEDs, light-recycling cavity 202-G encloses nine green-emitting LEDs and light-recycling cavity 202-B encloses nine blue-emitting LEDs. Only three of the nine LEDs in each light-recycling cavity are illustrated in the side cross-sectional view in FIG. 17. The characteristics and properties of the LEDs, the light-recycling cavities, the light output apertures and the light-collimating means have been described previously in the descriptions for FIGS. 4, 5 and 7. For each of the three light-recycling illumination systems, the area of the light output aperture 204-R, 204-G or 204-B is less than the total light-emitting area of the respective plurality of LEDs and, in some cases, the maximum exiting luminance from the light output aperture 204-R. 204-G or 204-B is greater than the respective maximum intrinsic source luminance of the plurality of LEDs.

Although light-recycling cavity 202-R encloses nine red LEDs, it is within the scope of this invention that light-recycling cavity 202-R may enclose more or less than nine red LEDs. Likewise, light-recycling cavity 202-G may enclose more or less than nine green LEDs and light-recycling cavity 202-B may enclose more or less than nine blue LEDs. It is also within the scope of this invention that red light may be produced inside light-recycling cavity 202-R by a plurality of ultraviolet LEDs that are coated with a wavelength conversion material in order to convert ultraviolet light to red light. Green light and blue light may also be produced by wavelength conversion if desired.

It is also an embodiment of this invention that if the light-recycling cavity, such as light-recycling cavity 202-G, encloses a plurality of green LED, the green LEDs may emit different wavelengths of green light. For example, multiple green LEDs may each emit a different wavelength in the 510-nm to 540-nm wavelength range. Using multiple green LEDs that emit different wavelengths of green light will increase the color gamut of the projection display system. Similarly, a light-recycling cavity that contains multiple red LEDs may utilize red LEDs that emit more than one wavelength of red light and a light-recycling cavity that contains multiple blue LEDs may utilize blue LEDs that emit more than one wavelength of blue light.

The imaging light modulator 708 in projection display system 700 is a DLP device. Because DLP devices are not polarization sensitive, polarizing elements are not required in projection display system 700. Projection display system 700 utilizes a color sequential means for image formation. The DLP imaging light modulator was chosen for illustrative purposes. The single imaging light modulator may also be an LCD or an LCOS imaging light modulator if the appropriate polarization optics are included Because the red light, green light and blue light are generated in three separate light-recycling cavities, a light-combining means is required to combine the resulting three light beams into one beam. Examples of light-combining means include, but are not limited to, an x-cube prism and a Philips prism. The Philips prism is a trichroic prism assembly comprising three prisms.

Figure 18:
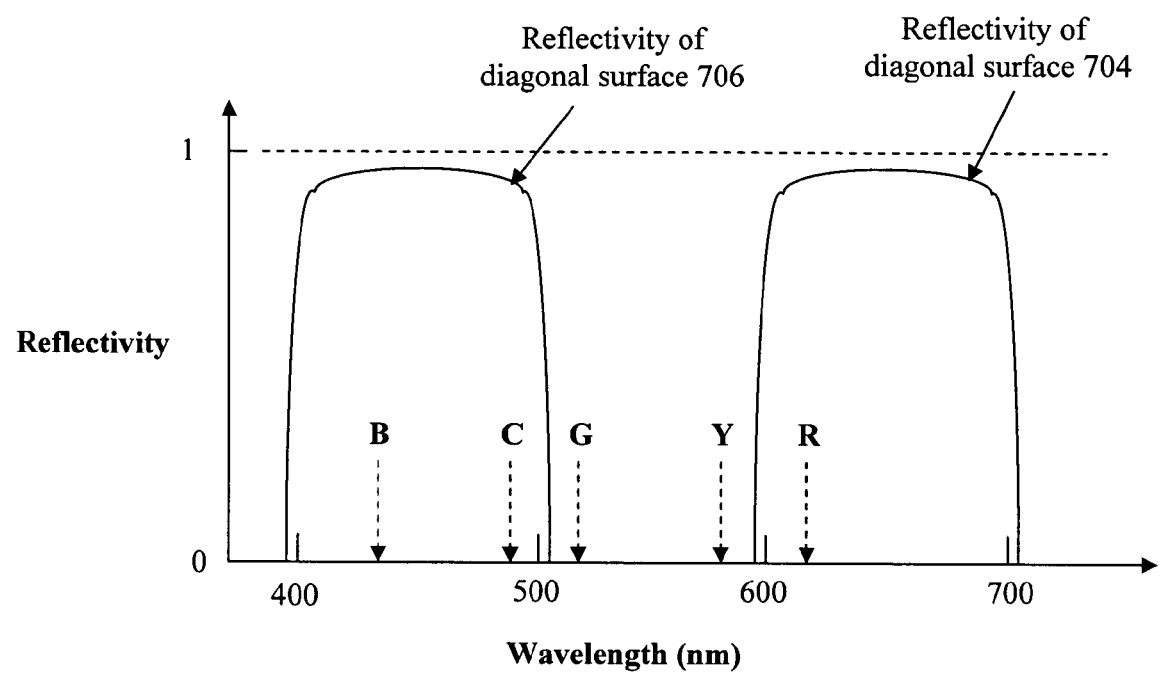
FIG. 18 is an example of the reflectivity of two diagonal surfaces of an x-cube prism.

In FIG. 17, the light-combining means is an x-cube prism 702. The x-cube prism 702 has two partially reflecting diagonal surfaces. Examples of the approximate reflectivity of the diagonal surface 704 and the approximate reflectivity of the diagonal surface 706 are illustrated schematically in FIG. 18. The reflectivity curves in FIG. 18 are illustrative examples and are not meant to limit the reflectivity of the diagonal surface 704 and diagonal surface 706 to the illustrated wavelength dependences. Diagonal surface 704 reflects light having wavelengths between approximately 600-nm and approximately 700-nm and transmit light having wavelengths between approximately 400 -nm and 600-nm. The 600-nm to 700-nm reflective range includes red (R) light. Diagonal surface 706 reflects light having wavelengths between approximately 400 -nm and approximately 500-nm and transmits light having wavelengths between approximately 500-nm and 700-nm. The 400 -nm to 500-nm reflective range includes blue (B) light and cyan (C) light. Diagonal surfaces 704 and 706 both transmit light between approximately 500-nm and 600-nm. The 500-nm to 600-nm range includes green (G) light and yellow (Y) light. R, G, B, Y, and C are not single wavelengths but can each vary over a range of wavelengths. Approximate wavelengths of R, G, G, Y and C that can be used for display applications are indicated in FIG. 18.

Projection display system 700 is illustrated in FIG. 17 as a three-color display. However, since diagonal surface 706 can reflect both blue and cyan light, it is also within the scope of this invention to incorporate both blue-emitting and cyan-emitting LEDs inside light-recycling cavity 202-B. Likewise, since both diagonal surface 704 and diagonal surface 706 can transmit both green and yellow light, it is also within the scope of this invention to incorporate both green-emitting and yellow-emitting LEDs inside light-recycling cavity 202-G. Using four or five primary colors and a color sequential means utilizing, respectively, four or five sub-frames per image frame, it is possible to produce a four or five-color projection display system by suitably modifying projection display system 700.

Representative light rays 714, 716 and 718 in FIG. 17, combined with the time sequence of the color sequential means shown in FIG. 13, illustrate the operation of projection display system 700. Although only three light rays of the second polarization state are shown in FIG. 17, light rays of the first polarization state will behave in a similar way. Multiple ray reflections inside the light-recycling cavities 202-R, 202-G and 202-Bc are also not shown in order to simplify the figure.

In the first sub-frame of the color sequential time sequence, red light ray 714 of a second polarization state is emitted by multilayer semiconductor structure 102b-R of LED 100b-R and passes through surface 122b-R of LED 100b-R. Red light ray 714 of a second polarization state passes through the interior of light-recycling cavity 202-R and passes through light output aperture 204-R. Red light ray 714 of a second polarization state is partially collimated by light-collimating means 302-R, is reflected by diagonal surface 704 of x-cube prism 702 and is directed to a pixel of imaging light modulator 708. The pixel of imaging light modulator 708 forms one pixel of a red image by reflecting all or part of red light ray 714 of a second polarization state to projection lens 710 and to viewing screen 712.

In a second sub-frame of the color sequential time sequence, green light ray 716 of a second polarization state is emitted by multilayer semiconductor structure 102b-G of LED 100b-G and passes through surface 122b-G of LED 100b-G. Green light ray 716 of a second polarization state passes through the interior of light-recycling cavity 202-G and passes through light output aperture 204-G. Green light ray 716 of a second polarization state is partially collimated by light-collimating means 302-G, passes through x-cube prism 702 without reflection and is directed to a pixel of imaging light modulator 708. The pixel of imaging light modulator 708 forms one pixel of a green image by reflecting all or part of green light ray 716 of a second polarization state to projection lens 710 and to viewing screen 712.

In a third sub-frame of the color sequential time sequence, blue light ray 718 of a second polarization state is emitted by multilayer semiconductor structure 102b-B of LED 100b-B and passes through surface 122b-B of LED 100b-B. Blue light ray 718 of a second polarization state passes through the interior of light-recycling cavity 202-B, passes through light output aperture 204-B, is partially collimated by light-collimating means 302-B, is reflected by diagonal surface 706 of x-cube prism 702 and is directed to a pixel of imaging light modulator 708. The pixel of imaging light modulator 708 forms one pixel of a blue image by reflecting all or part of blue light ray 718 of a second polarization state to projection lens 710 and to viewing screen 712.

Current source 720 supplies electrical power to the red LEDs in light-recycling cavity 202-R. Current source 730 supplies electrical power to the green LEDs in light-recycling cavity 202-G. Current source 740 supplies electrical power to the blue LEDs in light-recycling cavity 202-B. Control unit 750 regulates the color sequential operation of the three current sources. The light output directed to viewing screen 712 can be dynamically changed from image frame to image frame in order to compensate for changes in the ambient brightness surrounding the projection display or to compensate for changes in the projected image if the projected scene goes from to dark to bright and then back to dark. The light output is controlled by the respective current sources 720, 730 and 740 and control unit 750. Dynamically changing the light output allows the imaging light modulator to operate at its maximum contrast for both light and dark scenes.

One can lower the overall brightness on viewing screen 712 of the projection display system 700 in two different ways. Assume, for example, that one wants to lower the overall brightness by 50 percent. One method is to lower each of the light-recycling cavity outputs by the same numerical factor. For example, the red light output $L_R$ from light-recycling cavity 202-R, the green light output $L_G$ from the light-recycling cavity 202-G and the blue light output $L_B$ from the light-recycling cavity 202-B, can each be lowered by the same numerical factor of 50 percent. The second method is to cut each of the LED "on" times, the red light emitting time $t_R$, the green light emitting time $t_G$ and blue light emitting time $t_B$, by the same numerical factor of 50 percent. Either method will lower the display brightness and not effect the grayscale range of the imaging light modulator.

One can also change the color temperature of the light output of projection display system 700. If one assumes that the LED "on" times $t_R$, $t_G$ and $t_B$ as shown in FIG. 13 are equal, then one can provide one color temperature by setting the ratio of the LED outputs, the red light output $L_R$, the green light output $L_G$ and the blue light output $L_B$, to some value. For example, setting $L_R:L_G:L_B$ equal to 12:80:8 will give one color temperature. To change the color temperature, it is only necessary to change the $L_R:L_G:L_B$ ratio. For example, one can change to the ratio $L_R:L_G:L_B$ equal to 15:80:5. The latter ratio has more red light and less blue light than the previous ratio and results in a lower color temperature. Note that it is also possible to change the color temperature of the display by changing the ratio of the LED "on" times rather than the ratio of the LED light output. For example, instead of setting the ratio of the red light emitting time $t_R$ to the green light emitting time $t_G$ to the blue light emitting time $t_B$ (or $t_R:t_G:t_B$) equal to 1:1:1, the ratio can be changed to 1.05:1.00:0.95. The latter ratio again will produce more red light and less blue light coming from the display and result in a lower color temperature.

The previous example of a projection display systems includes of one imaging light modulator and a color sequential means to form images. It is also possible to construct projection display systems that incorporate three imaging light modulators. Such systems can form the red, green and blue images simultaneously and do not require a color sequential means to form full-color images. Embodiments of this invention that incorporate three imaging light modulators can be constructed with LCOS, DLP or LCD devices as the imaging light modulators. Two embodiment that incorporates LCD devices are illustrated in the following figures.

Figure 19:
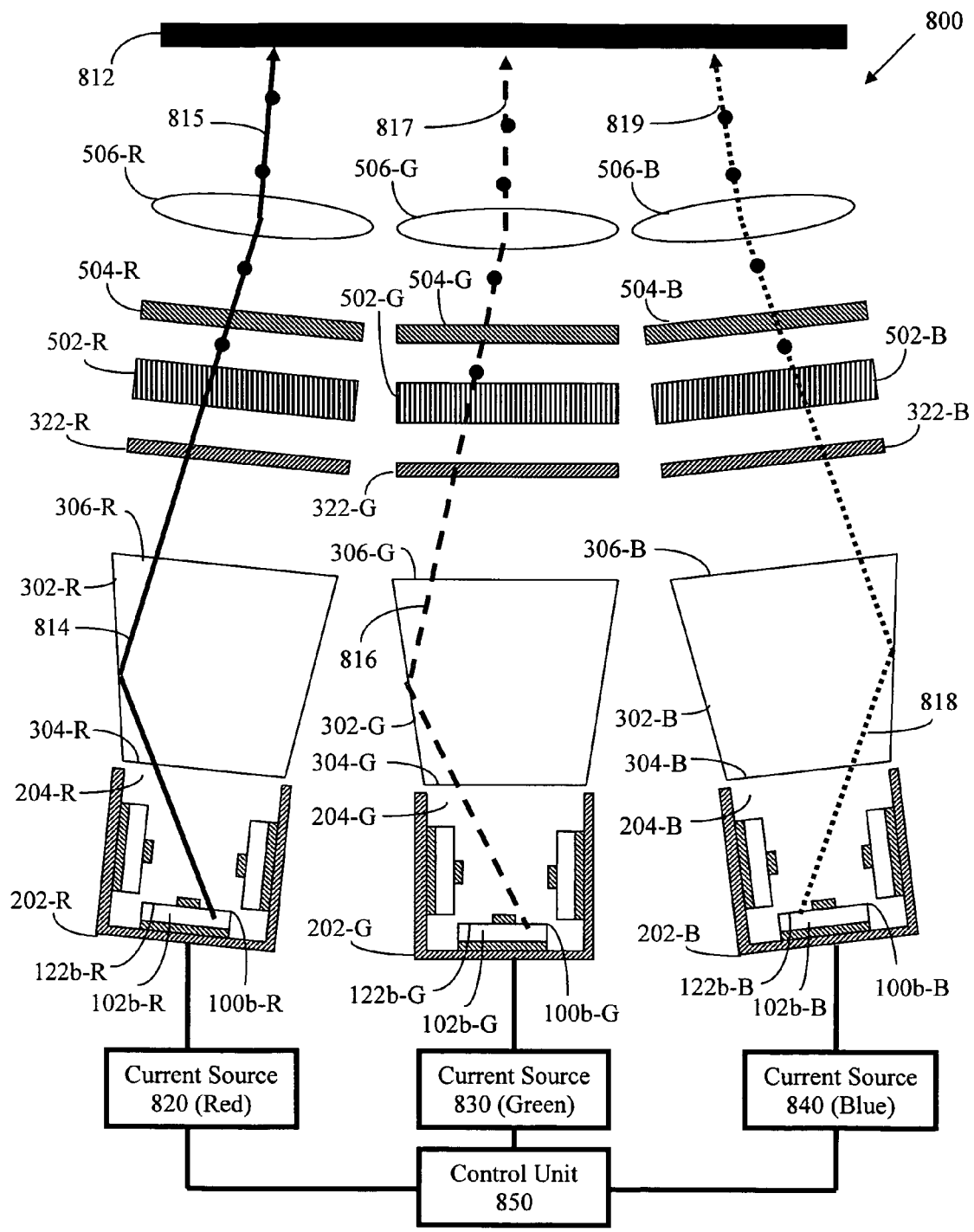
FIG. 19 is a side cross-sectional view of another embodiment of this invention that incorporates three light-recycling illumination systems, three imaging light modulators, three projection lenses and one viewing screen.

FIG. 19 is a side cross-sectional view of another embodiment of this invention, projection display system 800, that includes three light-recycling illumination systems and three imaging light modulators. This embodiment combines three projection display systems, such as projection display system 500, into one projection display system 800 that has one viewing screen 812. The main elements of the projection display system 800 are three light-recycling illumination systems, three first reflective polarizers 322-R, 322-G and 322-B, three imaging light modulators 502-R, 502-G and 502-B, three second polarizers 504-R, 504-G and 504-B, three projection lenses 506-R, 506-G and 506-B and a viewing screen 812. The three light-recycling illumination systems include, respectively, three pluralities of LEDs, three light-recycling cavities 202-R, 202-G and 202-B, three light output apertures 204-R, 204-G and 204-B and three light-collimating means 302-R, 302-G and 302-B. Light-recycling cavity 302-R encloses nine red-emitting LEDs. Light-recycling cavity 302-G encloses nine green-emitting LEDs. Light-recycling cavity 302-B encloses nine blue-emitting LEDs. Only three of the nine LEDs in each light-recycling cavity are illustrated in the side cross-sectional view in FIG. 19. The characteristics and properties of the LEDs, the light-recycling cavities and the light-collimating means have been described previously in the descriptions for FIGS. 4, 5 and 7. For each of the three light-recycling illumination systems, the area of the light output aperture 204-R, 204-G or 204-B is less than the total light-emitting area of the respective plurality of LEDs and, in some cases, the maximum exiting luminance from the light output aperture 204-R, 204-G or 204-B is greater than the respective maximum intrinsic source luminance.

Although light-recycling cavity 202-R in FIG. 19 has nine red LEDs, it is within the scope of this invention that light-recycling cavity 202-Ra may enclose more or less than nine red LEDs. Likewise, light-recycling cavity 202-G may enclose more or less than nine green LEDs and light-recycling cavity 202-B may enclose more or less than nine blue LEDs. It is also within the scope of this invention that red light may be produced inside light-recycling cavity 202-R by a plurality of ultraviolet LEDs that are coated with a wavelength conversion layer in order to convert ultraviolet light to red light. Green light and blue light may also be produced by wavelength conversion layers if desired.

Representative light rays 814, 815, 816, 817, 818 and 819 in FIG. 19 illustrate the operation of projection display system 800. Multiple ray reflections of light rays 814, 816 and 818 inside the respective light-recycling cavities 202-R, 202-G and 202-B are not shown in order to simplify the figure.

Red light ray 814 of a second polarization state is emitted by the multilayer semiconductor structure 102b-R of LED 100b-R on the third side of light-recycling cavity 202-R and passes through surface 122b-R of LED 100b-R. Red light ray 814 of a second polarization state passes through the interior of light-recycling cavity 202-R, passes through light output aperture 204-R, is partially collimated by light-collimating means 302-R, passes through planar reflective polarizer 322-R and is directed to a pixel of imaging light modulator 502-R. The pixel of imaging light modulator 502-R converts all or part of red light ray 814 of a second polarization state into light ray 815 of a first polarization state, forming one pixel of an image. Red light ray 815 of a first polarization state passes through the second polarizer 504-R and is directed through projection lens 506-R to viewing screen 812. Although not shown in FIG. 19, any part of red light ray 814 of a second polarization state that is not converted to red light ray 815 of a first polarization state by the pixel of the imaging light modulator is reflected or absorbed by the second polarizer 504-R.

Green light ray 816 of a second polarization state is emitted by the multilayer semiconductor structure 102b-G of LED 100b-G on the third side of light-recycling cavity 202-G and passes through surface 122b-G of LED 100b-G. Green light ray 816 of a second polarization state passes through the interior of light-recycling cavity 202-G, passes through light output aperture 204-G, is partially collimated by light-collimating means 302-G, passes through planar reflective polarizer 322-G and is directed to a pixel of imaging light modulator 502-G. The pixel of imaging light modulator 502-G converts all or part of green light ray 816 of a second polarization state into green light ray 817 of a first polarization state, forming one pixel of an image. Green light ray 817 of a first polarization state passes through the second polarizer 504-G and is directed through projection lens 506-G to viewing screen 812. Although not shown in FIG. 19, any part of green light ray 816 of a second polarization state that is not converted to green light ray 817 of a first polarization state by the pixel of the imaging light modulator is reflected or absorbed by the second polarizer 504-G.

Blue light ray 818 of a second polarization state is emitted by the multilayer semiconductor structure 102b-B of LED 100b-B on the third side of light-recycling cavity 202-B and passes through surface 122b-B of LED 100b-B. Blue light ray 818 of a second polarization state passes through the interior of light-recycling cavity 202-B, passes through light output aperture 204-B, is partially collimated by light-collimating means 302-B, passes through planar reflective polarizer 322-B and is directed to a pixel of imaging light modulator 502-B. The pixel of imaging light modulator 502-B converts all or part of blue light ray 818 of a second polarization state into blue light ray 819 of a first polarization state, forming one pixel of an image. Blue light ray 819 of a first polarization state passes through the second polarizer 504-B and is directed through projection lens 506-B to viewing screen 812. Although not shown in FIG. 19, any part of blue light ray 818 of a second polarization state that is not converted to blue light ray 819 of a first polarization state by the pixel of the imaging light modulator is reflected or absorbed by the second polarizer 504-B.

Current source 820 supplies electrical power to the red LEDs in light-recycling cavity 202-R. Current source 830 supplies electrical power to the green LEDs in light-recycling cavity 202-G. Current source 840 supplies electrical power to the blue LEDs in light-recycling cavity 202-B. Control unit 850 regulates the color sequential operation of the three current sources. The light output directed to viewing screen 812 can be dynamically changed from image frame to image frame in order to compensate for changes in the ambient brightness surrounding the projection display or to compensate for changes in the projected image if the projected scene goes from to dark to bright and then back to dark. The light output is controlled by the respective current sources 820, 830 and 840 and control unit 850. Dynamically changing the light output allows the imaging light modulator to operate at its maximum contrast for both light and dark scenes.

Figure 20:
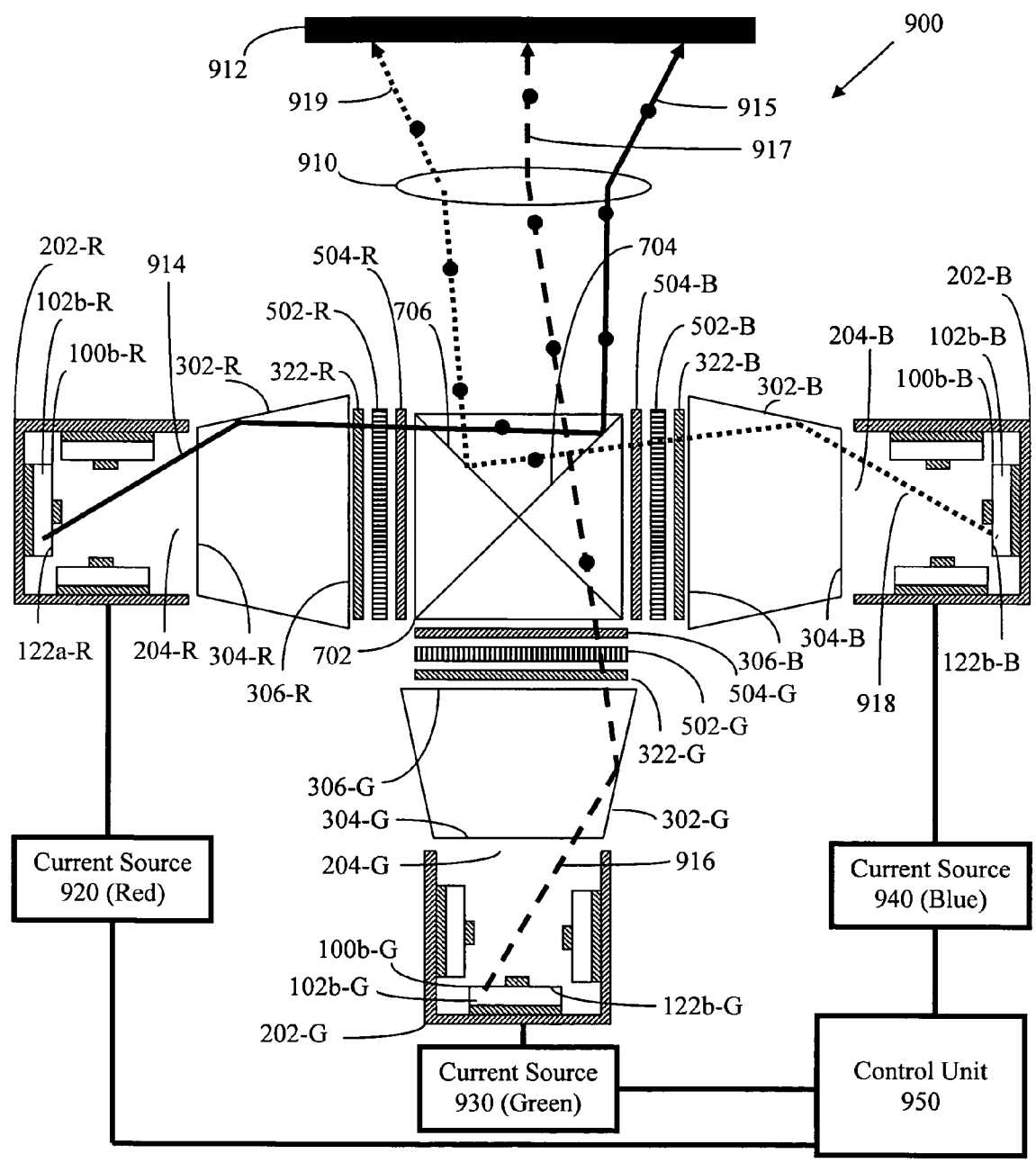
FIG. 20 is a side cross-sectional view of another embodiment of this invention that incorporates three light-recycling illumination systems, three imaging light modulators, one projection lens and one viewing screen.

FIG. 20 is a side cross-sectional view of another embodiment of this invention, projection display system 900, that includes three light-recycling illumination systems and three imaging light modulators. Projection display system 900 in FIG. 20 differs from projection display system 800 in FIG. 19 in that projection display system 900 includes an x-cube light combining means. Projection display system 900 combines three projection display systems, such as projection display system 500, into one projection display system 900 that has one viewing screen 912. The main elements of the projection display system 900 are three light-recycling illumination systems, three first reflective polarizers 322-R, 322-G and 322-B, three imaging light modulators 502-R, 502-G and 502-B, three second polarizers 504-R, 504-G and 504-B, a light-combining means, a single projection lens 910 and a viewing screen 912. The three light-recycling illumination systems include, respectively, three pluralities of LEDs, three light-recycling cavities 202-R, 202-G and 202-B, three light output apertures 204-R, 204-G and 204-B and three light-collimating means 302-R, 302-G and 302-B. Light-recycling cavity 302-R encloses nine red-emitting LEDs. Light-recycling cavity 302-G encloses nine green-emitting LEDs. Light-recycling cavity 302-B encloses nine blue-emitting LEDs. Only three of the nine LEDs in each light-recycling cavity are illustrated in the side cross-sectional view in FIG. 19. The characteristics and properties of the LEDs, the light-recycling cavities and the light-collimating means have been described previously in the descriptions for FIGS. 4, 5 and 7. The light-combining means is x-cube prism 702, which was described previously for FIG. 17. Other light-combining means can also be utilized for this embodiment in place of the x-cube prism.

For each of the three light-recycling illumination systems, the area of the light output aperture 204-R, 204-G or 204-B is less than the total light-emitting area of the respective plurality of LEDs and, in some cases, the maximum exiting luminance from the light output aperture 204-R, 204-G or 204-B is greater than the respective maximum intrinsic source luminance.

Although light-recycling cavity 202-R in FIG. 20 has nine red LEDs, it is within the scope of this invention that light-recycling cavity 202-Ra may enclose more or less than nine red LEDs. Likewise, light-recycling cavity 202-G may enclose more or less than nine green LEDs and light-recycling cavity 202-B may enclose more or less than nine blue LEDs. It is also within the scope of this invention that red light may be produced inside light-recycling cavity 202-R by a plurality of ultraviolet LEDs that are coated with a wavelength conversion layer in order to convert ultraviolet light to red light. Green light and blue light may also be produced by wavelength conversion layers if desired.

Representative light rays 914, 915, 916, 917, 918 and 919 in FIG. 20 illustrate the operation of projection display system 900. Multiple ray reflections of light rays 914, 916 and 918 inside the respective light-recycling cavities 202-R, 202-G and 202-B are not shown in order to simplify the figure.

Red light ray 914 of a second polarization state is emitted by the multilayer semiconductor structure 102b-R of LED 100b-R on the third side of light-recycling cavity 202-R and passes through surface 122b-R of LED 100b-R. Red light ray 914 of a second polarization state passes through the interior of light-recycling cavity 202-R, passes through light output aperture 204-R, is partially collimated by light-collimating means 302-R, passes through planar reflective polarizer 322-R and is directed to a pixel of imaging light modulator 502-R. The pixel of imaging light modulator 502-R converts all or part of red light ray 914 of a second polarization state into light ray 915 of a first polarization state, forming one pixel of an image. Red light ray 915 of a first polarization state passes through the second polarizer 504-R, is reflected by reflecting diagonal surface 704 of x-cube 702 and is directed through projection lens 910 to viewing screen 912. Although not shown in FIG. 20, any part of red light ray 914 of a second polarization state that is not converted to red light ray 915 of a first polarization state by the pixel of the imaging light modulator is reflected or absorbed by the second polarizer 504-R.

Green light ray 916 of a second polarization state is emitted by the multilayer semiconductor structure 102b-G of LED 100b-G on the third side of light-recycling cavity 202-G and passes through surface 122b-G of LED 100b-G. Green light ray 916 of a second polarization state passes through the interior of light-recycling cavity 202-G, passes through light output aperture 204-G, is partially collimated by light-collimating means 302-G, passes through planar reflective polarizer 322-G and is directed to a pixel of imaging light modulator 502-G. The pixel of imaging light modulator 502-G converts all or part of green light ray 916 of a second polarization state into green light ray 917 of a first polarization state, forming one pixel of an image. Green light ray 917 of a first polarization state passes through the second polarizer 504-G, passes through x-cube 702 without reflection and is directed through projection lens 910 to viewing screen 912. Although not shown in FIG. 20, any part of green light ray 916 of a second polarization state that is not converted to green light ray 917 of a first polarization state by the pixel of the imaging light modulator is reflected or absorbed by the second polarizer 504-G.

Blue light ray 918 of a second polarization state is emitted by the multilayer semiconductor structure 102b-B of LED 100b-B on the third side of light-recycling cavity 202-B and passes through surface 122b-B of LED 100b-B. Blue light ray 918 of a second polarization state passes through the interior of light-recycling cavity 202-B, passes through light output aperture 204-B, is partially collimated by light-collimating means 302-B, passes through planar reflective polarizer 322-B and is directed to a pixel of imaging light modulator 502-B. The pixel of imaging light modulator 502-B converts all or part of blue light ray 918 of a second polarization state into blue light ray 919 of a first polarization state, forming one pixel of an image. Blue light ray 919 of a first polarization state passes through the second polarizer 504-B, is reflected by reflecting diagonal surface 706 of x-cube 702 and is directed through projection lens 910 to viewing screen 912. Although not shown in FIG. 20, any part of blue light ray 918 of a second polarization state that is not converted to blue light ray 919 of a first polarization state by the pixel of the imaging light modulator is reflected or absorbed by the second polarizer 504-B.

Current source 920 supplies electrical power to the red LEDs in light-recycling cavity 202-R. Current source 930 supplies electrical power to the green LEDs in light-recycling cavity 202-G. Current source 940 supplies electrical power to the blue LEDs in light-recycling cavity 202-B. Control unit 950 regulates the color sequential operation of the three current sources. The light output directed to viewing screen 912 can be dynamically changed from image frame to image frame in order to compensate for changes in the ambient brightness surrounding the projection display or to compensate for changes in the projected image if the projected scene goes from to dark to bright and then back to dark. The light output is controlled by the respective current sources 920, 930 and 940 and control unit 950. Dynamically changing the light output allows the imaging light modulator to operate at its maximum contrast for both light and dark scenes.

While the invention has been described in conjunction with specific embodiments and examples, it is evident to those skilled in the art that many alternatives, modifications and variations will be apparent in light of the foregoing description. Accordingly, the invention is intended to embrace all such alternatives, modifications and variations as fall within the spirit and scope of the appended claims.

What is claimed is:

1. A projection display system, comprising:
 a light-recycling illumination system, wherein said light-recycling illumination system further comprises:
  a plurality of light-emitting diodes, wherein each of said light-emitting diodes emits internally generated light, wherein each of said light-emitting diodes has a first reflecting electrode and a second reflecting electrode that reflect externally incident light, wherein each of said light-emitting diodes has a maximum intrinsic source luminance and wherein the total light-emitting area of said plurality of said light-emitting diodes is area $A_{LED}$;
  a light-recycling cavity, wherein said plurality of said light-emitting diodes is disposed on the inside surfaces of said light-recycling cavity and wherein said light-recycling cavity and said first reflecting electrodes and said second reflecting electrodes of said light-emitting diodes reflect and recycle a portion of said internally generated light back to said light-emitting diodes as said externally incident light, thereby increasing the effective brightness of said light-emitting diodes; and
  a light output aperture, wherein said light output aperture is located in a surface of said light-recycling cavity, wherein the area of said light output aperture is area $A_O$, wherein said area $A_O$ is less than said area $A_{LED}$, wherein said light-emitting diodes and said light-recycling cavity direct at least a fraction of said internally generated light and said externally incident light out of said light-recycling cavity through said light output aperture and wherein said fraction of said internally generated light and said externally incident light exits said light output aperture as uncollimated light having a maximum exiting luminance;

a light-collimating means, wherein said light-collimating means has an input area that is adjacent to said light output aperture that accepts said uncollimated light, wherein said light-collimating means partially collimates said uncollimated light and wherein said light-collimating means has an output area through which the partially collimated light is transmitted; and an imaging light modulator, wherein said imaging light modulator is located in the optical path of said partially collimated light, and wherein said imaging light modulator spatially modulates said partially collimated light to form an image.

2. A projection display system as in claim 1, further comprising a reflective polarizer, wherein said reflective polarizer is located in the optical path of said partially collimated light and is located adjacent to said output area of said light-collimating means, wherein said reflective polarizer reflects a first polarization state of said partially collimated light and wherein said reflective polarizer transmits a second polarization state of said partially collimated light.

3. A projection display system as in claim 1, wherein said maximum exiting luminance is greater than said maximum intrinsic source luminance.

4. A projection display system as in claim 3, further comprising a projection lens, wherein said projection lens is located in the optical path in a position after said imaging light modulator and wherein said projection lens magnifies said image formed by said imaging light modulator.

5. A projection display system as in claim 4, wherein said light-collimating means is chosen from the group consisting of a convex lens, a tapered light guide and a compound parabolic reflector.

6. A projection display system as in claim 5, wherein said imaging light modulator is chosen from the group consisting of a liquid crystal display device, a liquid-crystal-on-silicon device and a digital light processor device.

7. A projection display system as in claim 6, wherein said plurality of said light-emitting diodes emits red light, green light or blue light.

8. A projection display system as in claim 6, wherein said plurality of light-emitting diodes so emits white, yellow, cyan or magenta light.

9. A projection display system as in claim 6, wherein said plurality of light-emitting diodes emits ultraviolet light and wherein said light-recycling illumination system includes a wavelength conversion layer that converts said ultraviolet light into said red light or said green light or said blue light.

10. A projection display system as in claim 6, wherein said light-recycling cavity is filled or partially filled with a transparent material having an effective refractive index greater than 1.60.

11. A projection display system as in claim 7, further comprising a control unit, wherein said control unit manages the timing sequence for the emission of said red light, said green light or said blue light by a color sequential means.

12. A projection display system as in claim 11, wherein said light-recycling illumination system emits red light and wherein said projection display system further comprises a second light-recycling illumination system that emits green light and a third light-recycling illumination system that emits blue light.

13. A projection display system as in claim 12, further comprising a control unit, wherein said control unit manages the timing sequence for the emission of said red light, said green light or said blue light by a color sequential means.

14. A projection display system as in claim 13, wherein said projection display system further comprises a color combining means.

15. A projection display system as in claim 14, wherein said color combining means is chosen from the group of a trichroic prism and an x-cube prism.

16. A projection display system as in claim 15, wherein said control unit dynamically regulates the output brightness of said projection display system.

17. A projection display system as in claim 15, wherein said control unit regulates the output color temperature of said projection display system.

18. A projection display system as in claim 15, wherein said projection display system further comprises a second imaging light modulator and a third imaging light modulator.

19. A color sequential method of forming a full-color projection display image comprising the steps of:

dividing the time period for each frame of said full-color projection display image into at least a first sub-frame, a second sub-frame after said first sub-frame, and a third sub-frame after said second sub-frame;

during said first sub-frame, addressing all pixels of an imaging light modulator to set the transmission of said imaging light modulator for light of a first color, emitting said light of said first color from a first plurality of light-emitting diodes that each have a first reflecting electrode and a second reflecting electrode, recycling a portion of said light of said first color back to said first reflecting electrodes and said second reflecting electrodes to increase the effective brightness of said first plurality of said light-emitting diodes, partially collimating a fraction of said light of a first color, directing the partially collimated said light of said first color to said imaging light modulator and spatially modulating said partially collimated said light of said first color to form a first image;

during said second sub-frame, addressing all said pixels of said imaging light modulator to set said transmission of said imaging light modulator for light of a second color, emitting said light of a second color from a second plurality of said light-emitting diodes that each have said first reflecting electrodes and said second reflecting electrodes, recycling a portion of said light of said second color back to said first reflecting electrodes and said second reflecting electrodes to increase the effective brightness of said second plurality of said light-emitting diodes, partially collimating a fraction of said light of said second color, directing the partially collimated said light of said second color to said imaging light modulator and spatially modulating said partially collimated said light of said second color to form a second image; and during said third sub-frame, addressing all said pixels of said imaging light modulator to set said transmission of said imaging light modulator for light of a third color, emitting said light of said third color from a third plurality of said light-emitting diodes that each have said first reflecting electrodes and said second reflecting electrodes, recycling a portion of said light of said third color back to said first reflecting electrodes and said second reflecting electrodes increase the effective brightness of said third plurality of light-emitting diodes, partially collimating a fraction of said light of said third color, directing the partially collimated said light of said third color to said imaging light modulator and spatially modulating said partially collimated said light of a third color to form a third image.

20. A projection display system as in claim 19, wherein said light of said first color is red light, said light of said second color is green light and said light of said third color is blue light.

21. A projection display system as in claim 20, further comprising a control unit, wherein said control unit manages the timing sequence for the emission of said red light, said green light or said blue light by a color sequential means.

22. A projection display system as in claim 21, wherein said control unit dynamically regulates the output brightness of said projection display system.

23. A method as in claim 22, further comprising:
regulating the output brightness of said projection display system by changing each of said red light output from said first plurality of light-emitting diodes, said green light output from said second plurality of light-emitting diodes and said blue light output from said third plurality of said light-emitting diodes by the same numerical factor.

24. A method as in claim 22, further comprising:
regulating the output brightness of said projection display system by changing each of the red light emitting time, the green light emitting time and the blue light emitting time by the same numerical factor.

25. A projection display system as in claim 21, wherein said control unit regulates the output color temperature of said projection display system.

26. A method as in claim 25, further comprising:
modifying the color temperature of said projection display system by changing the ratio of the red light output to the green light output to the blue light output.

27. A method as in claim 25, further comprising:
modifying the color temperature of said projection display system by changing the ratio of the red light emitting time to the green light emitting time to said blue light emitting time.

28. A method as in claim 21, further comprising:
emitting said red light, said green light and said blue light in random order in said first sub-frame, said second sub-frame and said third sub-frame.

29. A method as in claim 21, further comprising:
dividing the time period for each said frame into a fourth sub-frame after said third sub-frame and, during said fourth sub-frame, addressing all said pixels of said imaging light modulator to set said transmission of said imaging light modulator for light of a fourth color, emitting said light of said fourth color from a fourth plurality of said light-emitting diodes that each have said first reflecting electrodes and said second reflecting electrodes, recycling a portion of said light of said fourth color back to said first reflecting electrodes and said second reflecting electrodes to increase said effective brightness of said fourth plurality of said light-emitting diodes, partially collimating said light of said fourth color, directing the partially collimated said light of said fourth color to said imaging light modulator and spatially modulating said partially collimated said light of said fourth color to form a fourth image.

* * * * *